United States Patent [19]
McDougall et al.

[11] Patent Number: 5,999,966
[45] Date of Patent: Dec. 7, 1999

[54] CONTROL NETWORK-DIRECTED VIDEO CONFERENCING SWITCHING SYSTEM AND METHOD

[76] Inventors: Floyd McDougall, 6231 Staple Downs, San Antonio, Tex. 78249; Rene DeBacker, 23223 Central Prairie, San Antonio, Tex. 78255; Bryan Albert, 10224 Lost Bluff; Mark Oerkfitz, 6227 Forrest Bend, both of San Antonio, Tex. 78240; Raymond Metzger, 6501 Adair, San Antonio, Tex. 78238

[21] Appl. No.: 08/958,253

[22] Filed: Oct. 7, 1997

[51] Int. Cl.[6] .................................................. G06F 13/00
[52] U.S. Cl. ............................ 709/204; 370/260; 348/15
[58] Field of Search ...................... 348/15, 17; 370/260, 370/261, 266; 709/204, 205, 227, 246

[56] References Cited

U.S. PATENT DOCUMENTS

| | | | |
|---|---|---|---|
| 4,686,698 | 8/1987 | Tompkins et al. | 348/230 |
| 4,710,917 | 12/1987 | Tompkins et al. | 709/204 |
| 4,847,829 | 7/1989 | Tompkins et al. | 370/260 |
| 5,014,267 | 5/1991 | Tompkins et al. | 370/259 |
| 5,099,510 | 3/1992 | Blinken, Jr. et al. | 379/202 |
| 5,315,633 | 5/1994 | Champa | 348/16 |
| 5,392,223 | 2/1995 | Caci | 365/104 |
| 5,434,913 | 7/1995 | Tung et al. | 379/202 |
| 5,452,299 | 9/1995 | Thessin et al. | 370/260 |
| 5,453,780 | 9/1995 | Chen et al. | 348/15 |
| 5,506,954 | 4/1996 | Arshi et al. | 348/15 |
| 5,508,942 | 4/1996 | Agarwal | 709/204 |
| 5,530,472 | 6/1996 | Bregman et al. | 348/15 |
| 5,555,017 | 9/1996 | Landante et al. | 348/15 |
| 5,565,910 | 10/1996 | Rowse et al. | 348/15 |
| 5,574,934 | 11/1996 | Mirashrafi et al. | 709/207 |
| 5,577,042 | 11/1996 | McGraw, Sr. et al. | 370/257 |
| 5,600,646 | 2/1997 | Polomski | 370/263 |
| 5,610,920 | 3/1997 | Doll et al. | 370/389 |
| 5,611,038 | 3/1997 | Shaw et al. | 709/221 |
| 5,625,407 | 4/1997 | Biggs et al. | 348/16 |
| 5,680,392 | 10/1997 | Semaan | 370/261 |
| 5,844,600 | 12/1998 | Kerr | 348/17 |

Primary Examiner—Zarni Maung
Assistant Examiner—Patrice L. Winder
Attorney, Agent, or Firm—J. Scott Denko; Fulbright & Jaworski LLP

[57] ABSTRACT

A system and method is provided to allow a video conference participant to establish and direct a video conference through a control network separate from the conference network that sustains the conference. A video conference switching system host machine responds to control signals conveyed by a control network to the switching system from a participant-accessible control system. The host machine generates adaptor conference signals that are interpreted to appropriately configure a crosspoint switch in correspondence with the control signals. The switching system may operate in continuous presence or video follows audio modes. In continuous presence mode, the host machine generates adaptor conference signals that are interpreted to convey to the participants a combination video signal composed from the individual video signals. In the video follows audio mode, detected voice signals result in a switch configuration according to a video follows audio protocol or rule set. The control system is available, preferably, on a participant desktop PC or workstation and may be preferably accessed through a graphical user interface. In a preferred embodiment, signals from the participant-directed control system are conveyed by TCP/IP protocol to the host machine on the control network which may be as simple as a POTS network or more sophisticated such as an INTRANET or the INTERNET. The control signals are captured from the control network by a modem or other terminal device appropriate for the control network technology. An ISDN network or other digital network may provide the conference network for maintenance of the video conference.

33 Claims, 52 Drawing Sheets

Video Follows Audio
Video Configuration

Codec 1    - Current Speaker
Codec 2    - Previous Speaker
Codes 3 & 4 - Passive

Flow Diagram Control System

Flow Diagram Control System
DoStartRAS, DoStopRAS, DoStartWS & DoStopWS

Flow Diagram Control System
DoSockRecv

Control System Message Events

Control System Message Events cont.

Control System Message Events cont.

Codec Message Event

Flow Diagram Firmware
Power-Up, Task Scheduler and Idle Loop

Flow Diagram Firmware
Parallel I/O ISR

Flow Diagram Fireware
Task_1 (Rcv Packet Assembler)

CONTROL NETWORK-DIRECTED VIDEO CONFERENCING SWITCHING SYSTEM AND METHOD

TECHNICAL FIELD

The present invention relates to video conferencing and, in particular, to a system and method for directing through a first network, a video conference sustained on a second network.

BACKGROUND OF THE INVENTION

Video conferencing systems allow multi-dimensional communication between participants separated by physical distance. The advancement of video conferencing provides businesses and individuals a rich communication experience that combines video with audio and effectively simulates the face-to-face communication that is a lynch-pin of understanding.

Early video conferencing systems required networks dedicated to the video conference. For example, in prior systems described in U.S. Pat. Nos. 4,686,698, 4,710,917, 4,847,829, and 5,014,267 to Tompkins et al., audiovisual terminals are linked with a video-conferencing switch through a coaxial cable network. The dedication of the network and associated terminals resulted in high cost and limited flexibility, but provided quality video conferencing at an early date.

The advent of PC-based video conferencing systems has made video conferencing a more economical proposition. For example, U.S. Pat. No. 5,506,954 to Arshi et al. discloses a relatively low-cost PC-based video conferencing system. Low cost has, in the past, however, usually meant limited switching sophistication that limits the conference to two participants. If more than two parties wish to participate, a video switching system is required. Video conferencing switching systems have generally included a "multi-point" control unit (MCU) which, typically, includes multiple communication ports that can be selectively interconnected to provide appropriate connection among participant terminals or devices.

Typical switching systems have required conferences to be scheduled in advance. Generally, a fairly complex and indirect methodology must be followed that typically implicates a reservation system or operator that controls the MCU to initiate and direct the video conference according to a prearranged schedule. Conference set-up complexity, both in terms of operator involvement and conference command structure have delayed the inevitable ubiquity of video conferencing.

On-demand conferencing based on user control from a touch-tone (DTMF) keypad is described in Bellcore Generic Requirements GR-1337-CORE. The method described in GR-1337 requires, however, a complex command structure and set-up times which are generally lengthy. Audio conferencing based on the GR-1337-CORE model has benefitted from recent innovations such as that described in U.S. Pat. No. 4,653,090 in which a graphical user interface is purportedly provided to simplify call set-up. On-going graphical control of a video conference is not, however, provided.

Other systems such as that disclosed in U.S. Pat. No. 5,555,017 to Landante et al. have provided an MCU that purportedly responds to DTMF signals from an end-point terminal to create a conference. Such systems however, impose DTMF codes on the video or audio network that sustains the conference and apparently do not contemplate incompatibilities between participant end-point equipment.

What is needed therefore, is an economical video conferencing switching system that may be controlled by a participant through a control network separate from the network which sustains the conference and which displays attendant compatibility for disparate participant terminal equipment while providing a straight-forward control system and methodology.

SUMMARY OF THE INVENTION

An object of the present invention is, therefore, to provide a system and method for participant control of a video conference on a conference network.

Another object of this invention is to provide a system and method that provides participant control of a video conference through a control network distinct from the video conference network.

A further object of the present invention is to provide a straight-forward and efficient system and method that provides participant control of a video conference through a control network distinct from the conference network while providing both video conference control and video conference participation through a PC-based desktop machine.

A still further object of this invention is to provide a graphical user interface for participant control of a desktop video conference.

An even further object of the present invention is provide a video conferencing control capability for engaging and directing a video conference amongst participants employing disparate CODEC-based desktop conferencing hardware.

The present invention provides a system and method to allow a video conference participant to establish and direct a video conference through a control network separate from the conference network that sustains the conference. This allows participants having dissimilar hardware to join in a video conference. A video conference switching system host machine responds to control signals conveyed by a control network from a participant-accessible control system. The host machine responds to the control signals to generate CODEC conference signals that direct CODECs to add or delete participants on the conference network or respond to access requests from participants.

In video follows audio mode, the host machine responds to the control signals to generate adaptor conference signals that are interpreted by a crosspoint adaptor to selectively configure a crosspoint switch to convey video and audio signals from a selected participant or participants to one or more of the other conference participants according to a predetermined video follows audio protocol. The switching system may also operate in a continuous presence mode. In the continuous presence mode, the host machine generates adaptor conference signals that are interpreted by the crosspoint adaptor to configure the crosspoint switch to convey to the participants a combination video signal composed of the participant's individual video signals. An audio summing circuit in the crosspoint adaptor maintains intelligible audio that corresponds to the speaker in video follows audio mode while preventing feedback with an appropriate mix-minus combination of audio signals in either mode.

The control system is available, preferably, on a participant desktop PC or workstation that provides a platform for control as well as participation in the conference. The control system is preferably accessed through a graphical user interface. For added convenience, the switching system may also, or alternatively, be configured with an operator-control access console. In a preferred embodiment, signals from the participant-directed control system are conveyed by TCP/IP protocol to the host machine on the control network which may be as simple as a POTS network or more sophisticated such as a digitally-capable INTRANET or have global access capability such as the INTERNET. In a preferred embodiment, control signals are captured from the control network by a modem or other terminal device which conditions the control signals for access to the host machine. In other embodiments, the control signals are captured from the control network by techniques appropriate for the control network technology. For example, when a LAN is employed as the control network, an ETHERNET connection may be used.

In response to the control signals, the host machine produces CODEC conference signals that direct plural CODECs to selectively engage or delete conference participants. The CODECs preferably access conference participants through a terminal interface that conditions video and audio signals between the CODECs and the conference network which, in a preferred embodiment, is an ISDN network. Other digital networks such as T1 or T3 pipes or a LAN or WAN or the INTERNET may provide the conference network for communication of audio and video. The host machine generates adaptor conference signals that are interpreted, in a preferred embodiment, by a micro-code driven microprocessor or microcontroller to appropriately configure the crosspoint switch in correspondence with the control signals.

The present invention may be employed in a variety of configurations and embodiments to provide an economical, participant-directed, video conferencing switching system controlled through a control network to engage and direct a video conference on a conference network amongst participants employing dissimilar CODEC-based conferencing hardware.

DETAILED DESCRIPTION OF PREFERRED EMBODIMENTS

Figure 1:
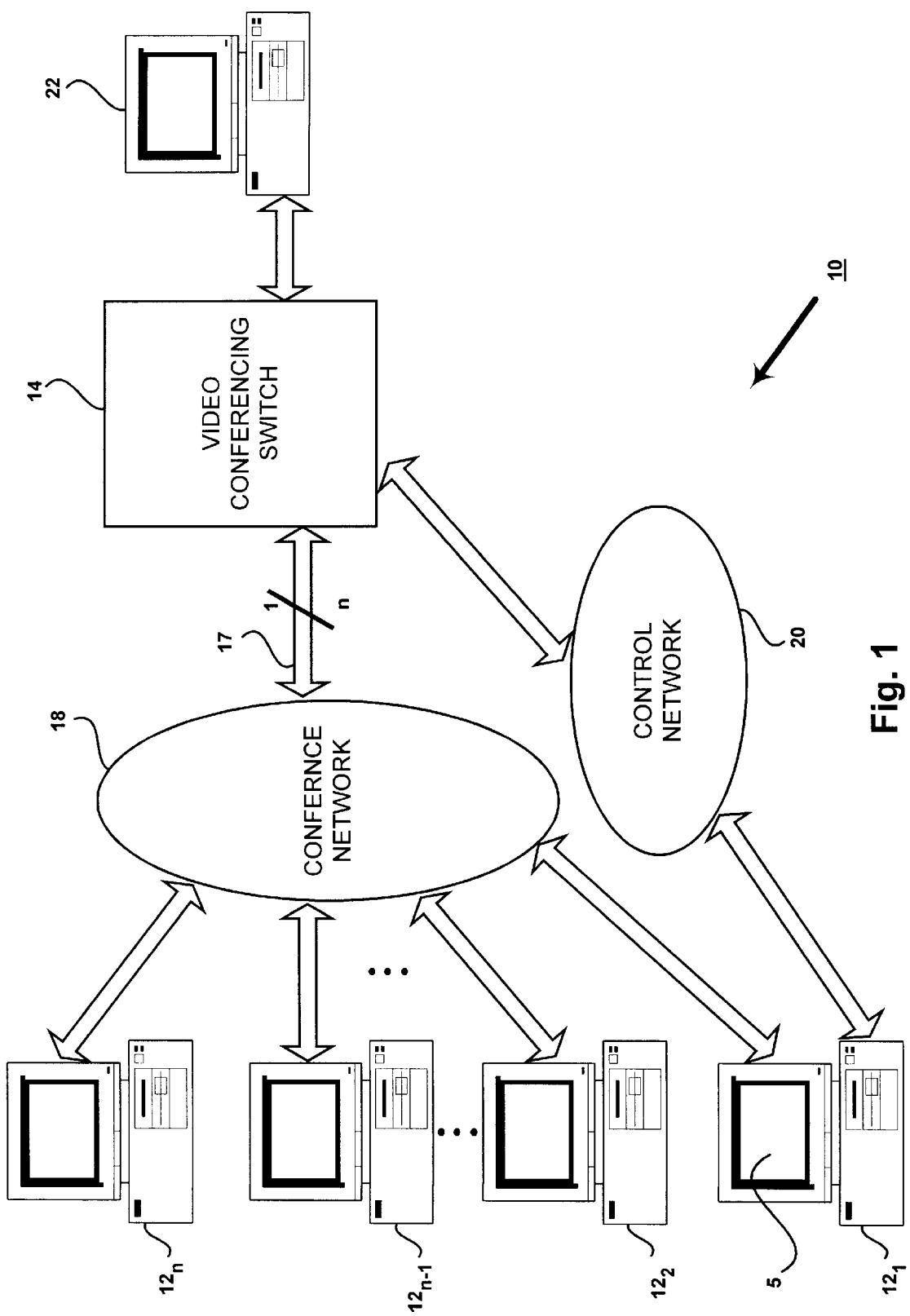
FIG. 1 depicts hardware employed by a preferred embodiment to provide a participant-directed video conference in accordance with the present invention.

FIG. 1 depicts elements of hardware infrastructure employed in a preferred embodiment to provide a participant-directed video conference in accordance with the present invention. Video conferencing system 10 includes participant terminals $12_1$–$12_n$ shown connected to switch 14 through conference network 18. Each of terminals $12_1$–$12_n$ includes, in a preferred embodiment, a video conferencing application such as those readily available and a camera and microphone or other video and audio generating means. Network conduit 17 is depicted to have n channels to correspond to n participants. Conference network 18 sustains the video conference by distributing audio and video signals amongst the participants according to the configuration of switch 14. In a preferred embodiment, conference network 18 is an ISDN network, but conference network 18 may be any set of digital pathways that provides audio and video communicative capacity between terminals $12_1$–$12_n$ and switch 14. For example, conference network 18 may, alternatively, be a T1 or T3 pipe or fiber channels such as FDDI or LAN or WAN structures.

As shown in FIG. 1, participant terminal $12_1$ is connected to switch 14 through control network 20. Control network 20 provides a pathway for control signals from control system 5 resident in a participant terminal which, for exemplar purposes, is shown to be terminal $12_1$. In a preferred embodiment, control network 20 comprises the POTS network but, alternatively, control network 20 may be any network such as an inter-organizational LAN or INTRANET or may be a wide area network or the INTERNET. Conference network 18 and control network 20 may also employ the same type of network technologies. For example, both may be fiber optic or both may employ INTRANET technologies. Also shown in FIG. 1 is an optional operator console 22 for proximal control of switch 14.

Figure 2:
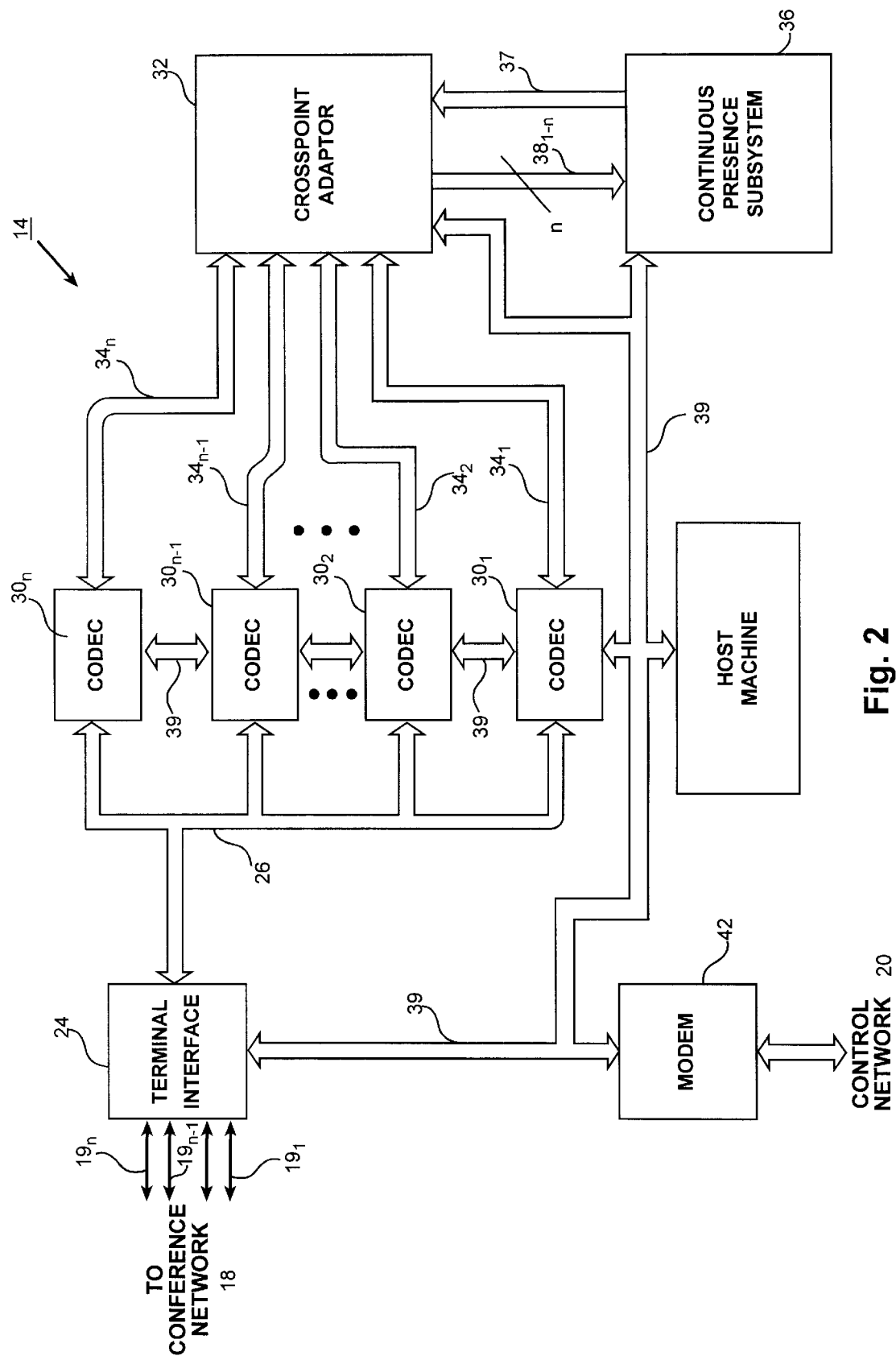
FIG. 2 depicts a video conferencing switch configured in accordance with a preferred embodiment of the present invention.

FIG. 2 depicts elements of switch 14 in a preferred embodiment of the present invention configured to provide two display modes of video conferencing capability for multiple (n) conference participants. Those skilled in the art will recognize that switch 14 may be configured for almost any number of participants and may be cascaded with other iterations of switch 14 to provide greater capacity. As shown in FIG. 2, switch 14 is interconnected to conference network 18 through terminal interface 24. Conference network 18 is accessed through ports $19_1$–$19_n$ which individually correspond to terminals $12_1$–$12_n$ shown in FIG. 1. Each of terminals $12_1$–$12_n$ corresponds to a potential conference participant and signals associated with each of terminals $12_1$–$12_n$, when active, pass through a designated one of ports $19_1$–$19_n$.

With continuing reference to FIG. 2, terminal interface 24 may be any circuit that can mediate signal conditions between conference network 18 and internal digital signal bus 26 of switch 14. Zydacron®, Incorporated provides an exemplar terminal interface which can provide ready and convenient performance in the function of network interface 24 in a preferred embodiment. Internal digital signal bus 26 connects the digital ports of CODECs $30_1$–$30_n$, to adaptor 24. In a preferred embodiment, the well-known Multi-Vendor Integration Protocol (MVIP) bus provides good performance as bus 26.

CODECs $30_1$–$30_n$ provide digitization and compression of analog signals and, in the counterpart, decompression and analog formatting as is well known to those of ordinary skill in the art. In switch 14, each of CODECs $30_1$–$30_n$ is associated with an individual selected one of terminals $12_1$–$12_n$. CODECs $30_1$–$30_n$ interact with terminals $12_1$–$12_n$ in the digital domain. Consequently, each of CODECs $30_1$–$30_n$ engages in a bi-directional communication consisting of compressed digital audio and digital video signals with a selected corresponding one of terminals $12_1 12_n$.

In the past, CODEC-based conferencing systems required compatibility not only in the video and audio domains, but in the control domains as well. As an example of which those skilled in the art are aware, there can be multiple CODEC-based conference terminals that subscribe to the H.320 standard but any one terminal still cannot independently initiate and sustain a multi-terminal conference because of control incompatibilities. By providing a separate control system and method, the present invention obviates formerly obstructive incompatibilities between otherwise similar CODECs.

Audio and video signals are conveyed between CODECs $30_1$–$30_n$ and crosspoint adaptor 32 on analog pathways $34_1$–$34_n$ CODECs $30_1$–$30_n$ interact with crosspoint adaptor 32 in the analog domain. Consequently, each of CODECs $30_1$–$30_n$ conveys to adaptor 32 the uncompressed analog audio and video counterpart of the compressed digital audio and video signals received from the selected corresponding one of terminals $12_1$–$12_n$ and returns to the selected corresponding one of terminals $12_1$–$12_n$, the compressed digital form of the analog audio and video signals received from adaptor 32.

Crosspoint adaptor 32 provides, therefore, interconnection and switching amongst CODECs $30_1$–$30_n$, and, correspondingly and consequently, interconnection and switching, that is, conferencing, amongst terminals $12_1$–$12_n$. and their associated video conference participants. The switching function of crosspoint adaptor 32 is digitally configured. In a preferred embodiment, crosspoint adaptor 32 functions in the modes of continuous presence (CP) or video follows audio (VFA), but may also be configured to function in only VFA mode. To simplify the designation of one processing signal pathway internal to switch 14 with one of terminals $12_1$–$12_n$, switch 14 can be conceived to have multiple "ports" in which each port corresponds to a selected one of terminals $12_1$–$12_n$. Selected ports of switch 14 may be configured in VFA mode while other ports may be in CP mode or all ports may be VFA mode or CP mode. When switch 14 is configured to selectably provide CP or VFA functionality, optional continuous presence subsystem 36 will be provided with switch 14. For convenience, a ready package comprising continuous presence subsystem 36 is available from any of several known sources. In some implementations, more than one continuous presence subsystem may be employed to enable handling more than one conference per switch. Continuous presence subsystem 36 returns to crosspoint adaptor 32 on pathway 37 a combined video signal composed of the individual video signals conveyed to subsystem 36 from crosspoint adaptor 32 on pathways $38_1$–$38_n$. Those skilled in the art will recognize that continuous presence subsystem 36 may be arranged in a variety of configurations in relation to the signals received from the participants and, for example, may be arranged to received signals directly from CODECs $30_1$–$30_n$ rather than from crosspoint adaptor 32.

Host machine 40 is a software-configured computer that directs CODECs $30_1$–$30_n$ with CODEC conference messages adapted to control the CODECs through the CODEC application programs that accompany the CODECs $30_1$–$30_n$. When reference is later made in message descriptions, the reference is to host machine 40. In addition to CODEC conference messages, host machine 40 also issues adaptor conference messages which control crosspoint adaptor 32 through its internal microprocessor functionality that will be further disclosed. As shown in FIG. 2, bus 39 provides a pathway for conveyance of appropriate messages including conference messages and internal switch messages between host machine 40 and the other elements of switch 14. An ISA bus is selected as bus 39 in the depicted preferred embodiment. In a preferred embodiment, the principal hardware elements for host machine 40 include a typical microprocessor such as an Intel® 486 or Pentium®microprocessor and a sufficient amount of RAM to provide a ready execution storage for the host machine 40 software, which, in a preferred embodiment, is approximately 32 megabytes of storage.

Control network 20 provides a control pathway that allows remote control of switch 14 through a network that differs from conference network 18. Control network 20 is, in a preferred embodiment, the public POTS network but, in alternative embodiments of the present invention, control network 20 can be provided by organizational INTRANETS or a WAN structure or may be provided by the INTERNET.

Figure 3:
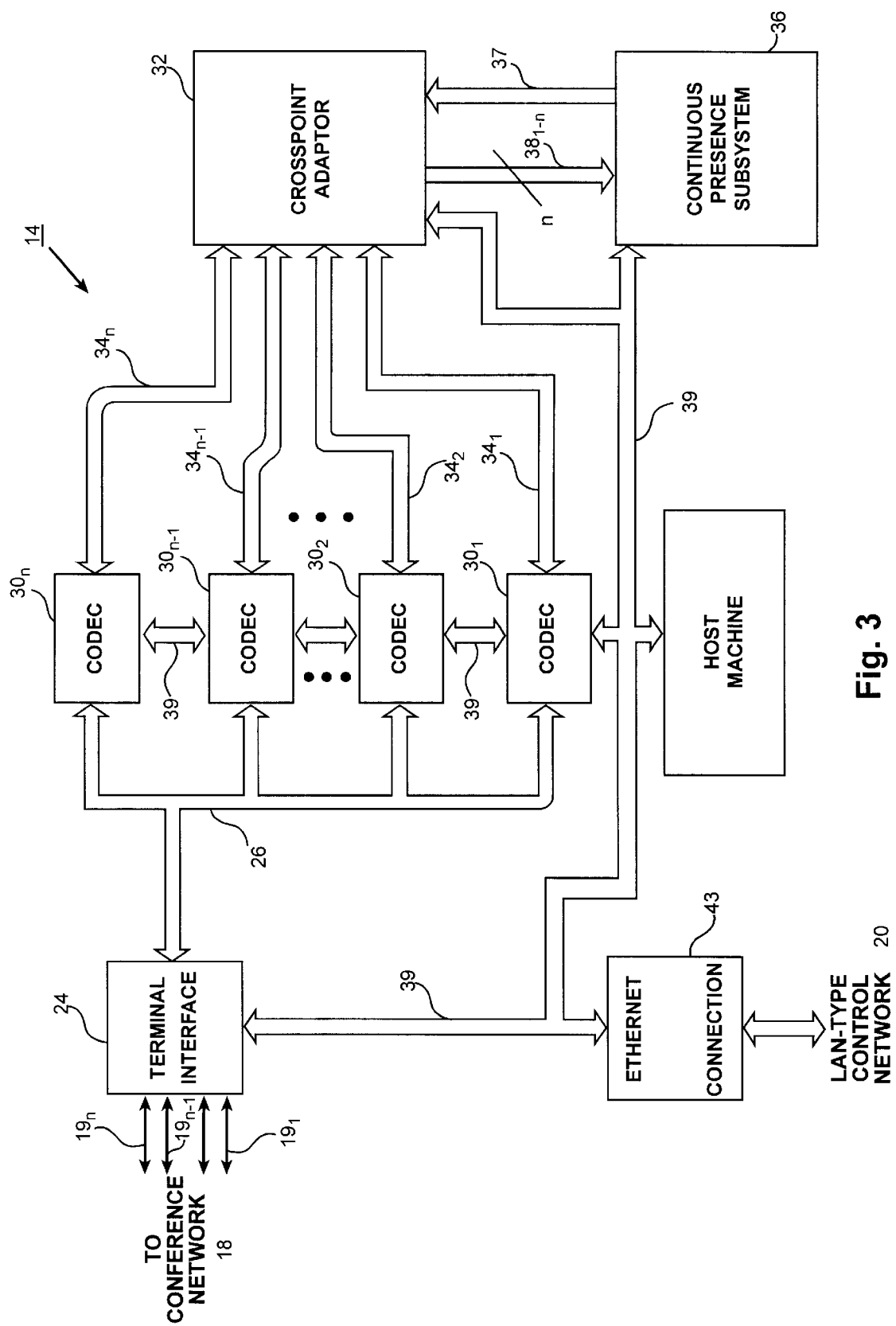
FIG. 3 depicts a video conferencing switch configured in accordance with an alternative embodiment of the present invention.

In a preferred embodiment, host machine 40 in switch 14 receives user control signals over a TCP/IP connection through control network 20. The user control signals are sent to switch 14 by a conference participant employing control system 5 at exemplar terminal $12_1$. In a preferred embodiment, modem 42 captures the control signals from control network 20 and conditions the control signals for conveyance to host machine 40 which, in response, generates appropriate conference messages that correspond to the control signals and cause switch 14 to engage and direct a video conference sustained on conference network 18 amongst participants employing terminals $12_1$–$12_n$. As those skilled in the art recognize, modem 42 captures the information implicit in the control signals on the control network and sends corresponding conditioned control signals containing the control information to host machine 40. When technologies such a LAN are used to implement control network 20, an appropriate control connection or terminal interface is used in place of modem 42 such as an ETHERNET connection for example. FIG. 3 depicts an exemplar control connection as ETHERNET connection 43 which could be used in an alternate embodiment of the present invention that employs a LAN-based control network 20.

In a preferred embodiment, CODECs $30_1$–$30_n$ each have addresses used in internal signaling in switch 14. In a preferred embodiment, host machine 40 attaches the proper address to received control signals and then sends the appropriately generated dial and hang-up related messages to the corresponding ones of CODECs $30_1$–$30_n$. In alternative embodiments, host machine 40 may generate new CODEC conference messages that correspond to the received control signals. In either case, host machine 40 generates CODEC conference messages for conveyance to CODECs $30_1$–$30_n$ and adaptor conference messages for conveyance to crosspoint adaptor 32.

In response to particular control signals, host machine 40 generates CODEC conference messages that cause selected ones of the CODEC applications corresponding to CODECs $30_1$–$30_n$ to dial, for example, the appropriate dial number corresponding to a particular one of terminals $12_1$–$12_n$ and consequently, engage a participant in a video conference. Other CODEC conference messages may direct selected ones of CODECs $30_1$–$30_n$ to hang-up particular ones of terminals $12_1$–$12_n$ or return conference state information for conference management by host machine 40. The CODEC applications also communicate with terminal interface 24, as shown in FIG. 2, to cooperate with the CODEC applications in the actual placement and receipt of calls over conference network 18.

CODECs $30_1$–$30_n$ may also be directed to respond to incoming dial conference access requests directly from terminals $12_1$–$12_n$. Consequently, under the direction of host machine 40 in correspondence with control signals from control network 20, switch 14 may function in either a "meet-me" mode in which calls from any or selected ones of terminals 12$_1$–12$_n$ are accepted, or may function in a control mode, which is identified by the inventors of the present invention as the Dial From the Desktop™ mode, which provides conference engagement and control by a conference participant employing the described control system 5 on one of terminals 12$_1$–12$_n$ that accesses switch 14 through control network 20. The inventors of the present invention also describe a particular preferred embodiment of the present control system 5 variously as "DT" or "DTapp" and any such references should be understood to correspond to control system 5 in an exemplar preferred embodiment.

Figure 4:
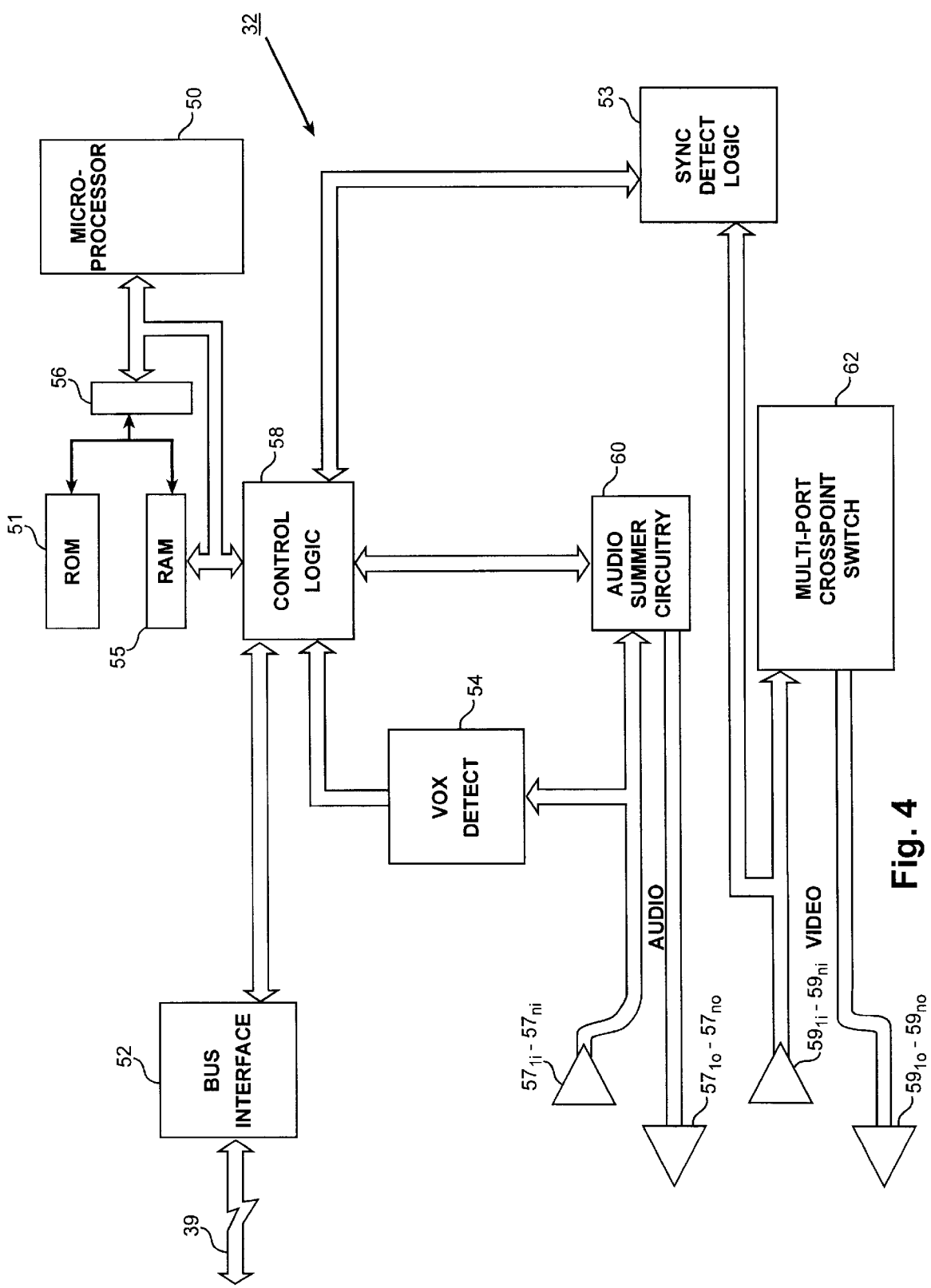
FIG. 4 is a block diagram of the crosspoint adaptor in a preferred embodiment of the present invention.

FIG. 4 illustrates hardware elements of crosspoint adaptor 32 as found in a preferred implementation of the present invention. Microprocessor 50 controls crosspoint adaptor 32 and host machine 40 controls microprocessor 50 through adaptor conference messages conveyed to crosspoint adaptor 32 from host machine 40 on bus 39. Depicted bus interface 52 is a bidirectional port facility that carries messages between microprocessor 50 and host machine 40. Microprocessor 50 operates responsively to adaptor conference messages under the direction of a firmware program stored in ROM 51 that functions as a microcode for the adaptor conference messages. Consequently, host machine 40 communicates with firmware-controlled microprocessor 50. Firmware programming may also be downloaded into crosspoint adaptor 32 through RAM 55 which may be DRAM or SRAM or FLASH memory or EEPROM or other readily programmable storage. RAM 55 can also be used to store current switch configuration to provide a diagnostic resource. Latch 56 provides instruction and data latching as required in a simple Intel®-type microcontroller and may not be required by other microprocessors. Particular adaptor conference messages are, therefore, in the depicted preferred embodiment, commands that are interpreted and executed in detail by the firmware-directed microprocessor 50. As those skilled in the art recognize, microprocessor 50 is preferably implemented with a simple microcontroller such as, for example, an Intel®80C51, but any microprocessor may function as microprocessor 50.

Control logic 58 is, in a preferred embodiment, a programmable field gate array which is configured by the firmware according to particular application requirements and provides implementation of the functionality directed by microprocessor 50. In some implementations, control logic 58 is not required by switch 14. For example, some microprocessors could provide sufficient control capabilities to dispense with control logic 58, but is described in the present preferred embodiment for the provided flexibility and simplicity that can be valuable in field applications.

Pathways 34$_1$–34$_n$ which, for reference, are depicted in FIG. 2, provide analog audio and analog video signals between crosspoint adaptor 32 and CODECs 30$_1$–30$_n$ and, therefore, convey analog counterparts of the audio and video signals that are communicated between terminals 12$_1$–12$_n$ and switch 14. Pathways 34$_1$–34$_n$ meet crosspoint adaptor at incoming audio ports 57$_{1i}$–57$_{ni}$ and outgoing audio ports 57$_{1o}$–57$_{no}$ and incoming video ports 59$_{1i}$–59$_{ni}$ and outgoing video ports 59$_{1o}$–59$_{no}$. Sync detect logic 53 is optionally available to assist in switching of video at frame intervals, but exemplar embodiments have shown marginal utility for this feature. A preferred embodiment employing CODECs from Zydacron®, Incorporated have not shown a requirement for switching coordination with the vertical sync signal.

Audio signals from CODECs 30$_1$–30$_n$ on incoming audio ports 57$_{1i}$–57$_{ni}$ are selectively mixed under direction of microprocessor 50 as implemented through control logic 58 by audio summer circuitry 60 and conveyed back to CODECs 30$_1$–30$_n$ on outgoing audio ports 57$_{1o}$–57$_{no}$. This allows selective mix and minus control over audio under the direction of microprocessor 50 through control logic 58 to prevent feedback that would otherwise be caused by looping audio back to a speaking participant in the VFA mode and appropriate audio for the CP mode. In a preferred embodiment, each of the audio ports has its own audio summer circuit.

In a preferred implementation, when the VFA mode is active for one or more participants, VOX detect 54 operates to respond to the presence of a participant voice on one of incoming audio ports 57$_{1i}$–57$_{ni}$. In VOX detect 54 there is a VOX-responsive circuit for each of n ports corresponding to each of n potential participants. Consequently, the VFA mode can be operative not only for all ports, but for one or more ports while other ports are configured in the CP mode.

The presence of a voice signal is confirmed, in a preferred embodiment, through a filtering function that is implemented in a combination of hardware and software. VOX detect 54 has quick-acting slow-decay filter that collects data over time. Microprocessor 50 under firmware control polls each port of VOX detect 54 every 10 milliseconds. Each port is also counted separately. A counter is incremented on every poll and if the counter reaches a particular count which, in a preferred embodiment, is a count that corresponds to 500 milliseconds, the host machine is signaled that a voice signal has been detected on a particular port. The time and correspondingly, the count, can be varied to fit the conversational flow of the conference participants or subject matter. Host machine 40 can then respond if the VFA mode has been implemented. Host machine 40 can selectively set a masking of VOX detection signals in the firmware with a "Set VOX Mask" command if the particular port is not to be in VFA mode or respond to VOX signals. This will prevent VOX detection messages from being returned to host machine 40 upon voice detection. Those skilled in the art will recognize that a number of implementations may be devised to confirm the presence of voice from any selected conference participant and that, for example, the VOX circuitry may be devised to only respond when the VFA mode is implemented.

When control signals have directed that switch 14 is to be in VFA mode, host machine 40 responds to VOX confirmation messages by directing microprocessor 50 under firmware control to cause multi-port crosspoint switch 62 to selectively direct video signals from certain ones of incoming video ports 59$_{1i}$–59$_{ni}$ to particular ones of outgoing video ports 59$_{1o}$–59$_{no}$ according to a video follows audio protocol or rule set (VFAP). Multi-port crosspoint switch 62 is, in a preferred embodiment, an 8×8 video crosspoint switch such as the MAXIM MAX456 which is a matrix of 64 T-switches that are digitally controllable. Other crosspoint switches may also function appropriately in the present invention.

Figure 5:
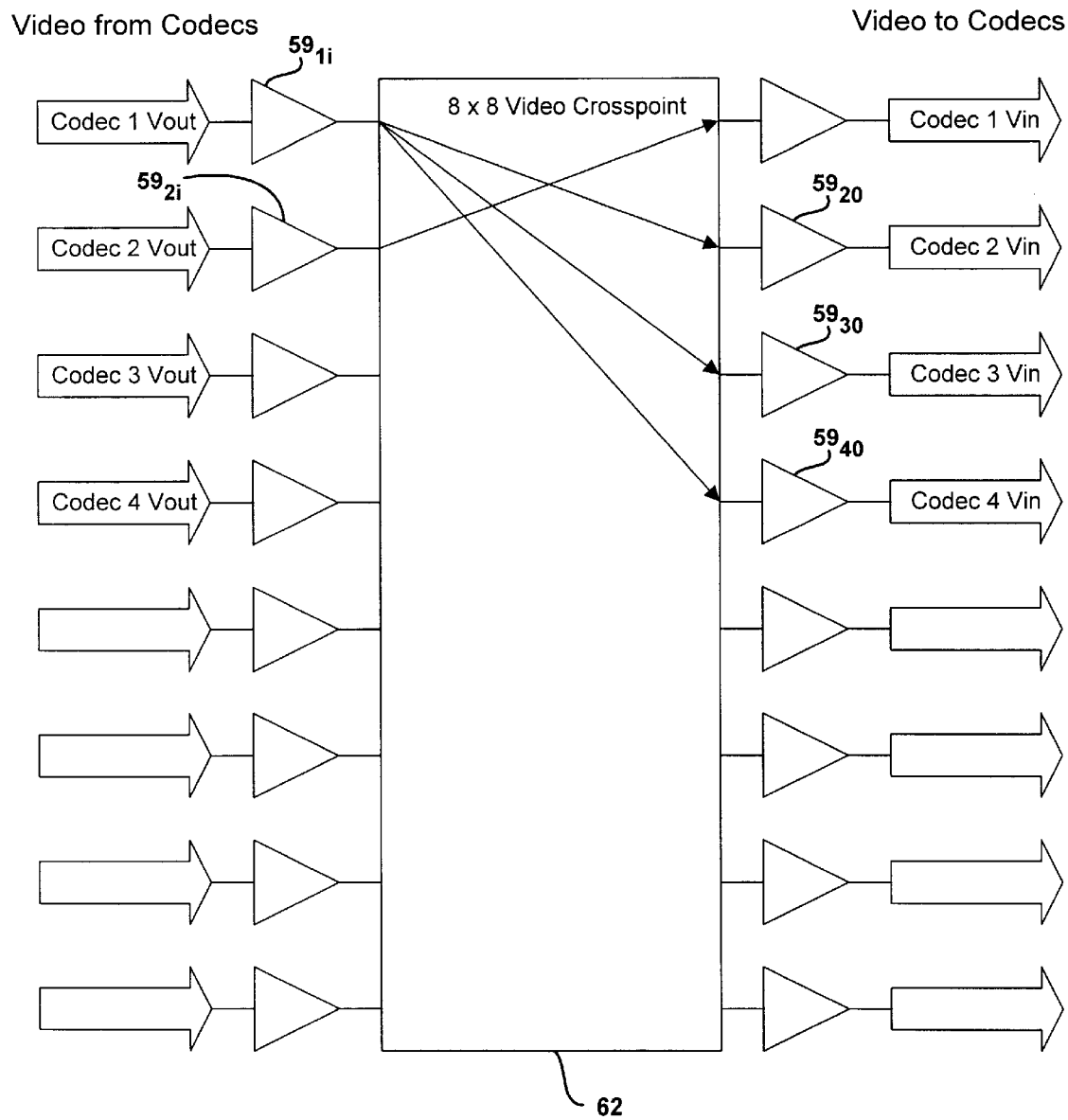
FIG. 5 depicts the configuration of a crosspoint switch in a video follows audio mode for four participants in a preferred embodiment of the present invention.

FIG. 5 depicts the configuration of crosspoint switch 62 in a VFA mode for four participants. In a preferred embodiment, the VFAP contemplates three "states" for video signals. The three states are "current speaker", "previous speaker", and "passive". The current speaker always sees the previous speaker. The previous speaker and the passives see the current speaker. When a new participant is brought into the conference, the new participant is forced into current speaker status. In FIG. 5, a participant voice signal has been detected on incoming audio port $57_{1i}$ which corresponds to CODEC $30_1$. Video from CODEC $30_1$ is therefore, conveyed by crosspoint switch 62 from incoming video port $59_{1i}$ which corresponds to CODEC $30_1$, to outgoing video ports $59_{2o}$–$59_{4o}$ which correspond to CODECs $30_2$–$30_4$. Previous to the present detection of voice on incoming audio port $57_{1i}$, voice was detected on audio port $57_{2i}$ which corresponds to CODEC $30_2$. Consequently, CODEC $30_2$ carries signals from the previous speaker and video from the present speaker from CODEC $30_1$ is, therefore, switched to CODEC $30_2$ in compliance with the VFAP as shown in FIG. 5.

FIGS. 6A, 6B, 6C, and 6D graphically illustrate the VFA mode as implemented in a preferred embodiment of the present invention. In block 70 of FIG. 6A, the conference is initialized through control signals and appropriate commands from host machine 40. In process block 72, registers Passive_Group, Previous_Speaker, and Current_Speaker are initialized and set to null. In process block 74, the Conference_Size is set to 0. The Idle Conference state represented by block 76 indicates a no action state. In block 78, the VOX timer function is serviced according to an appropriate polling schedule. Blocks 80, 82, and 84 indicate the video follows audio protocol, the VFAP, as implemented in a preferred embodiment.

Decision block 86 queries the addition of a new participant. If the query result is affirmative, process flow goes to the Add Participant? process indicated by process block 88. If the query result is negative, the process flow enters the query Participant Leaving? process indicated by process block 90. If affirmative, process flow goes to the Drop Participant routine indicated by process block 92. If negative, process flow goes to the VOX Message Received query indicated by process block 94. If a VOX Message has been received, the process goes to Process VOX as shown by process block 96 of FIG. 6A and if no VOX Message has been received, the process returns to Idle Conference at block 76.

Figure 6A:
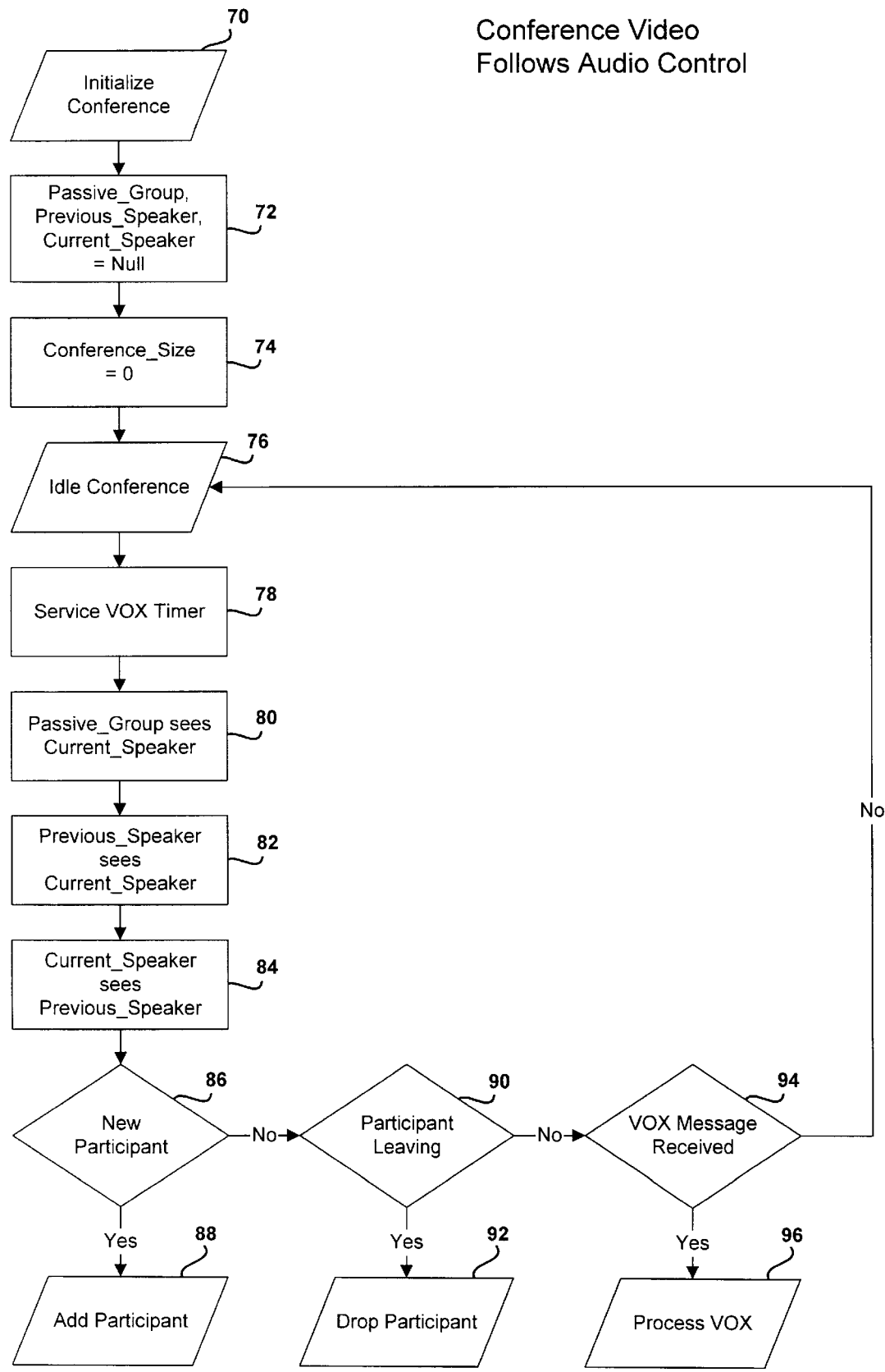
FIGS. 6A, 6B, 6C, and 6D graphically display the process for implementing a video follows audio control of video switching according to a preferred rule set in a preferred embodiment of the present invention.
Figure 6B:
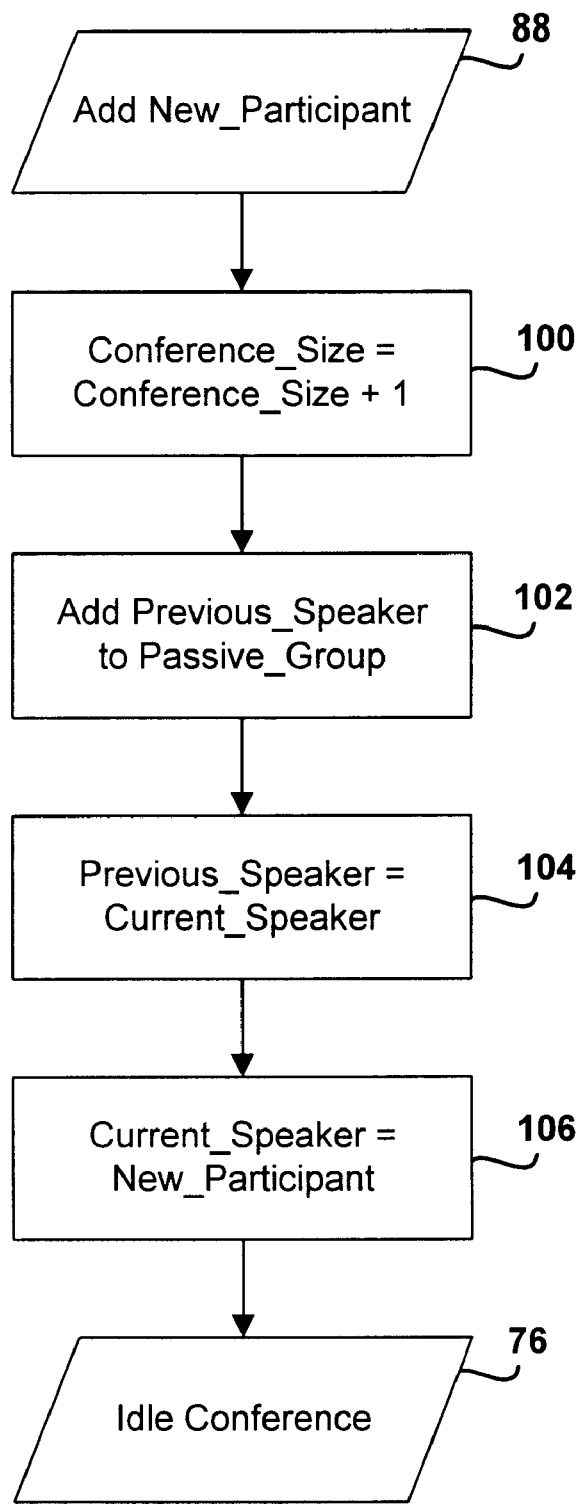

FIG. 6B graphically indicates a process for adding a new participant under the preferred VFAP in a preferred embodiment of the present invention. Register Conference_Size is incremented in process block 100. The address of Previous_Speaker is moved to Passive_Group in block 102 and the address of the Current_Speaker is moved into the Previous_Speaker register at process block 104. The address of the New_Participant is moved to Current_Speaker in process block 106 and the flow moved to Idle Conference 76.

Figure 6C:
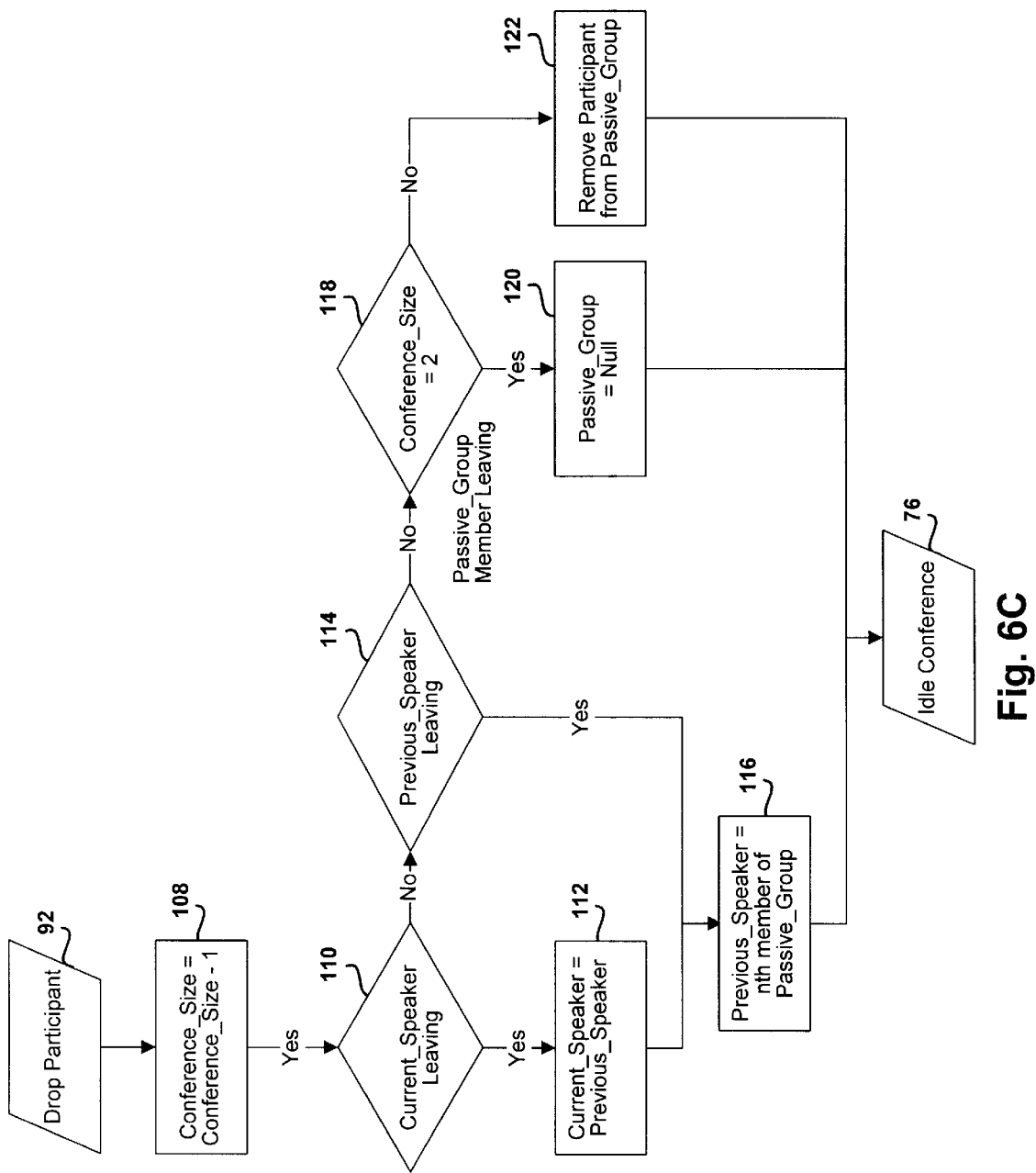

FIG. 6C graphically illustrates the process for maintaining the VFAP when a participant is dropped from the conference. Conference_Size is decremented in process block 108. Decision block 110 indicates the query of whether the Current_Speaker is leaving the conference which results, in an affirmative case, with the address of Previous_Speaker being moved to Current_Speaker as shown in block 112. If the current speaker is not leaving the conference, the deletion of the previous speaker is queried in block 114. If the previous speaker is leaving or the current speaker is leaving, the address of the nth member of the Passive_Group is moved into register Previous_Speaker as shown in process block 116. If neither the current speaker or the previous speaker is leaving, a compare Conference_Size to 2 is conducted as process block 118. If Conference_Size equals 2, then Passive_Group becomes Null as shown in process block 120. If Conference_Size does not equal 2, then the address of the participant to be dropped is removed from the Passive_Group as shown in block 122. The flow returns to Idle_Conference block 76.

Figure 6D:
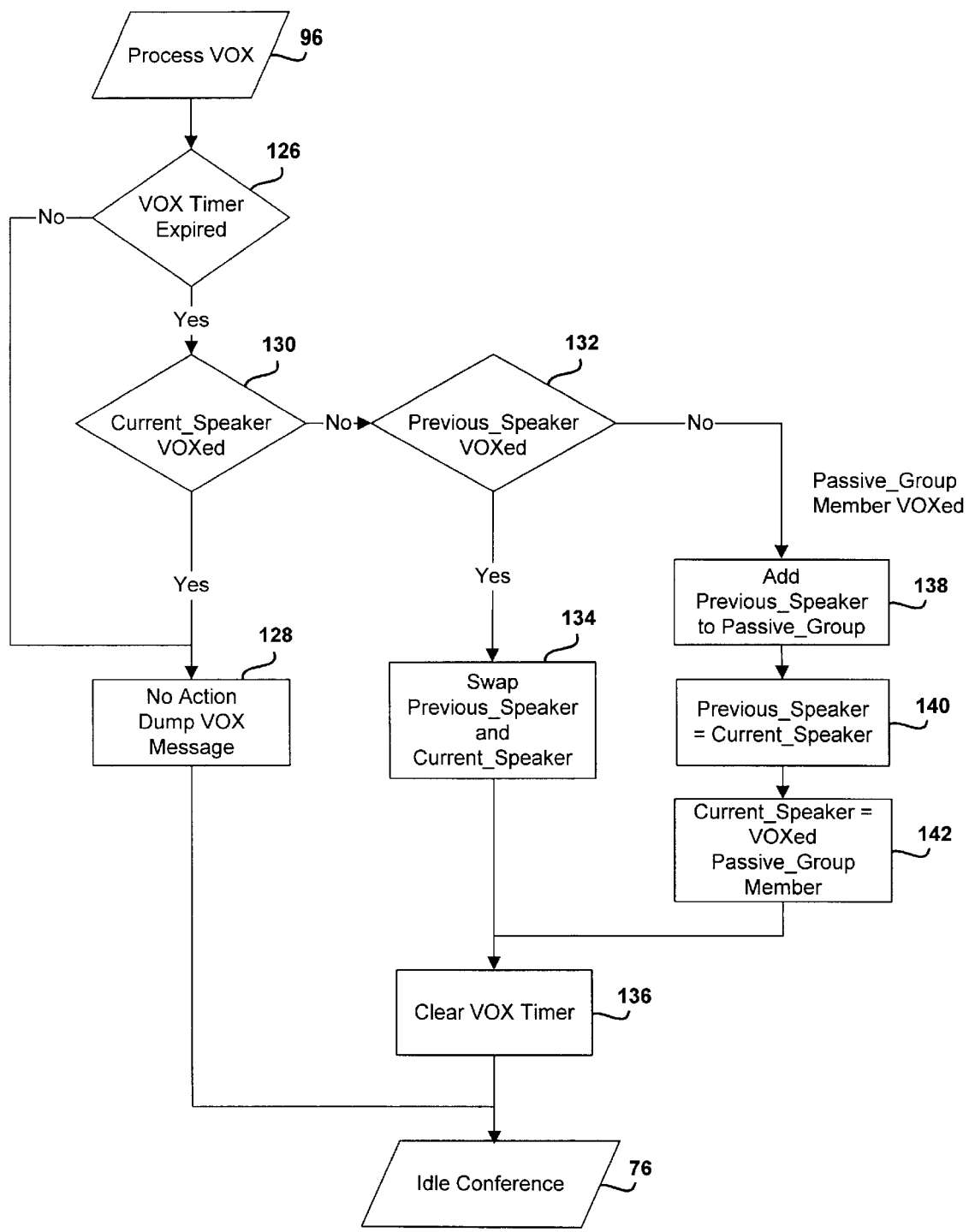

FIG. 6D graphically depicts the maintenance of the VFAP in preferred embodiment in response to particular VOX detection conditions. In decision block 126, a query determines if the VOX timer has expired. If the VOX timer has not expired, there is no action and the VOX message is discarded as shown in block 128 and the flow returned to Idle Conference 76. If the VOX timer has expired, decision block 130 indicates the query to determine if the VOX signal was detected at the address of the Current_Speaker. If the address at Current_Speaker generated the VOX signal, no action is required since the current speaker remains the current speaker and the VOX message is dumped as shown in FIG. 6D. If the address at Current_Speaker did not generate the VOX signal, an inquiry is made as depicted in process block 132 as to whether the address at Previous_Speaker generated the VOX signal. If the address at Previous_Speaker generated the VOX signal, the addresses at Previous_Speaker and Current_Speaker are swapped as shown in block 134. The VOX time is cleared as shown in block 136 and the flow returns to Idle Conference 76. If neither the address at Current Speaker or Previous Speaker generated a VOX signal, an address of a participant in the Passive_Group generated the VOX signal and the address in Previous_Speaker is moved to the Passive_Group as shown in block 138 and the address at Current_Speaker is moved to Previous_Speaker as depicted in block 140. The address of the Passive_Group member that generated the VOX signal is moved to the Current_Speaker register as shown in block 142 and the VOX timer cleared as shown in block 136.

Figure 7:
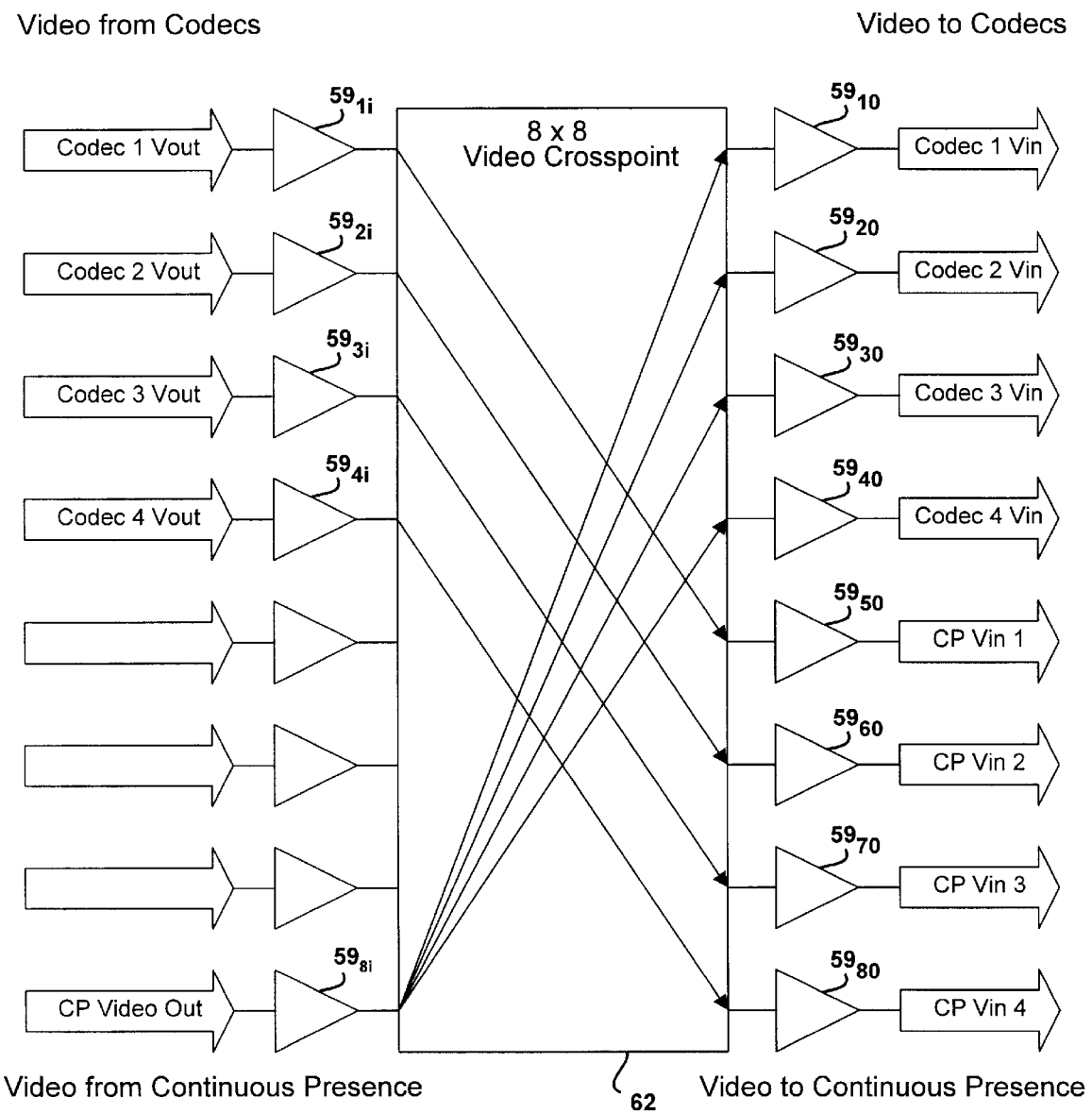
FIG. 7 illustrates the configuration of a crosspoint switch in a continuous presence mode for four participants in a preferred embodiment of the present invention.

FIG. 7 depicts the configuration of an eight-port crosspoint switch 62 in CP mode with four participants. Crosspoint switch 62 receives analog video data from CODECs $30_1$–$30_4$ on incoming video ports $59_{1i}$–$59_{4i}$. As shown, the analog video data received from CODECs $30_1$–$30_4$ is conveyed to continuous presence subsystem 36 through outgoing video ports $59_{5o}$–$59_{8o}$. Continuous presence subsystem 36 composes a combined video signal from the received four video signals and returns the combined video signal to crosspoint switch 62 through incoming video port $59_{8i}$. The received combined video signal is conveyed through crosspoint switch 62 to CODECs $30_1$–$30_4$ through outgoing video ports $59_{1o}$–$59_{4o}$.

As has been described above, control system 5 sends control signals to switch 14 to direct host machine 40 to generate in response, appropriate adaptor and CODEC conference messages. The adaptor conference messages are interpreted and executed by a microcontroller under firmware control to implement the conference directions of the control signals and the CODEC conference messages are interpreted and executed by CODEC applications to implement the conference engagement and disengagement directions of the control signals.

The Dial from the Desktop™ or control mode of switch 14 is under the direction of control system 5 that is resident on one of terminals $12_1$–$12_n$ which is connected to switch 14 through control network 20. Control system 5 communicates with host machine 40 through control network 20. In a preferred embodiment, that communication is conducted according to a set of rules or a Remote Call Control Protocol (RCCP). Those skilled in the art will recognize that other communication protocols may be implemented in other configurations of the present invention to organize communication between control system 5 and host machine 40. The RCCP of the preferred embodiment includes certain rules:

Rule 1—All commands will have a response. Some commands have a direct response such as Request Port Status or Request Call Status. Other commands without a direct response will cause a Ack or Nack message in return. For example, Set Continuous Presence does not have a direct response. Consequently, host machine 40 will send an Ack if the requested command completed successfully or a Nack if the command did not complete successfully. A timer on each command is recommended and implemented in a preferred embodiment. If the time expires before the response is received, control system 5 or host machine 40 should reissue the command or perform error recovery as is known in the art.

Rule 2–Response messages are solicited except for System Status messages from host machine 40 to control system 5 and Call Status messages from the CODEC applications to host machine 40.

Rule 3—Host machine 40 sends a Server Status message for any system state changes such as, for example, another CODEC coming online or if host machine 40 cannot communicate with the CODEC application.

Rule 4—CODEC applications send Call Status messages for any call state changes. For example, during the call setup process, the CODEC application will send to host machine 40 Call Status messages for each call state change such as Dialing, Ringing, Answered, Hanging Up, etc. These messages are forwarded to control system 5.

Rule 5—Direct communication exists only between control system 5 and host machine 40 and between the CODEC applications and host machine 40. Control system 5 does not communicate directly with the CODEC applications.

Rule 6—Ack means the command completed successfully and Nack means the command failed or could not be completed.

In a preferred embodiment, control system 5 establishes a video conference through switch 14 by first connecting to switch 14 through modem 42. Control system 5 then issues a Request Server Status command which causes host machine 40 to reply with Report Server Status. Control system 5 then issues Request Conference Status with a unique key or password as a parameter. Host machine 40 replies with Report Conference Status. The key is accepted if switch 14 is not already engaged in a conference, switch 14 is in a conference but the key matches the current conference key, or the key is a system administrator key that has priority access.

If the key is accepted, host machine 40 will "lock-out" any "meet-me" calls by sending Disable Auto Answer to each CODEC application. The CODEC applications send Ack if the command can be completed. Control system 5 will then have complete control over switch 14. If the key is not accepted, control system 5 will not be able to gain control of switch 14 but will be able to issue a Request Port Status to get CODEC configuration information which includes current phone numbers that correspond to particular ones of CODECs $30_1$–$30_n$.

Control system 5 issues Request Port (N) Status. This command is sent to each physical port on switch 14. Host machine 40 forwards these commands to appropriate corresponding ones of CODECs $30_1$–$30_n$. As each CODEC replies with Report Port (N) Status, host machine 40 forwards the Report Port (N) Status to control system 5. Control system 5 may selectably issue a Set Continuous Presence command. This command is accepted by host machine 40 if switch 14 is not in a conference, switch 14 is in a "meet-me" conference, or switch 14 is in a control mode conference directed by control system 5 and the key sent by control system 5 is valid for the on-going conference. Host machine 40 either sends a return Ack or Nack depending upon whether the Continuous Presence command can be completed or not completed respectively.

Control system 5 issues a Dial Port (N) to host machine 40. Host machine 40 then issues a Dial Port (N) CODEC conference message to a CODEC application and waits for response from the CODEC application and forwards the Report Call Status messages back to control system 5. If control system 5 does not have authority (i.e the proper key) to control the conference, host machine 40 will respond with a Nack.

Control system 5 repeats the Dial Port (N) CODEC conference message until all the desired ones of terminals $12_1$–$12_n$ are in the conference. When the conference is to be ended upon appropriate command from control system 5, host machine 40 issues a Hang-up Port (N) and/or a Hang-Up Conference command to the CODEC applications. In response, the CODECs send a Call Status message if the Hang-up command can be completed and a Nack if the command cannot be completed because the CODEC is not in a call.

The basic message structure employed in a preferred embodiment is:

CMD, PARM1, PARM2, etc. . . . where CMD is a one byte message and PARM1, PARM2 . . . are message dependent parameters. All strings have a fixed minimum length and are zero terminated. True/Enabled is defined as 0x01 and False/Disabled is defined as 0x00. Port numbers are zero based so that $CODEC_1$ is port 0 and $CODEC_2$ is port 1 for example. Table 1 describes the structures for CODEC and adaptor conference messages employed by control system 5 in a preferred embodiment of the present invention.

TABLE 1

| Command | Byte | Content | Form |
|---|---|---|---|
| Request Server Status | Byte 1 | Message Number | 0x02 |
| Report Server Status | Byte 1 | Message Number | 0x03 |
|  | Byte 2 | Number of Ports | 0 to Max Ports |
|  | Byte 3 | Meet Me INI Setting | True/False |
|  | Byte 4 | Continuous Presence Avail. | True/False |
|  | Byte 5 | Dial From Desktop ™ Avail. | True/False |
|  | Byte 6 + n*2 | Port (n) Available | True/False |
|  | Byte 7 + n*2 | Port (n) Reserved | 0x00 |
| Request Conference Status | Byte 1 | Message Number | 0x04 |
|  | Byte 2–17 | Password (Key) | ASCII |
|  | Byte 18 | String Termination | 0x00 |
| Report Conference Status | Byte 1 | Message Number | 0x05 |
|  | Byte 2 | Conference in Progress | True/False |
|  | Byte 3 | Conference Type | Meet Me or Dial from Desktop ™ |
|  | Byte 4 | Video Format | CP/VFA |
|  | Byte 5 | Conference Key Accepted | True/False |
| Request Port Status | Byte 1 | Message Number | 0x06 |
|  | Byte 2 | Port Number | 1-Max Ports |
| Report Port | Byte 1 | Message Number | 0x06 |

TABLE 1-continued

| Command | Byte | Content | Form |
|---|---|---|---|
| Status | | | |
| | Byte 2 | Port Number | |
| | Byte 3 | Available | True/False |
| | Byte 4–23 | Phone Number 1 | ASCII |
| | Byte 24 | Termination | 0x00 |
| | Byte 25–44 | Phone Number 2 | ASCII |
| | Byte 46 | Termination | 0x00 |
| | Byte 47 | Restricted | True/False |
| Request Call Status | Byte 1 | Message Number | 0x08 |
| | Byte 2 | Port Number | 0-Max Ports-1 |
| Report Call Status | Byte 1 | Message Number | 0x09 |
| | Byte 2 | Port Number | 0-Max Ports-1 |
| | Byte 3 | Status | Ringing, Answered |
| | Byte 4 | Extended Error Code | Valid if Status=0xFF |
| | Byte 5–85 | Status String | ASCII |
| | Byte 86 | Null Termination | 0x00 |
| Set Continuous Presence | Byte 1 | Message Number | 0x0A |
| | Byte 2 | Mode | Enabled/Disabled |
| Set Auto Answer | Byte 1 | Message Number | 0x0B |
| | Byte 2 | Auto Answer Enabled | True/False |
| Dial Port | Byte 1 | Message Number | 0x0C |
| | Byte 2 | Port Number | 0 to Max Port-1 |
| | Byte 4–23 | Phone Number 1 | ASCII |
| | Byte 24 | Reserved | 0x00 |
| | Byte 25–44 | Phone Number 2 | ASCII |
| | Byte 46 | Reserved | 0x00 |
| | Byte 47 | Restricted | True/False |
| Hang up Port | Byte 1 | Message Number | 0x0D |
| | Byte 2 | Port Number | |
| End Conference | Byte 1 | Message Number | 0x0E |
| ACK | Byte 1 | Message Number | 0x0F |
| NACK | Byte 1 | Message Number | 0x10 |

Figure 8:
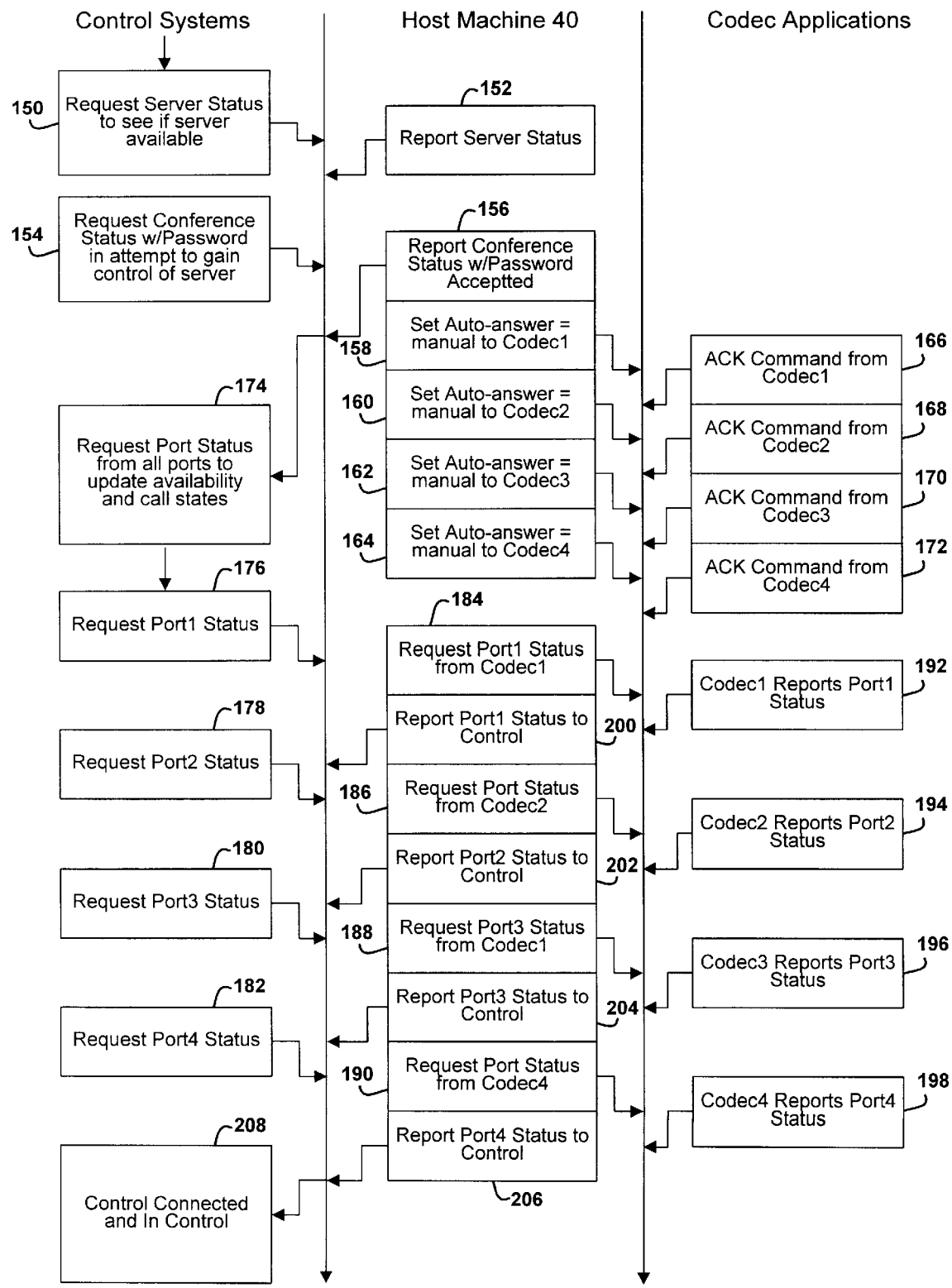
FIG. 8 depicts the procedure for a control system to connect to a video conferencing switch in a preferred embodiment of the present invention.
Figure 9:
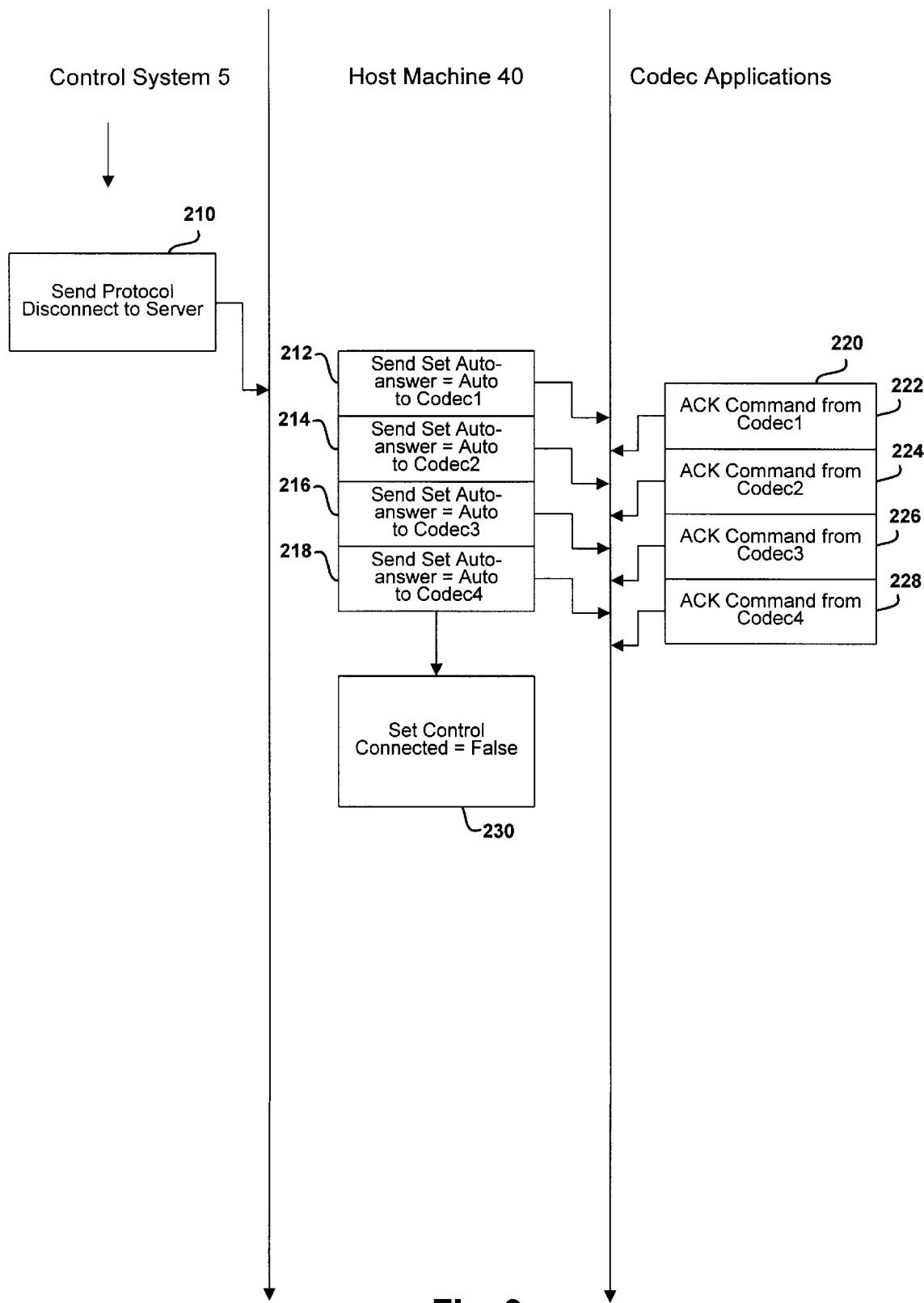
FIG. 9 depicts the procedure for a control system to disconnect to a video conferencing switch in a preferred embodiment of the present invention.
Figure 10:
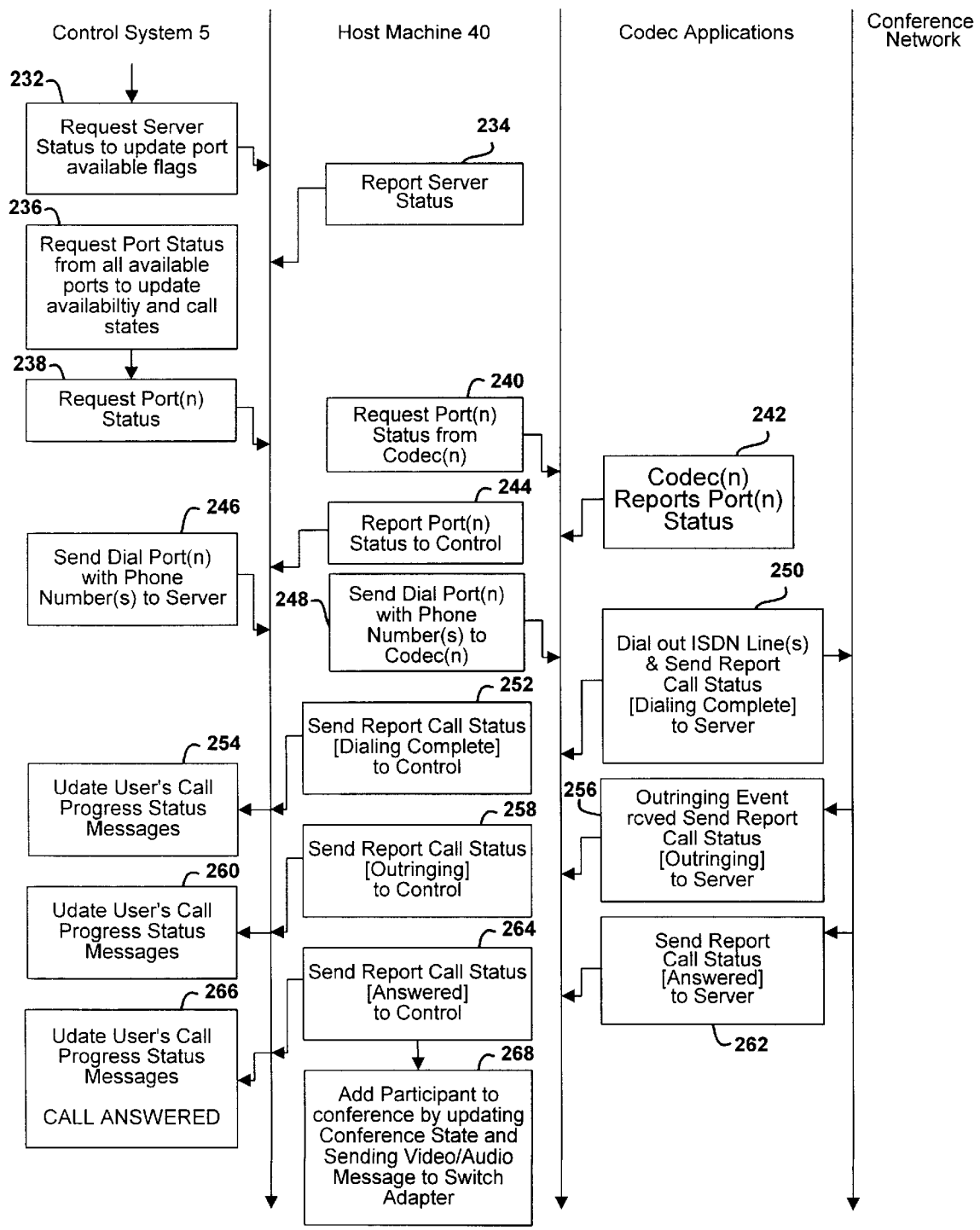
FIG. 10 illustrates the procedure for a control system to direct a video conferencing switch to add a participant to a video conference.

FIG. 8 depicts the flow of conference messages employed by control system 5 to gain control over switch 14 in a preferred embodiment of the present invention in which a four-way conference is contemplated. In FIGS. 8, 9, 10, and 10, references to "server" or "Server" are references to host machine 40. As shown in block 150 of FIG. 8, control system 5 issues a Request Server Status command to host machine 40 which responds in block 152 with Report Server Status. In block 154 control system 5 issues a Request Conference Status w/Password in an attempt to gain control. If the password or key is accepted, host machine 40 responds to control system 5 with Report Conference Status as depicted by block 156 and sends messages to CODECs $30_1$–$30_4$ to Set Auto-answer to manual as shown in blocks 158, 160, 162, and 164. Those messages to CODECs $30_1$–$30_4$ are acknowledged with ACK's as shown by blocks 166, 168, 170, and 172. After Report Conference Status has been returned, control system 5 issues a Request Port Status to all ports to update availability as described in block 174 and issued to each of ports 1–4 in blocks 176, 178, 180, and 182. As shown in FIG. 8, host machine 40 then solicits corresponding CODEC port status reports as shown in blocks 184, 186, 188, and 190. The CODEC applications respond to host machine 40 with Report Port (N) Status messages as shown in blocks 192, 194, 196, and 198. Host machine 40 signals control system 5 with Report Port (N) Status as shown in blocks 200, 202, 204, and 206 resulting in control system 5 being in control of switch 14 as indicated by block 208.

FIG. 9 illustrates the disconnection of control system 5 from switch 14. As indicated by block 210, control system 5 sends a Disconnect Protocol to host machine 40. In response, host machine 40 generates Set Auto Answer messages to each of CODECs $30_1$–$30_4$ as indicated by blocks 212, 214, 216, and 218 which respond as shown in blocks 220, 222, 224, 226, and 228 with ACK. A register in host machine 40 indicating the connection status of control system 5 is set to False as shown in block 230.

FIG. 10 shows the procedure conducted by control system 5 to engage a participant in a conference. In block 232, control system 5 issues a Request Server Status to which host machine 40 responds with Report Server Status as shown in block 234. Control system 5 issues Request Port Status from all available ports as shown in blocks 236 and 238. In turn, host machine 40 sends a Request Port Status message to CODECs $30_1$–$30_n$ which respond by returning Report Port(N) Status to host machine 40 as indicated by blocks 240 and 242. Report Port(N) Status is reported to control system 5 as shown by block 244 and control system 5 issues appropriate Send Dial Port(N) messages with phone numbers to host machine 40 in block 246. Host machine 40 forwards Send Dial Port(N) messages to CODECs $30_1$–$30_n$ as shown in block 248. In block 250, CODECs $30_1$–$30_4$ dial out on conference network 18 which, in the depicted preferred embodiment, is comprised of one or more ISDN lines and return Report Call Status back related to completed dialing to host machine 40. The completion of dialing is reported back to control system 5 by host machine 40 in block 252 and control system 5 updates the participant's call progress status messages as shown in block 254. In block 256, conference network 18 acknowledges the dialing and the CODEC application sends Report Call Status message to host machine 40. Host machine 40 sends Report Call Status to control system 5 in block 258 and control system 5 updates the user's Call Progress Status Messages in block 260. When an answer is confirmed by the CODEC application, a Report Call Status message is sent to host machine 40 as indicated in block 262 and the Report Call Status message is sent by host machine 40 to control system 5 as indicated by block 264. Control system 5 updates the user's call Progress Status Messages indicating that the call has been answered as shown in block 266 and host machine 40 updates the Conference State and sends a Video/Audio message to crosspoint adaptor 32 as indicated by block 268. The Video/Audio message is interpreted by microprocessor 50 under the direction of firmware in ROM 51 to configure the crosspoint adaptor for audio and video appropriate for the desired conference configuration.

Figure 11:
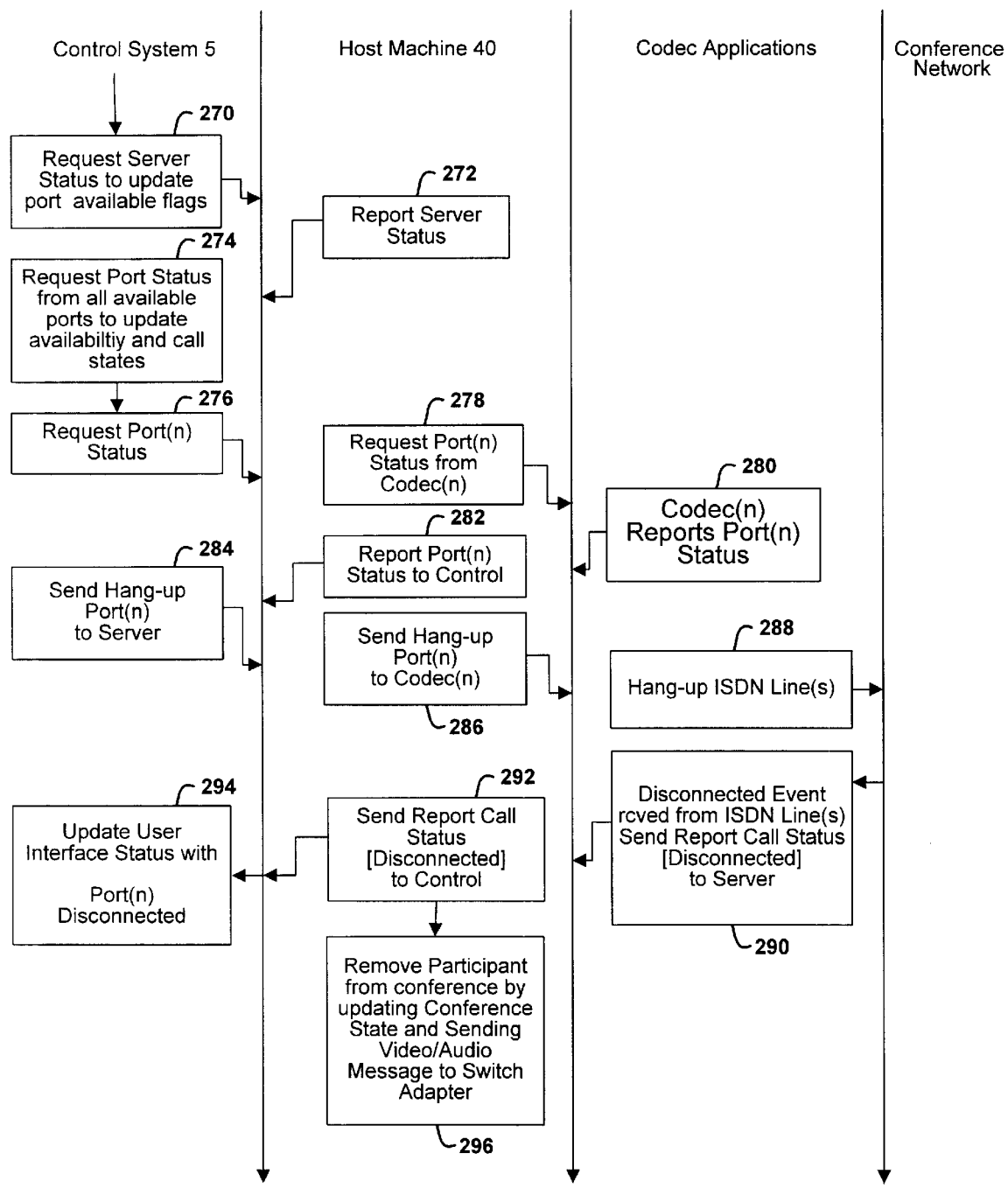
FIG. 11 depicts the procedure for a control system to direct a video conferencing switch to drop a participant to a video conference.

FIG. 11 graphically illustrates a hang-up process in a preferred embodiment of the present invention as directed by control system 5. In block 270, control system 5 issues a Request Server Status to appropriately set port availability flags and in block 272, host machine 40 returns Report Server Status. Control system 5 issues a Request Port Status from all available ports as indicated by blocks 274 and 276. In block 278, host machine 40 sends the Request Port(N) Status to CODECs $30_1$–$30_n$ which respond with Report Port(N) Status in block 280. Report Port(N) Status is sent to control system 5 in block 282. Control system 5 issues a Hang-up Port(N) control signal to host machine 40 in block 284. Host machine 40 sends Hang-up Port(N) to CODECs $30_1$–$30_n$ in block 286 and the CODEC applications correspondingly issue Hang-up signals to the corresponding ISDN lines of conference network 18 as depicted by block 288. A Disconnect Event is received by the CODEC applications in block 290 and a Report Call Status (of disconnect)

is sent to host machine 40. Host machine 40 then reports the disconnect with a Report Call Status back to control system 5 in block 292 and control system 5 updates the User Interface Status with the disconnect information as shown in block 294. Host machine 40 updates its Conference State and sends a Video/Audio conference message to crosspoint adaptor 32 in block 296. The Video/Audio message is interpreted by microprocessor 50 under the direction of firmware in ROM 51 to configure the crosspoint adaptor for audio and video appropriate for the desired conference configuration.

In a preferred embodiment, the same terminal may be used for conference participation and conference control even though the conference network is distinct from the control network. In FIG. 1, for example, terminal 12, is connected to both conference network 18 and control network 20 and has resident control system 5. For actual video conference participation, terminal 12, and terminals $12_2$–$12_n$ also include a video conferencing application and audio and video generation means such microphones and cameras which are readily available from a variety of vendors in the art.

Control system 5 is preferably accessed through a graphical user interface and operates in a Windows® 95 or Windows® NT operating system environment. Graphical icon generation in the Microsoft® Windows® environment is well understood in the art and will not be discussed in detail here. Although other languages may be employed, control system 5 is preferably written in Visual Basic. References in the specification or drawings to "Dtapp" or "DT" are references to a particular embodiment of control system 5 as implemented by the inventors.

Figure 12:
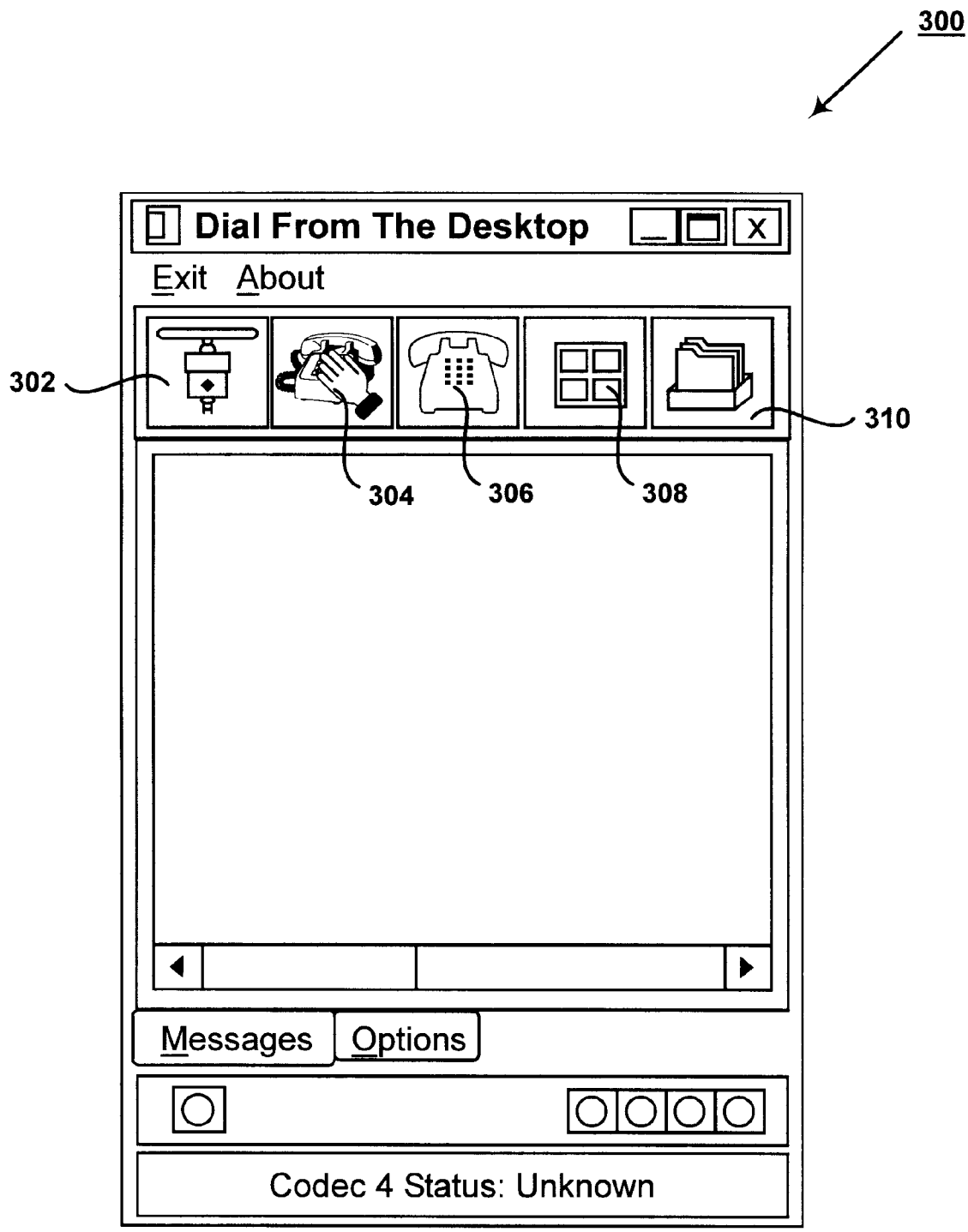
FIG. 12 is a graphical screen representation of a control system interface employed to give video conference participant access to a control system through which the participant may direct a video conferencing switch to configure and direct a video conference in accordance with the present invention.

FIG. 12 is a graphical screen representation of a control system interface 300 as may be employed on exemplar terminal $12_1$ to give a terminal user or video conference participant access to control system 5 through which the participant may direct switch 14 to configure and direct a video conference. As is familiar to those of ordinary skill, either keyboard manipulation or mouse cursor control may be employed to manage control system interface 300. Consequently, video conference participants may be dialed from the desktop when control system interface 300 is employed in a PC or workstation environment. Shown in FIG. 12 is image icon 302 illustrating the image of a connection to represent the process of connection of control system 5 to switch 14 previously iterated in FIG. 8 and disconnection from switch 14 as iterated in prior FIG. 9. Dial image icon 304 represents the process of placing a Dial Request with switch 14 as earlier described with reference to FIG. 10. Hang-up image icon 306 represents the process of placing a Hang-up Request with switch 14 as earlier described with reference to FIG. 11. Image icon 308 represents the process of placing a request for a CP mode conference format. Directory image icon 310 represents the process of accessing a directory of possible conference participants.

Figure 13A:
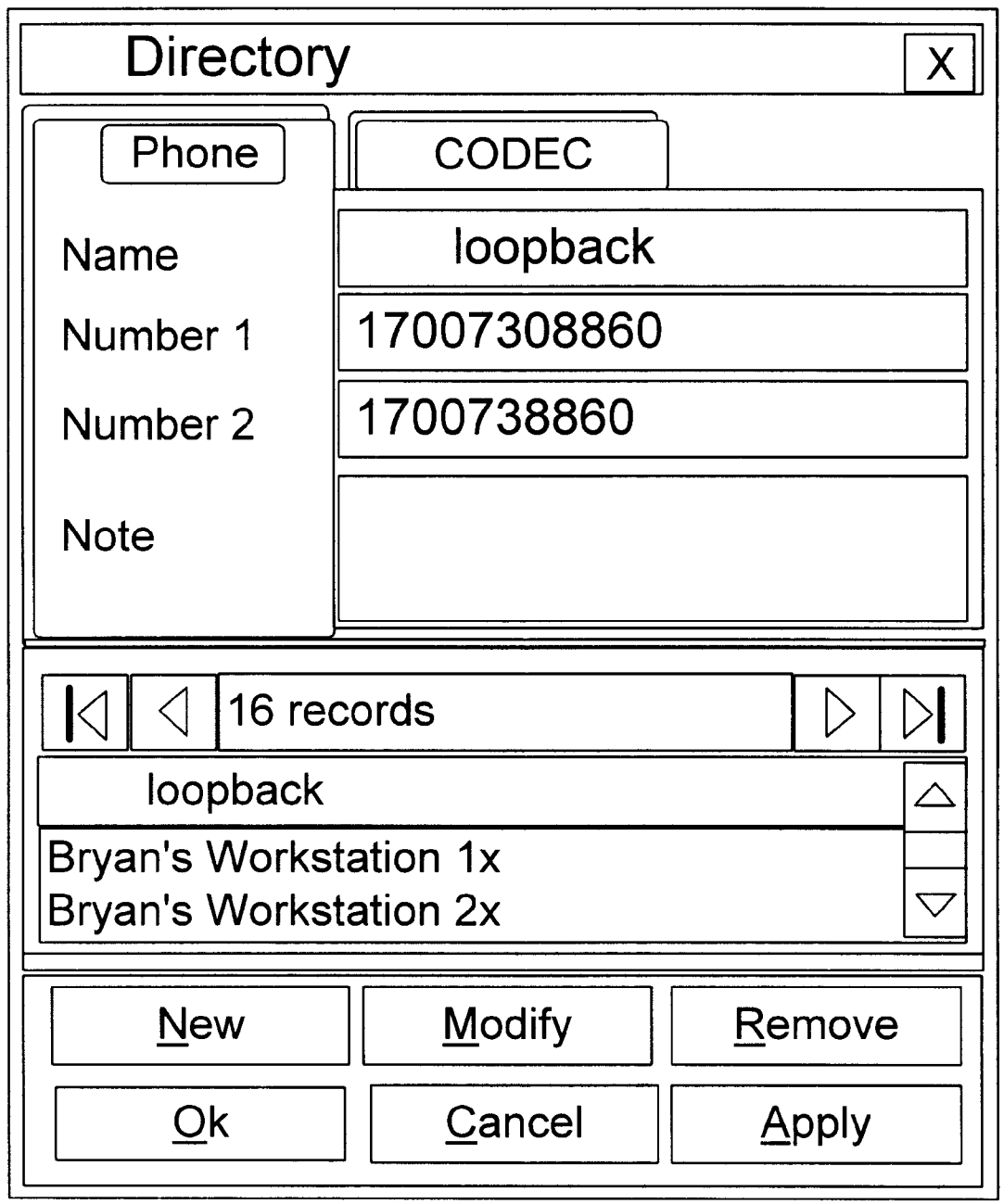
FIGS. 13A and 13B are a graphical screen representations of the control system interface directory function in a preferred embodiment of the present invention.
Figure 13B:
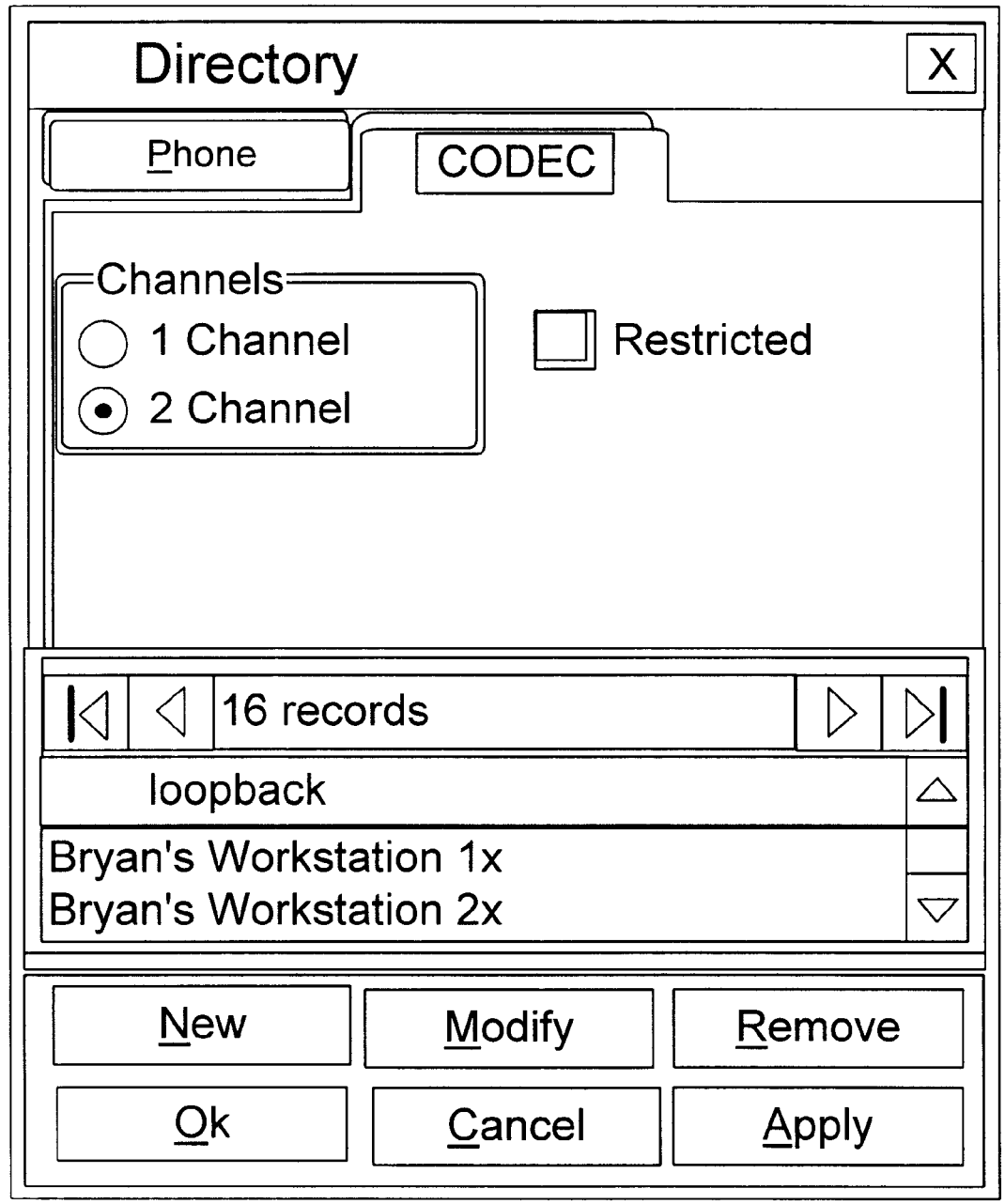

FIGS. 13A and 13B are a graphical screen representations of the directory function of control system interface 300 accessed by clicking on the directory image icon 310 of prior FIG. 12. As shown in FIG. 13A, particular phone number assignments may be made through the directory function and, as shown in FIG. 13B, particular ones of CODECs $30_1$–$30_n$ can be associated with particular ones of terminals $12_1$–$12_n$ which were assigned particular phone numbers by the process shown in FIG. 13A.

Figure 14:
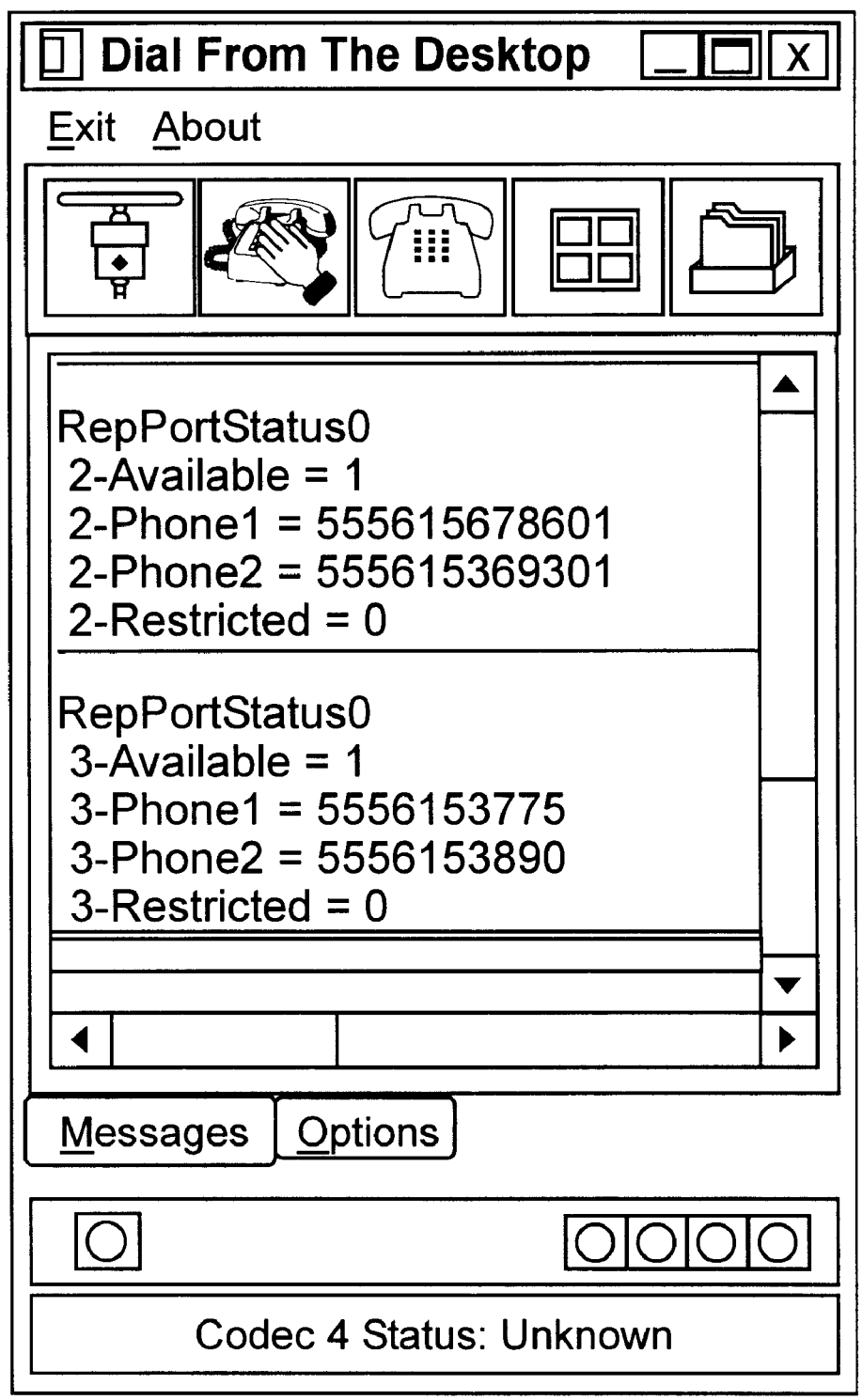
FIG. 14 is a graphical screen representation of the control system interface reporting the results of an inquiry in a preferred embodiment of the present invention.

FIG. 14 is a graphical screen representation of control system interface 300 reporting the results of a Port Status(n) inquiry. As shown in FIG. 14, two phones numbers are available at each port.

Figure 15:
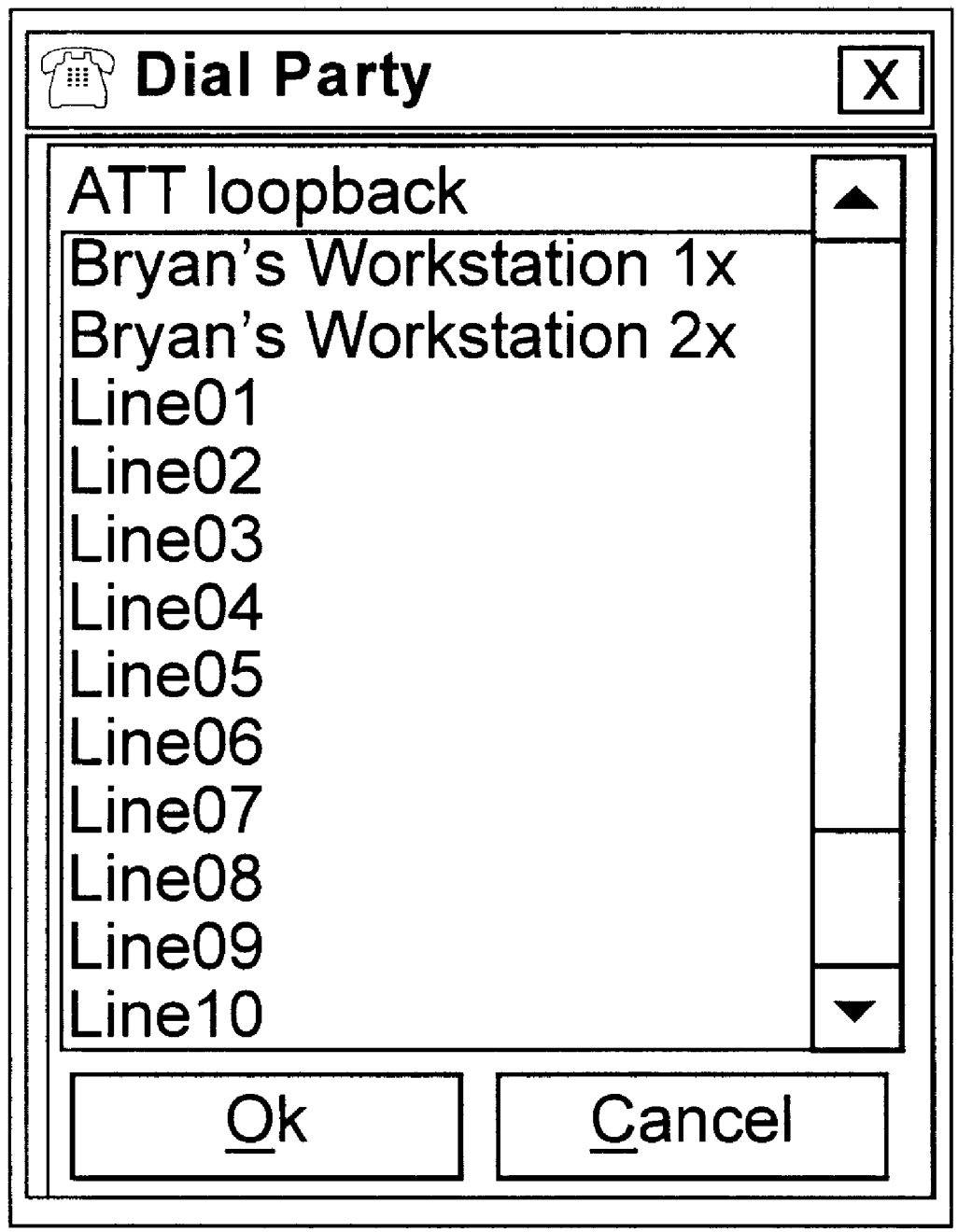
FIG. 15 is a graphical screen representation of control system interface configured to process a dial function on selected numbers in a preferred embodiment of the present invention.

FIG. 15 is a graphical screen representation of the dial function of control system interface 300 as accessed by clicking on dial image icon 304 earlier depicted in FIG. 12.

Figure 16:
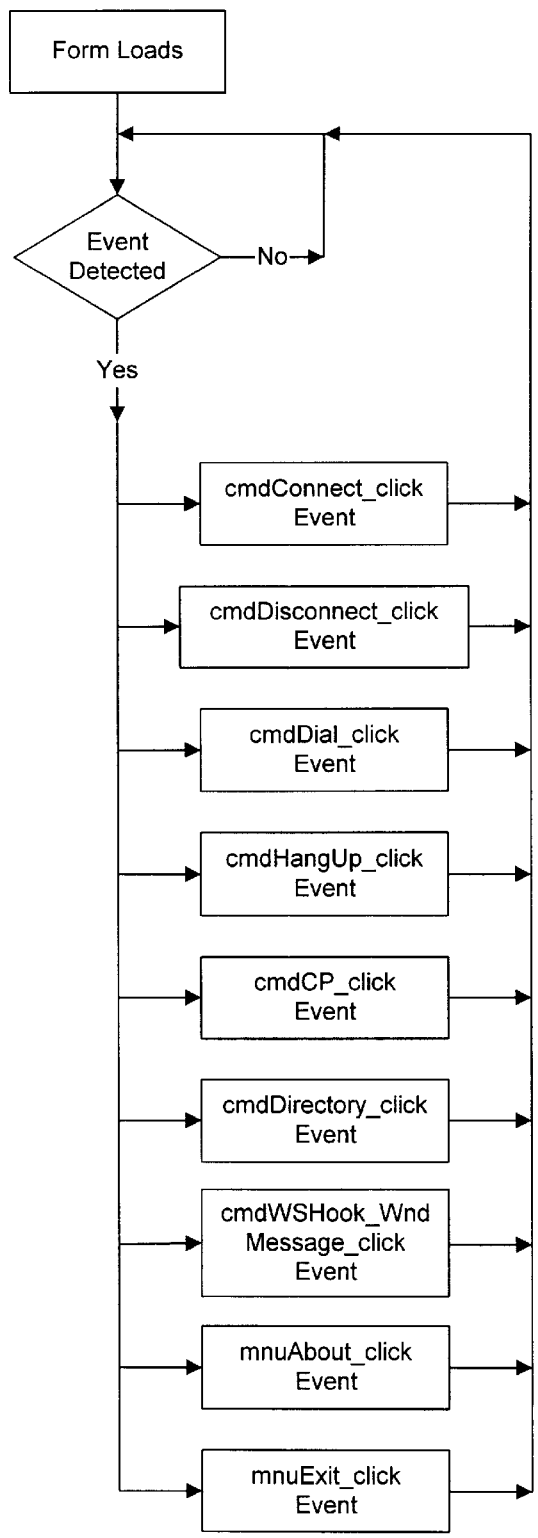
FIG. 16 is a graphical depiction of a high level event diagram of a control system in a preferred embodiment of the present invention.

FIG. 16 is a graphical depiction of a the high-level event loop diagram of a control system in a preferred embodiment of the present invention. As shown in FIG. 16, after loading forms, if an event has been detected, control system 5 determines which of the events depicted in FIG. 16 has been detected and handles the detected event according to the corresponding flow diagrams depicted in following FIGS. 17–29. FIGS. 16–29 provide description for control system 5. As those skilled in the art will recognize, in the depicted preferred embodiment, control system 5 operates in a Windows® 95 or Windows® NT operating system environment. Other operating systems may be employed with alternative embodiments of the present invention. As non-exhaustive examples, the Apple® operating systems or OS2®, Linux, or any of the varieties of UNIX® may be employed as an operating environment in alternative embodiments of the present invention. Consequently, the flow diagrams of FIGS. 16–29 are adapted for a preferred embodiment and may change depending upon the chosen particular implementation of the present invention.

Figure 17:
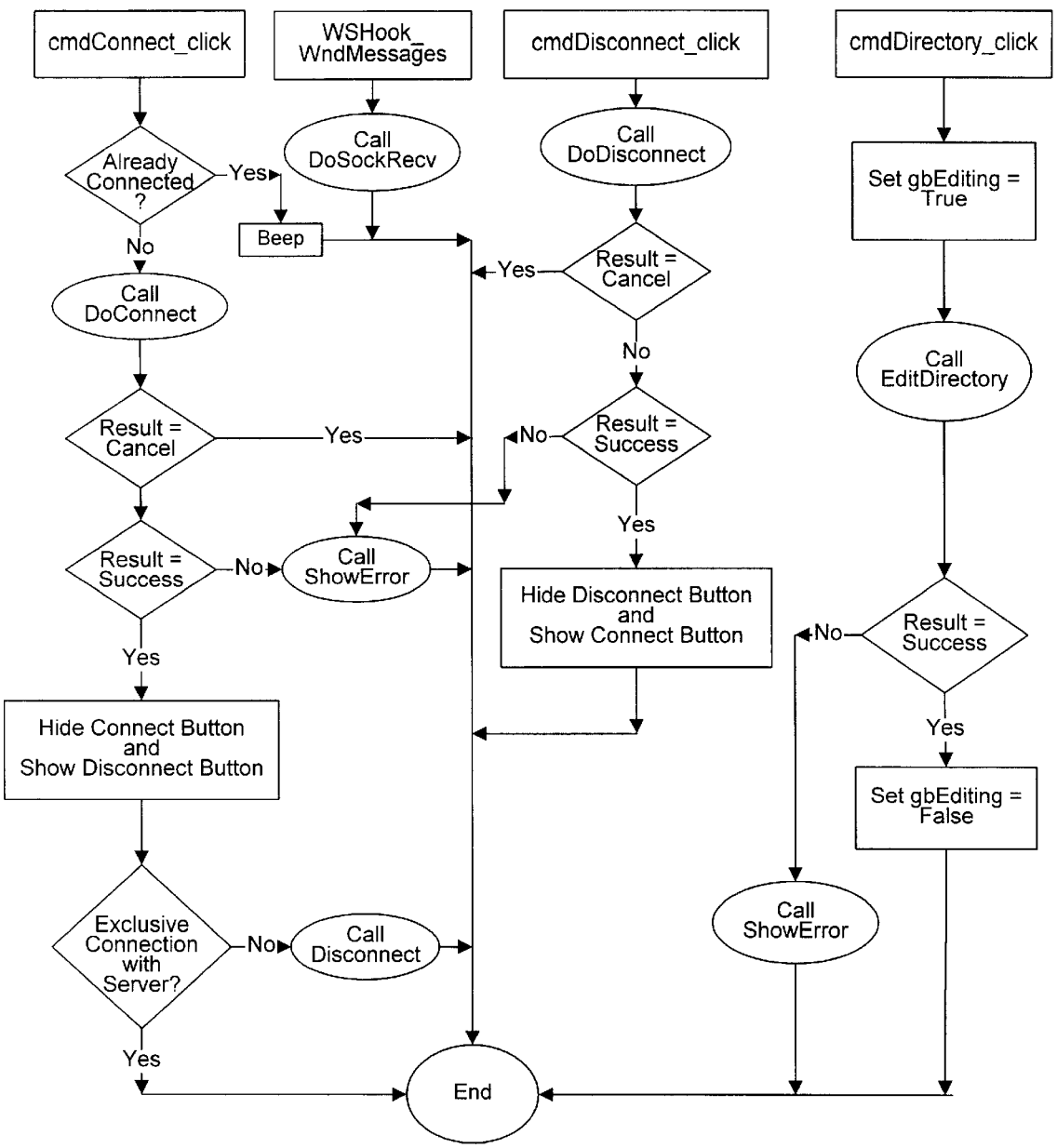
FIG. 17 is a graphical depiction a control system flow for handling Connect, WinSock and Windows Messages, Disconnect, and Directory command events in a preferred embodiment of this invention.

FIG. 17 is a graphical depiction of control system 5 flow for handling Connect, WinSock and Windows Messages, Disconnect, and Directory command events.

Figure 18:
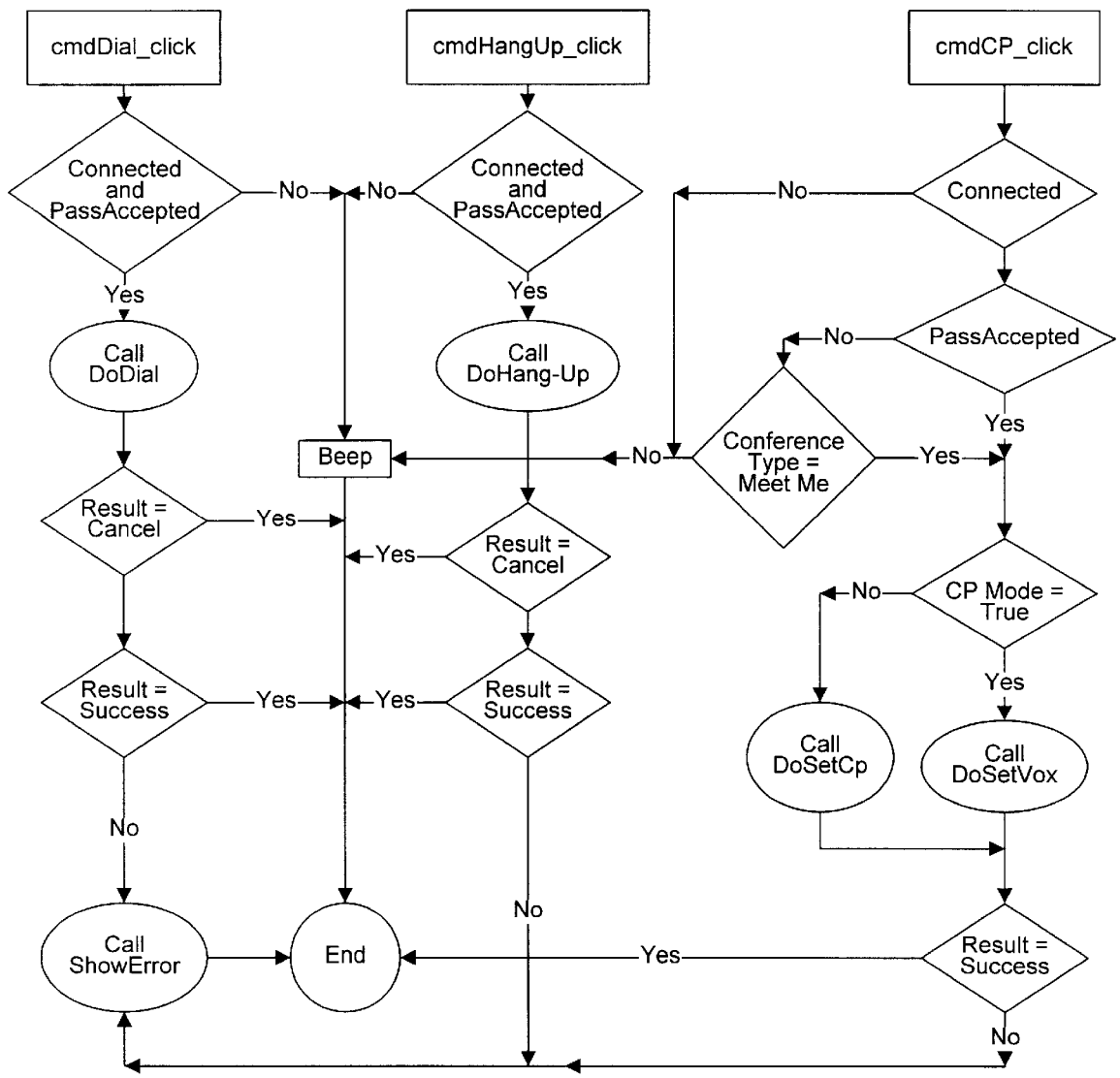
FIG. 18 is a graphical depiction of a control system flow for handling Dial, HangUp, and Continuous Presence mode command events in a preferred embodiment of the present invention.

FIG. 18 is a graphical depiction of control system 5 flow for handling Dial, HangUp, and Continuous Presence mode command events.

Figure 19A:
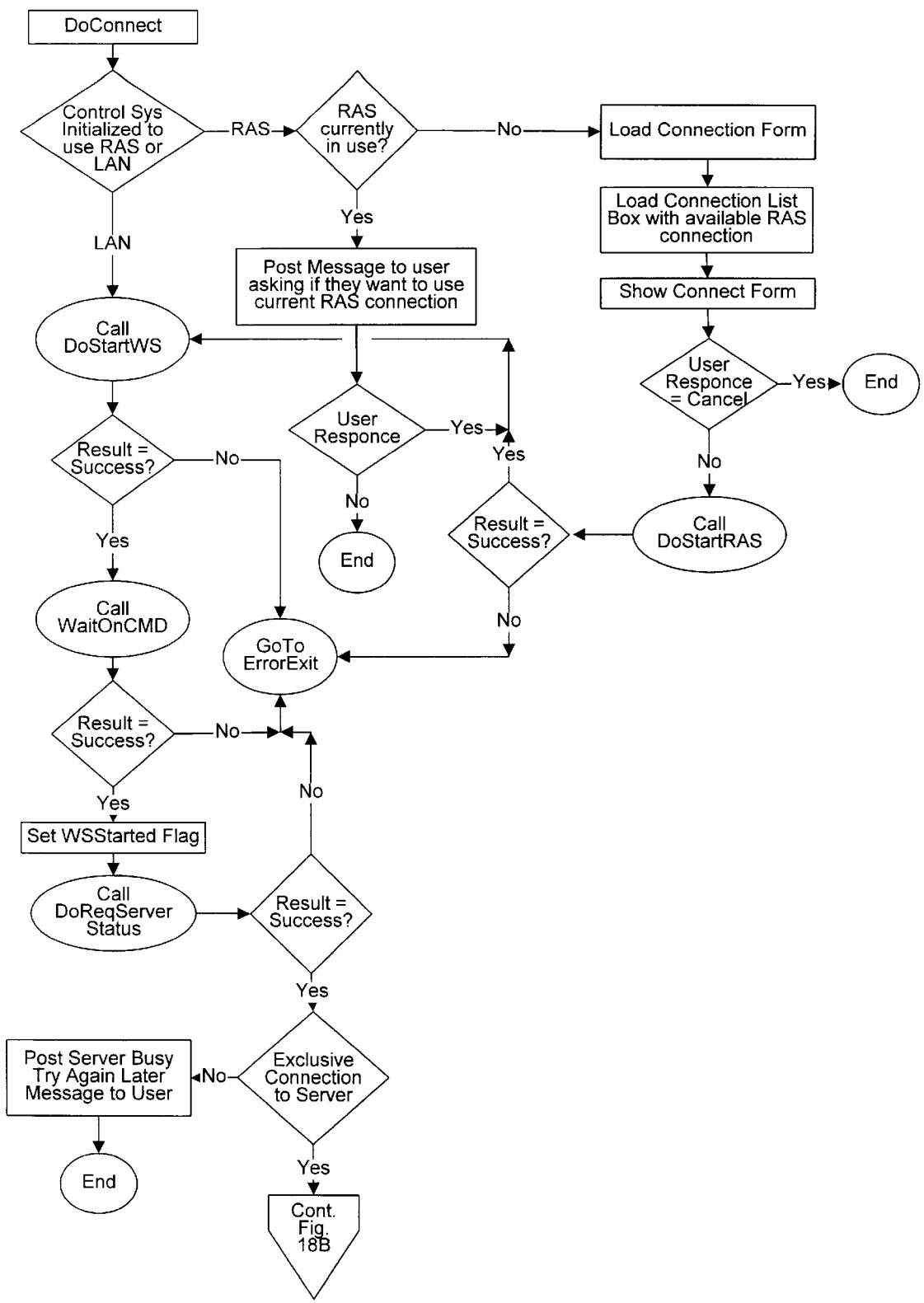
FIGS. 19A and 19B are graphical depictions a control system handling of a Connect command event in a preferred embodiment of the present invention.
Figure 19B:
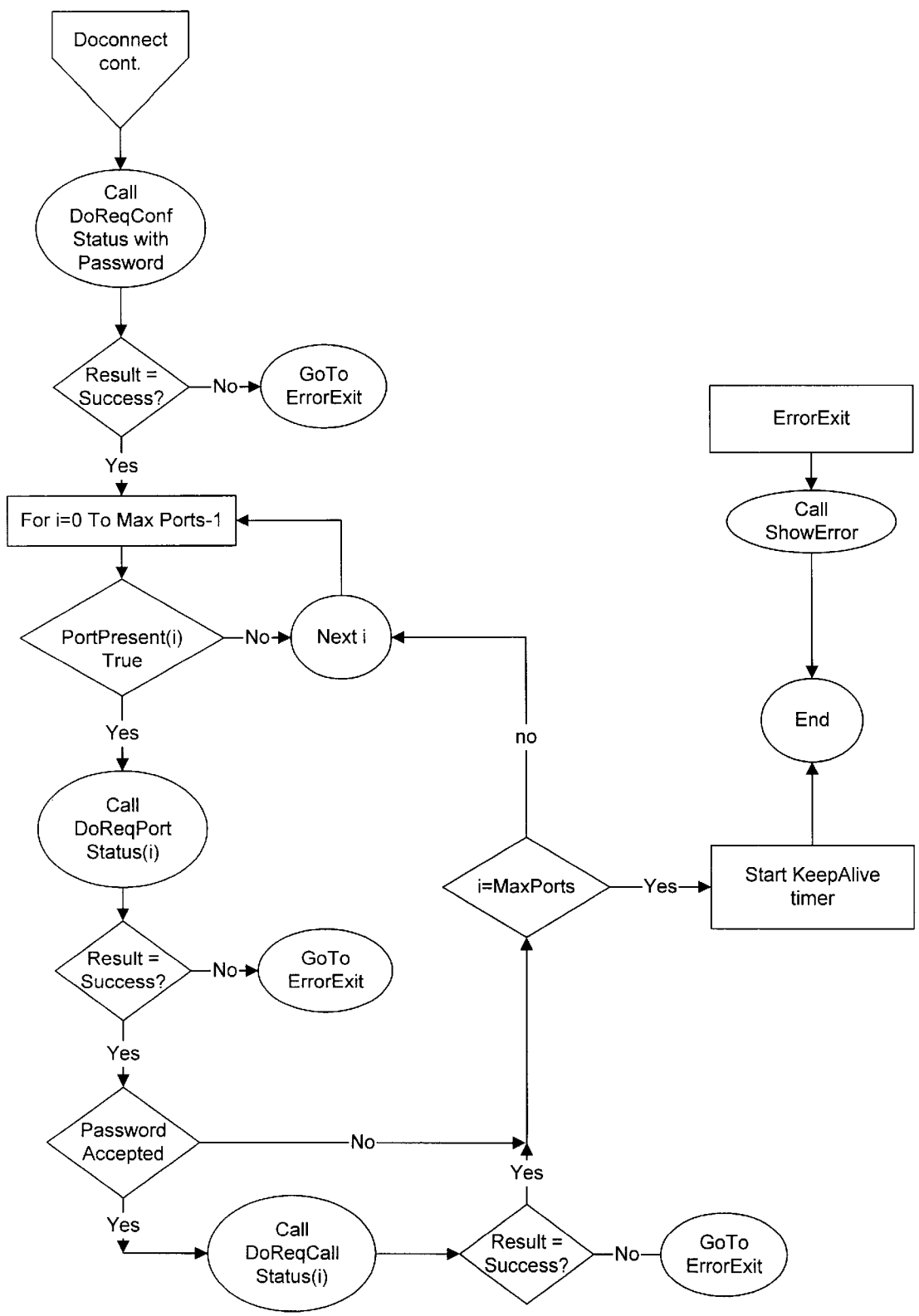

FIGS. 19A and 19B are graphical depictions of control system 5 handling of a Connect command event.

Figure 20:
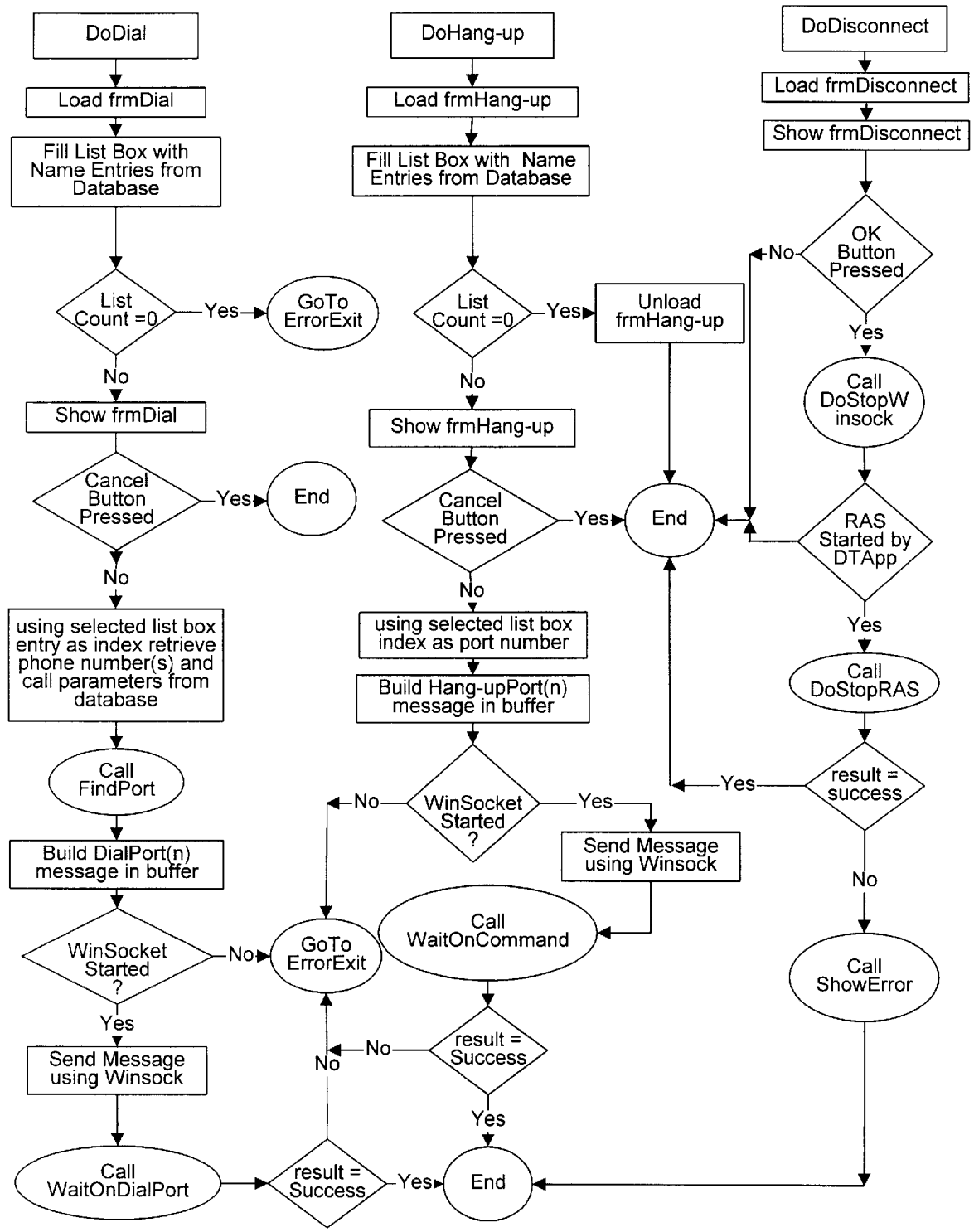
FIG. 20 is a graphical depiction of a control system handling of Dial, Hang-up, and Disconnect command events in a preferred embodiment of the present invention.

FIG. 20 is a graphical depiction of control system 5 handling of Dial, Hang-up, and Disconnect Events.

Figure 21:
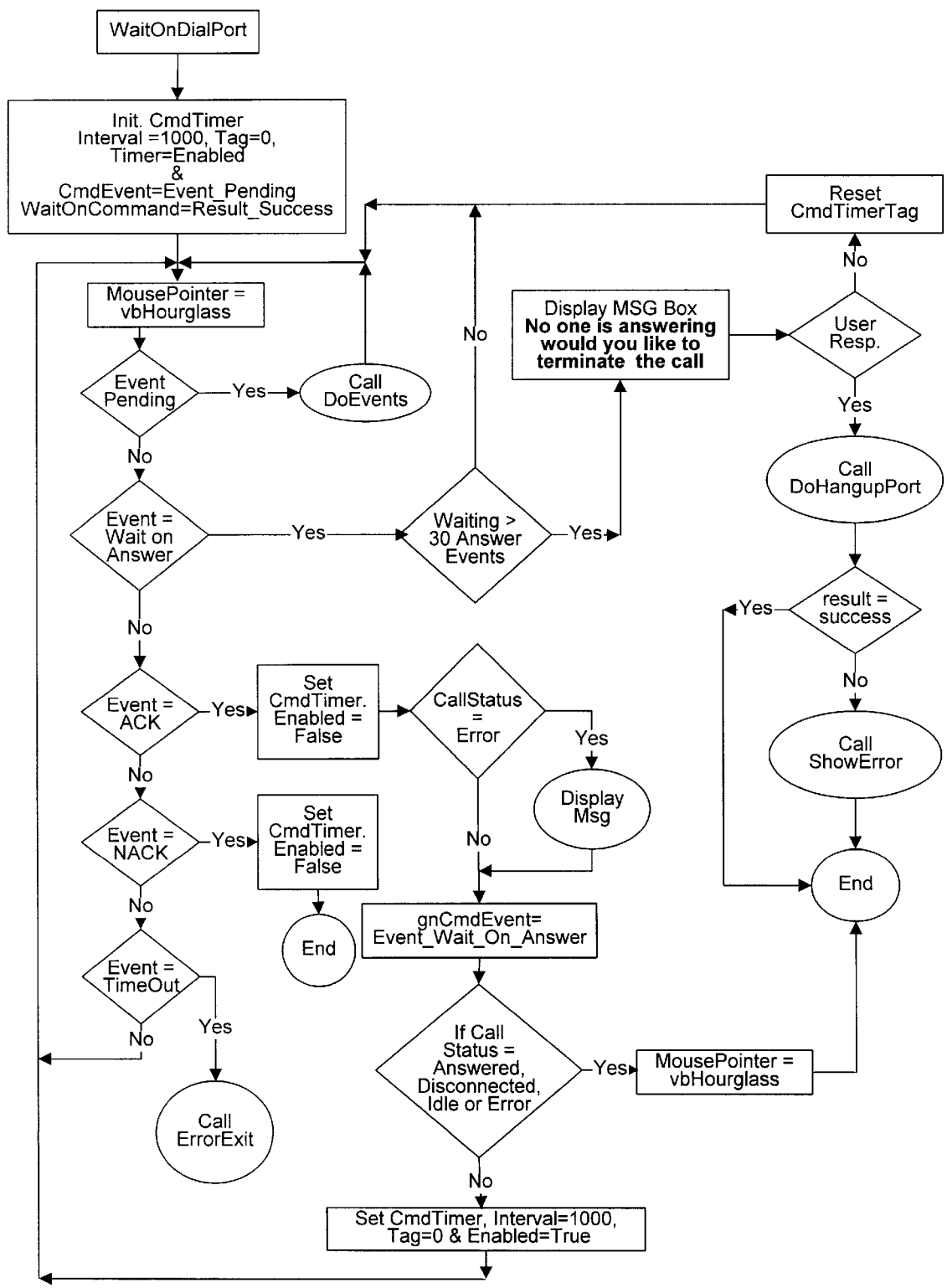
FIG. 21 is a graphical depiction of a control system handling of the WaitOn DialPort events in a preferred embodiment of the present invention.

FIG. 21 is a graphical depiction of control system 5 handling of the WaitOn DialPort event.

Figure 22:
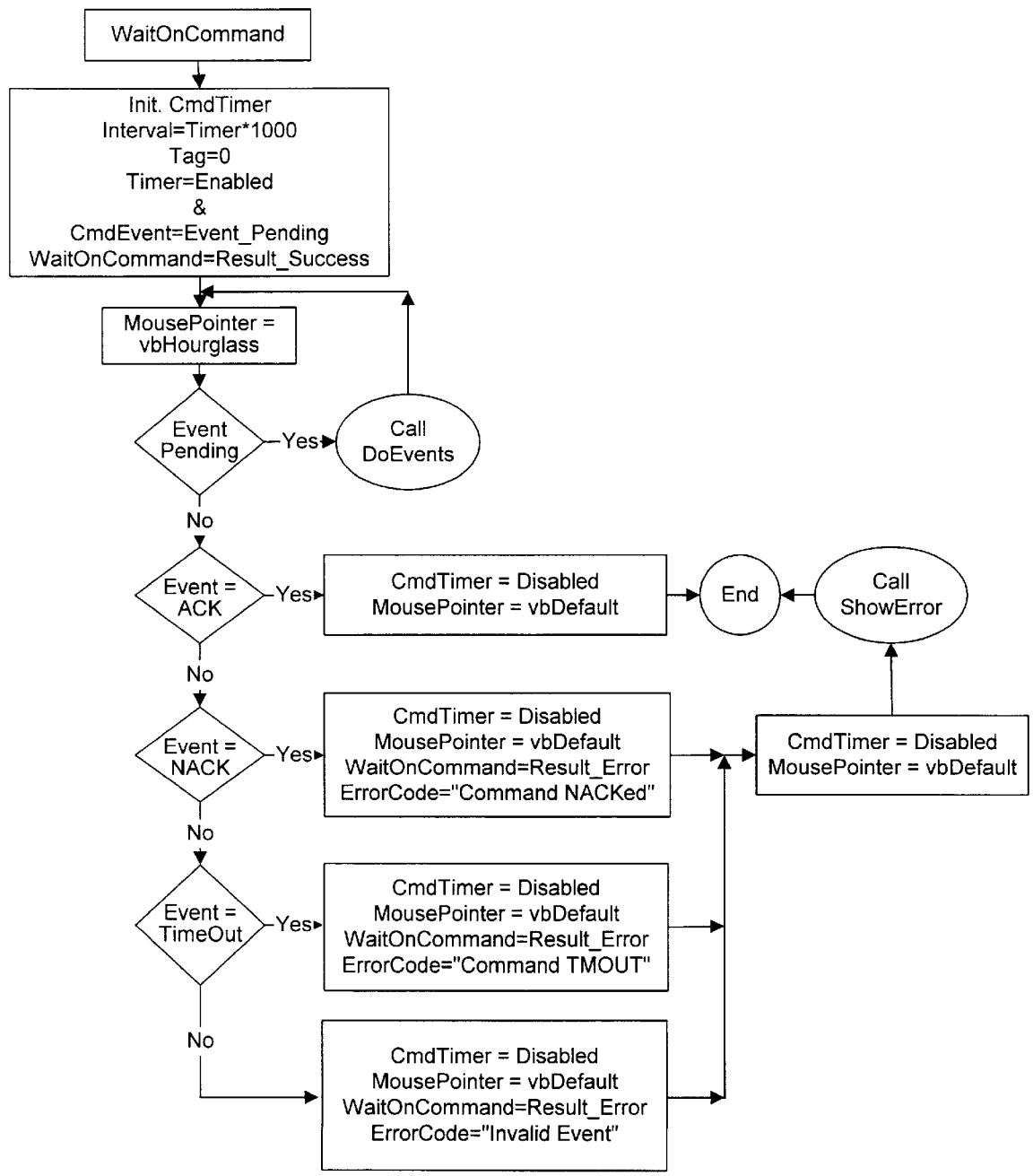
FIG. 22 is a graphical depiction of a control system handling of the WaitOnCommand event in a preferred embodiment of the present invention.

FIG. 22 is a graphical depiction of control system 5 handling of the WaitOnCommand event.

Figure 23:
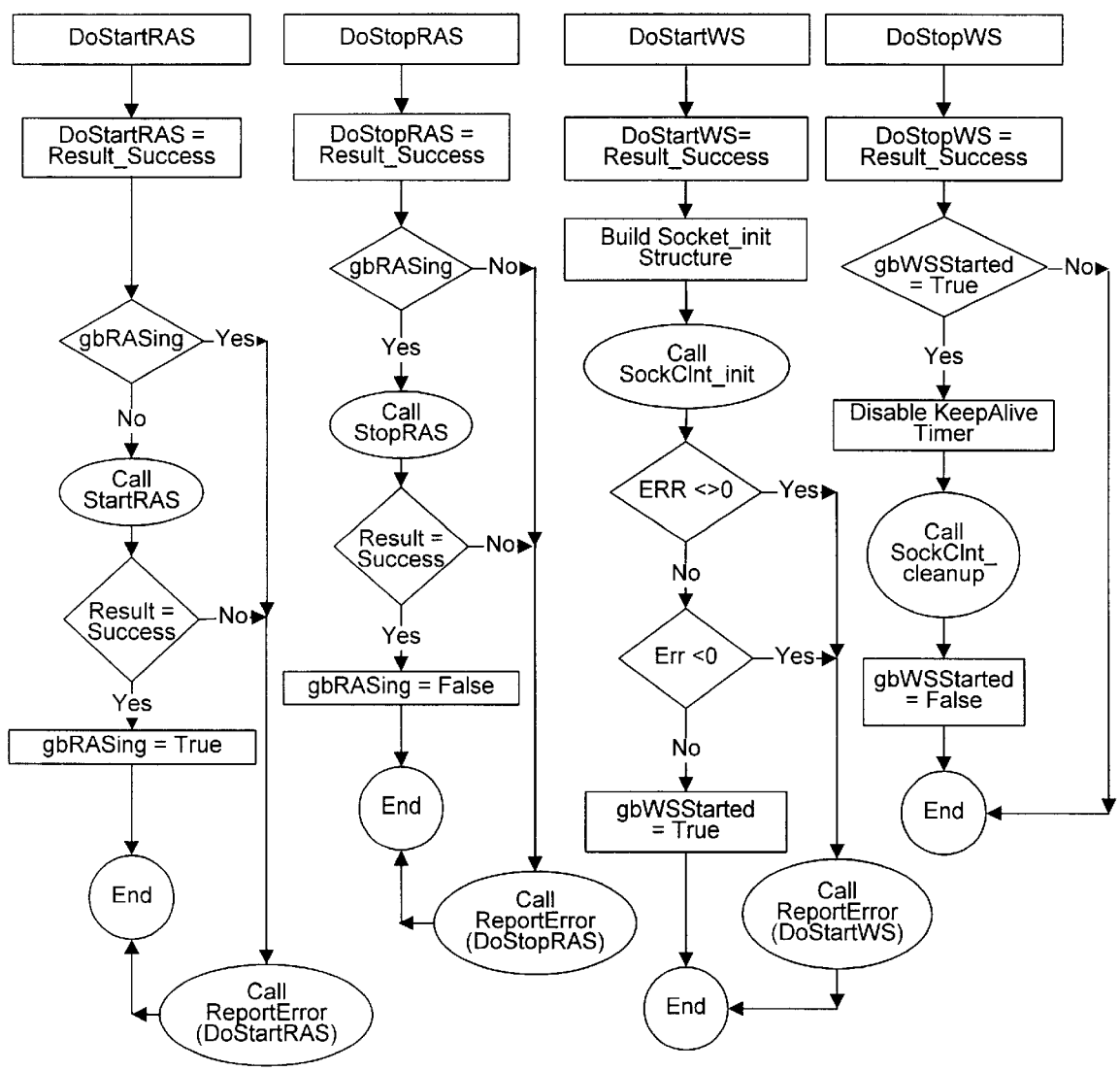
FIG. 23 is a graphical depiction of a control system handling of the StartRAS, StopRAS, StartWS, and StopWS command events in a preferred embodiment of the present invention.

FIG. 23 is a graphical depiction of control system 5 handling of the StartRAS, StopRAS, StartWS, and StopWS command events. As those skilled in the art recognize, RAS refers to remote access server and WS refers to WinSocket the well-known system employed for interlayer signaling in the Windows® operating systems.

Figure 24:
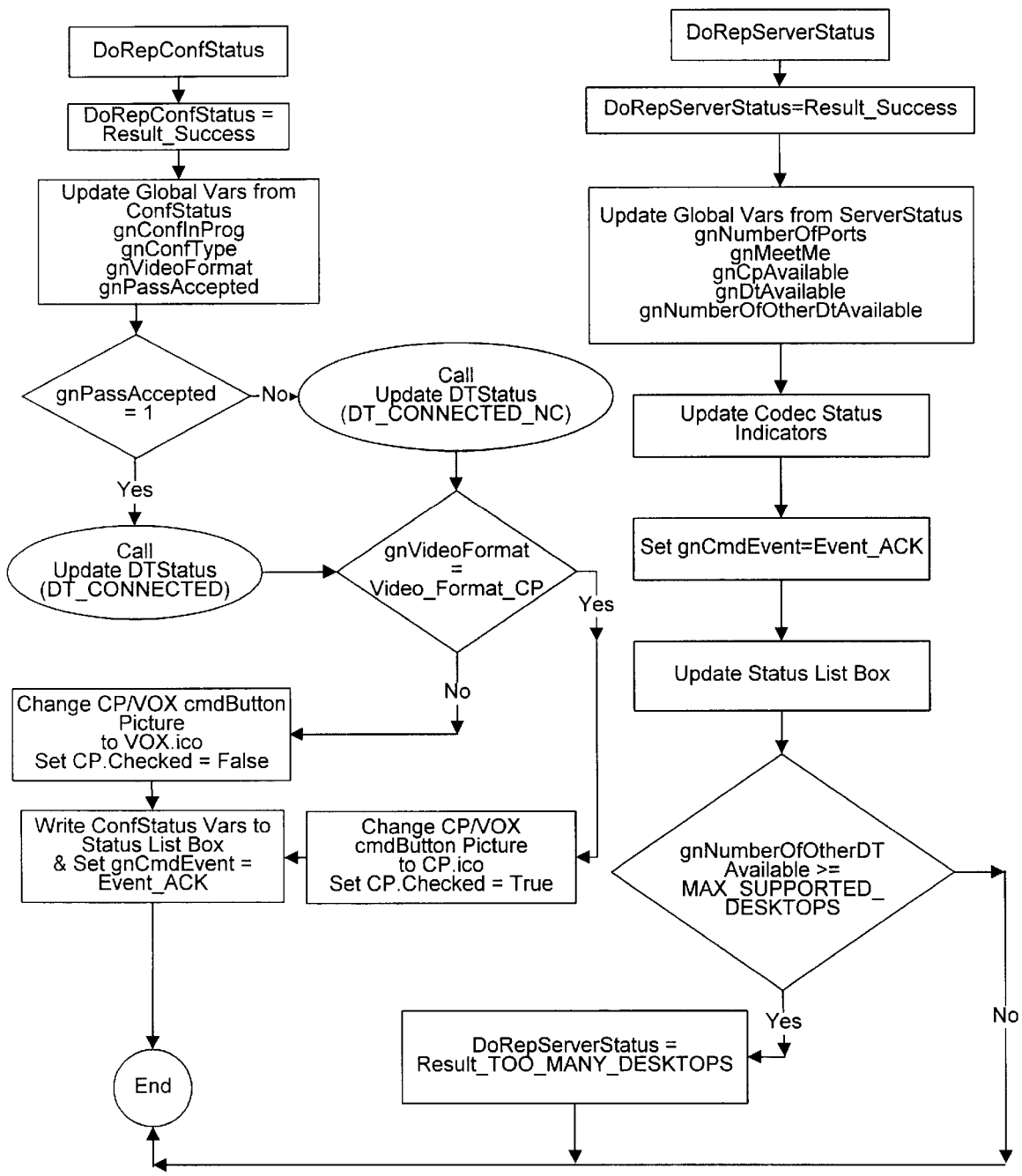
FIG. 24 is a graphical depiction of a control system handling of the RepConfStatus and ReportServerStatus command events in a preferred embodiment of the present invention.

FIG. 24 is a graphical depiction of control system 5 handling of the RepConfStatus and ReportServerStatus command events. Whether in the figures or elsewhere in the specification, where there is reference to "DT" or "DTapp", reference has been made to a particular embodiment of control system 5 as employed by the inventors of the present invention.

Figure 25:
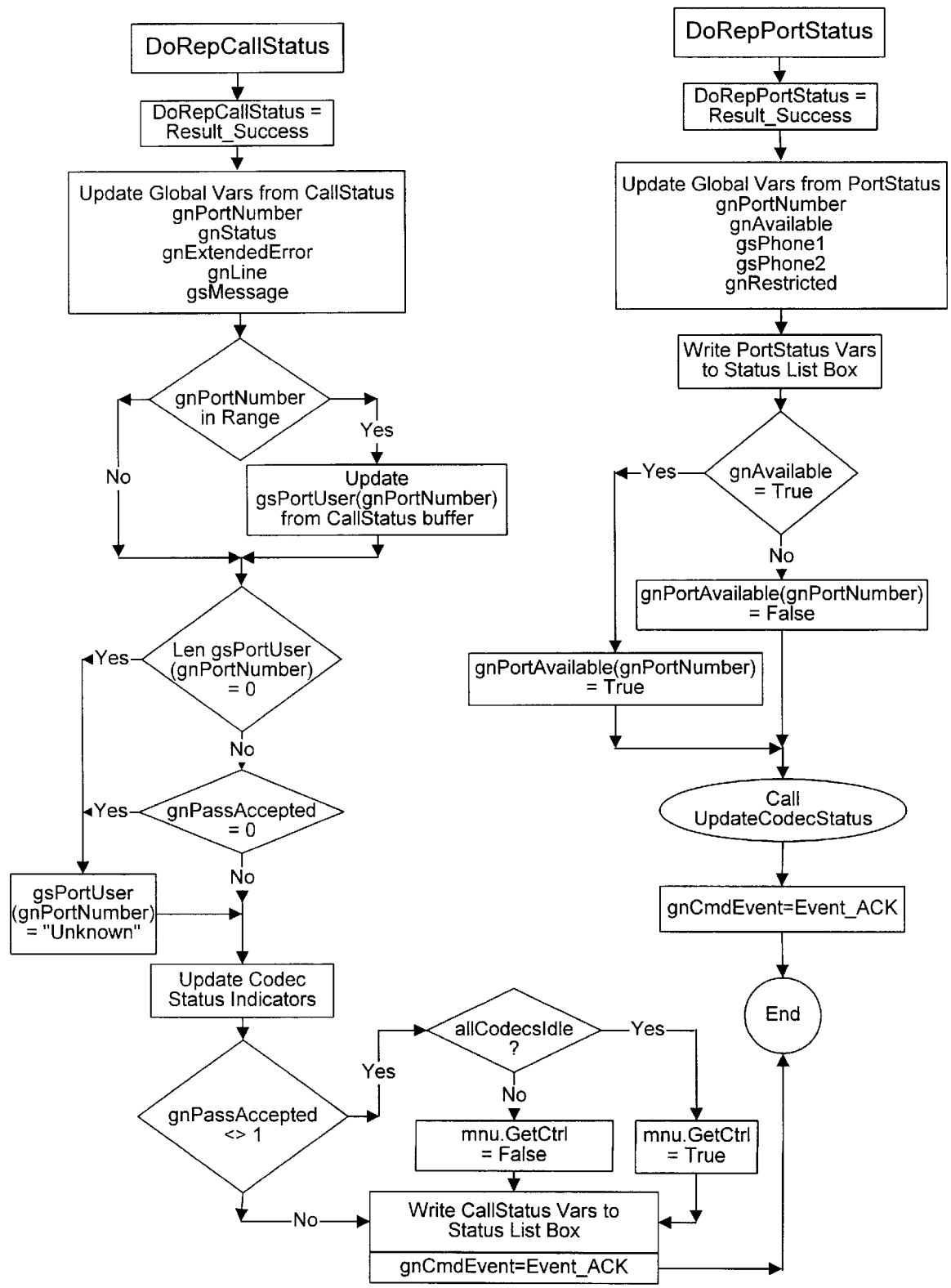
FIG. 25 is a graphical depiction of control system 5 handling of the RepCallStatus and RepPortStatus command events in a preferred embodiment of the present invention.

FIG. 25 is a graphical depiction of control system 5 handling of the RepCallStatus and RepPortStatus command events.

Figure 26:
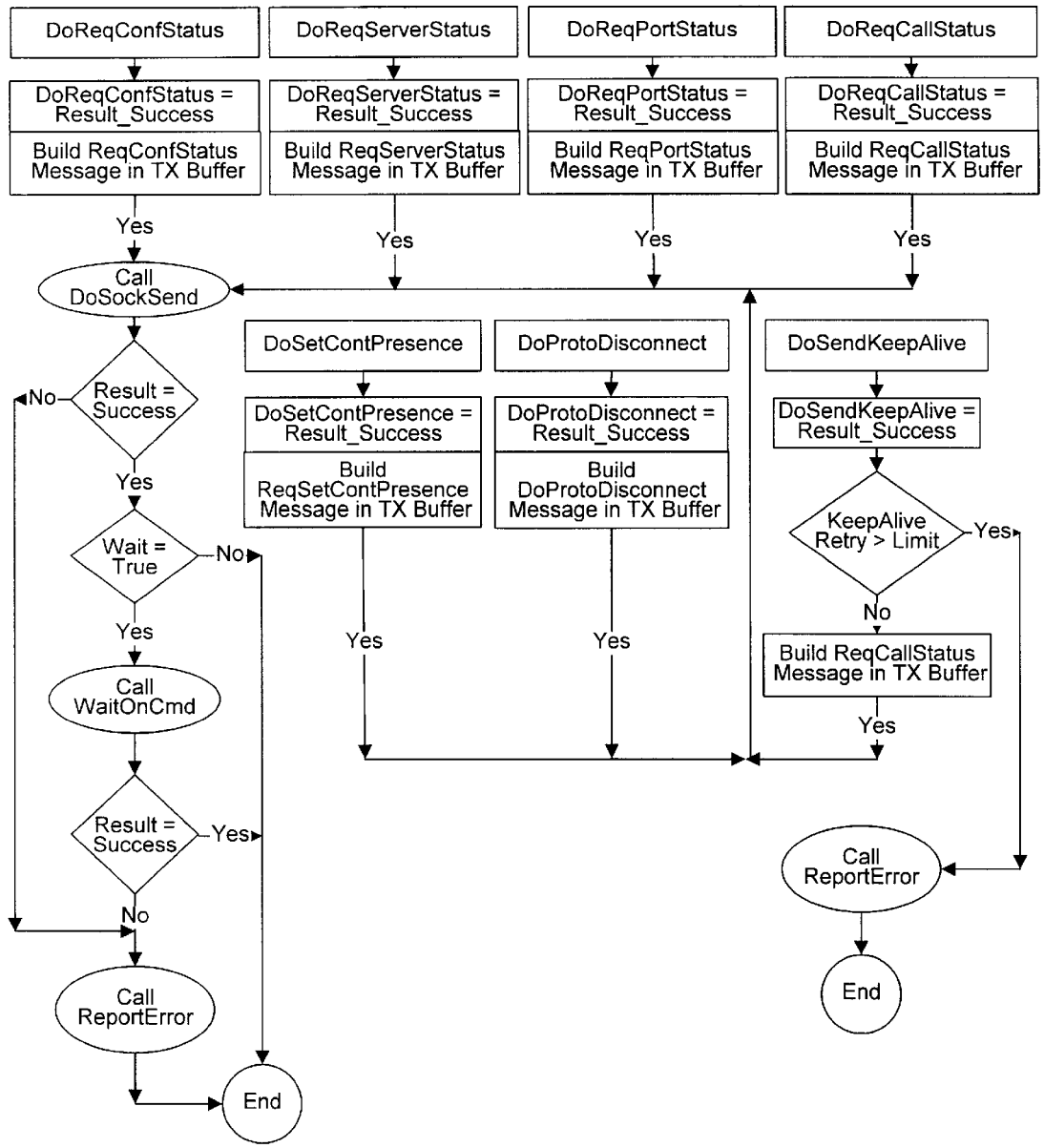
FIG. 26 is a graphical depiction of a control system handling of the ReqConfStatus, ReqServerStatus, RequestPortStatus, RequestCallStatus, SetContPresence, ProtocolDisconnect, and SendKeepAlive command events in a preferred embodiment of the present invention.

FIG. 26 is a graphical depiction of control system 5 handling of the ReqConfStatus, ReqServerStatus, RequestPortStatus, RequestCallStatus, SetContPresence, ProtocolDisconnect, and SendKeepAlive command events.

Figure 27:
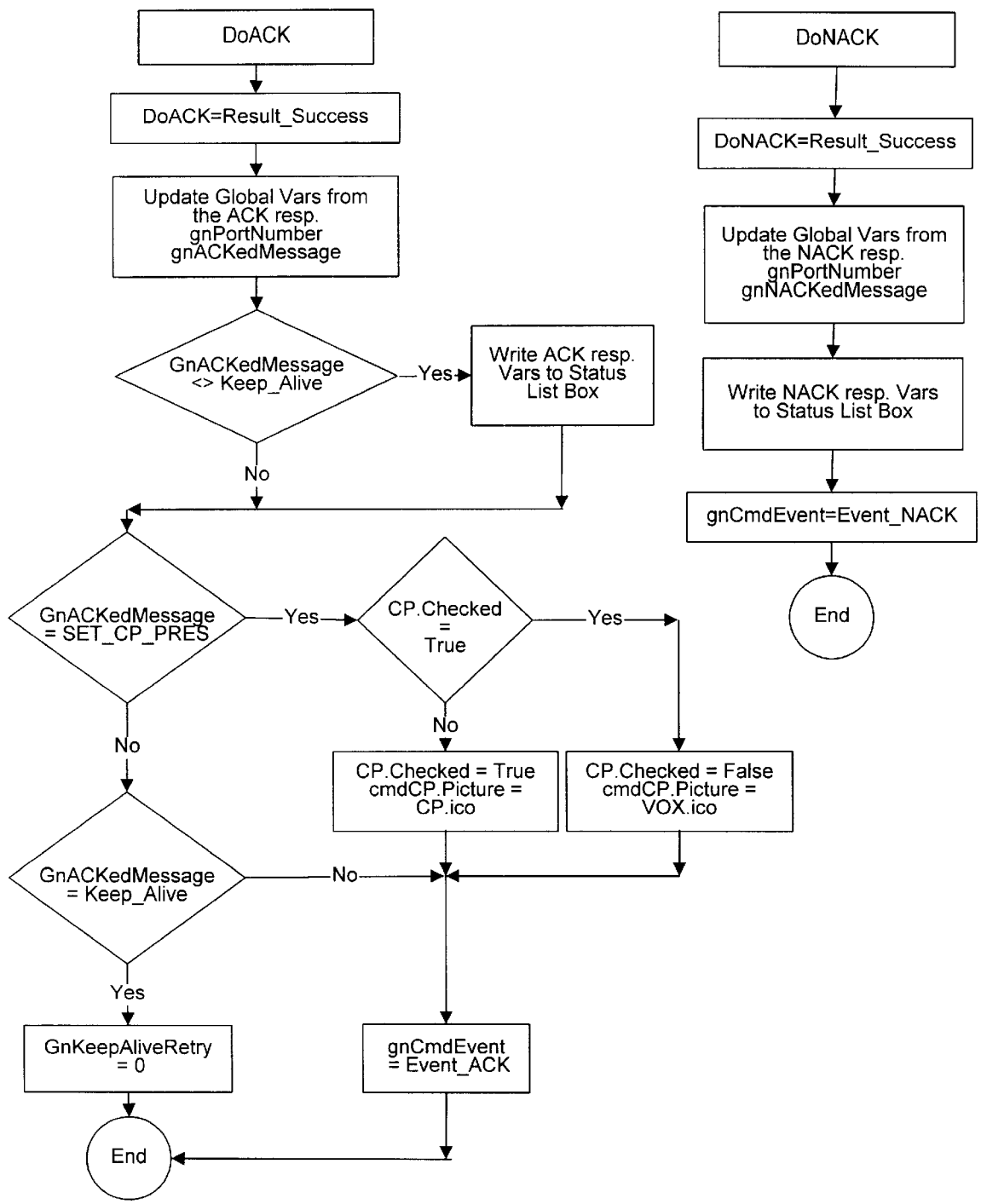
FIG. 27 is a graphical depiction of a control system handling of the ACK and NACK events in a preferred embodiment of the present invention.

FIG. 27 is a graphical depiction of control system 5 handling of the ACK and NACK events.

Figure 28A:
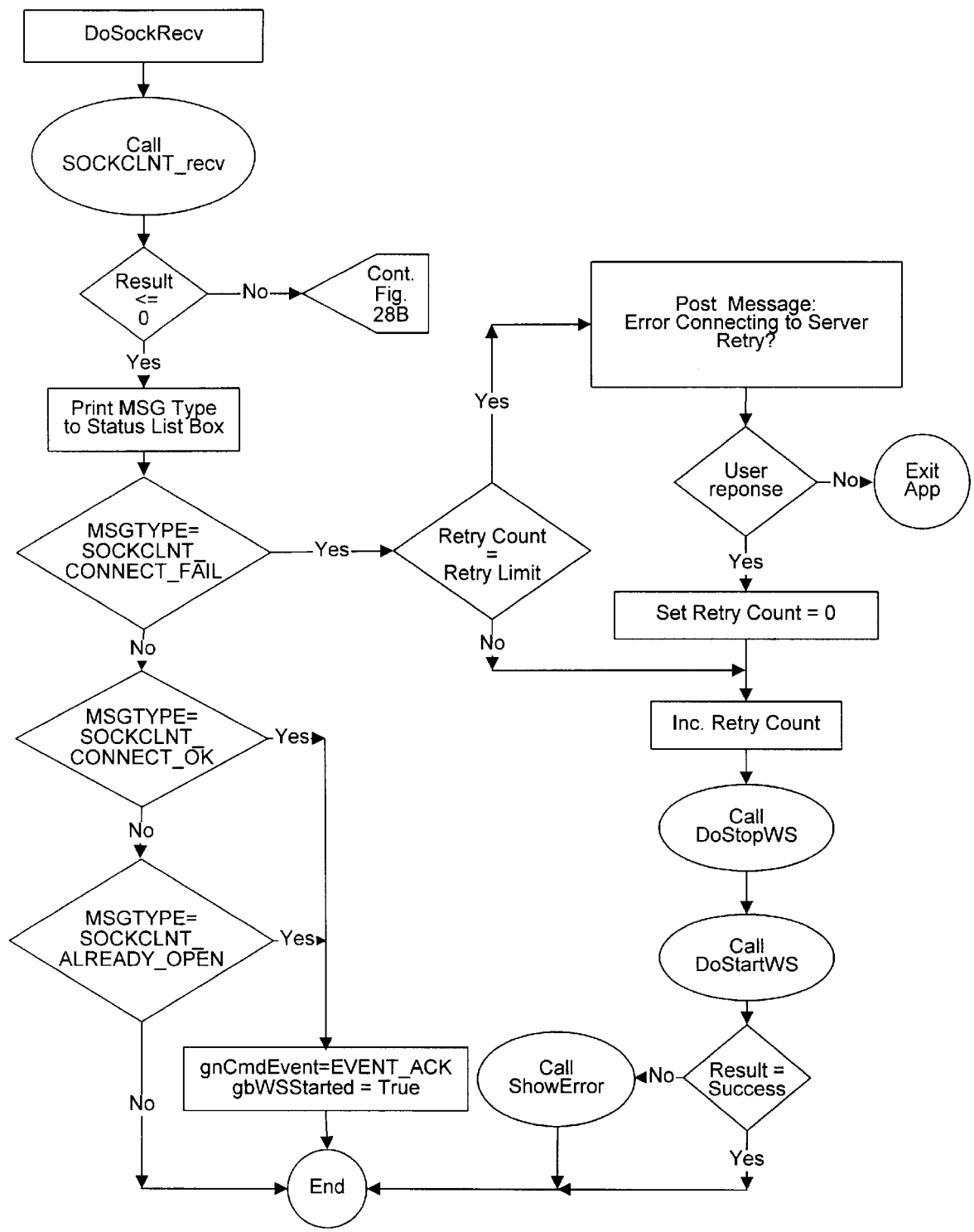
FIGS. 28A and 28B are a graphical depictions of a control system handling of the SockRecv command event in a preferred embodiment of the present invention.
Figure 28B:
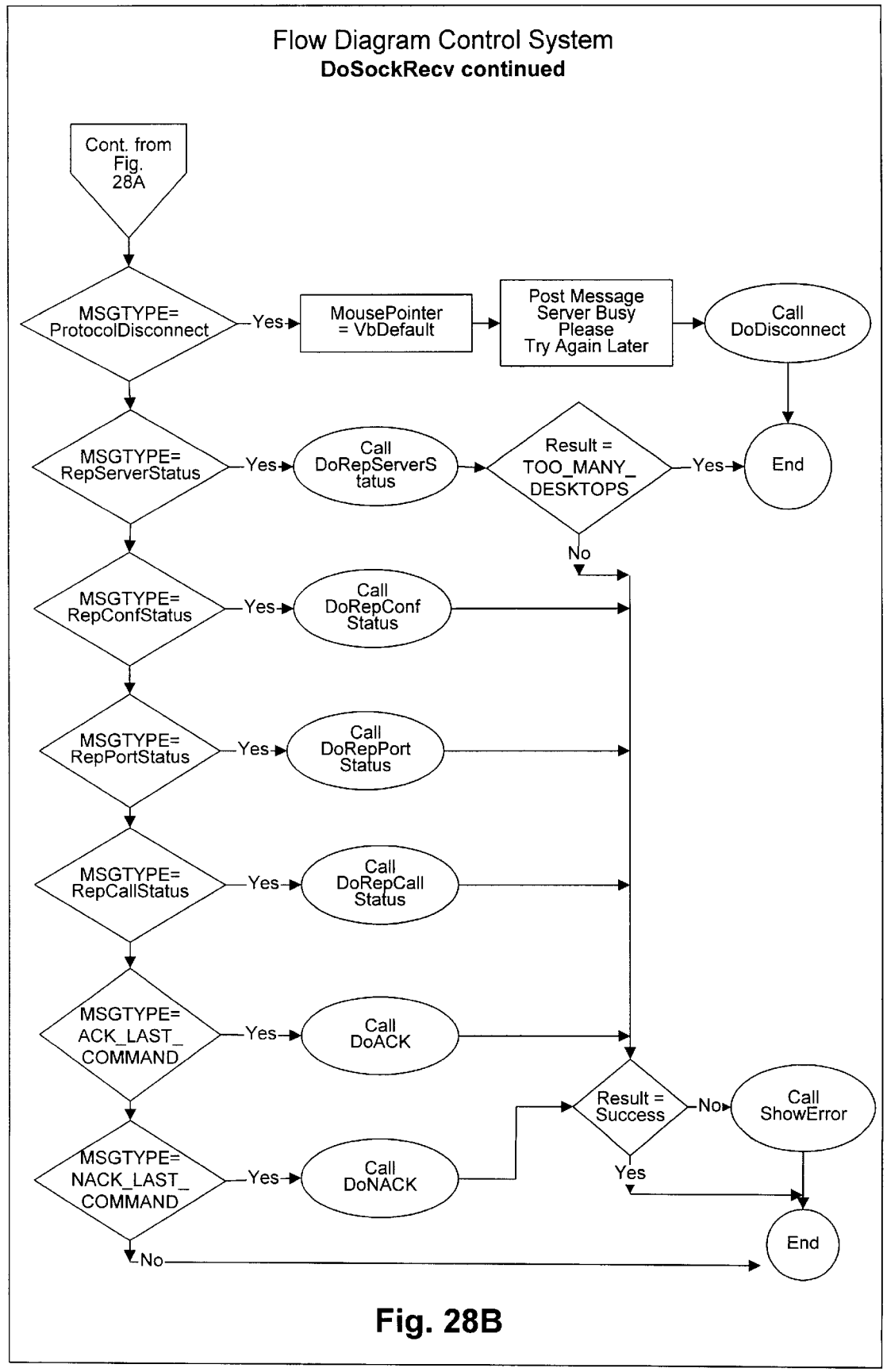

FIGS. 28A and 28B are a graphical depictions of control system 5 handling of the SockRecv command event. As those skilled in the art recognize, SockRecv refers to socket received.

Figure 29:
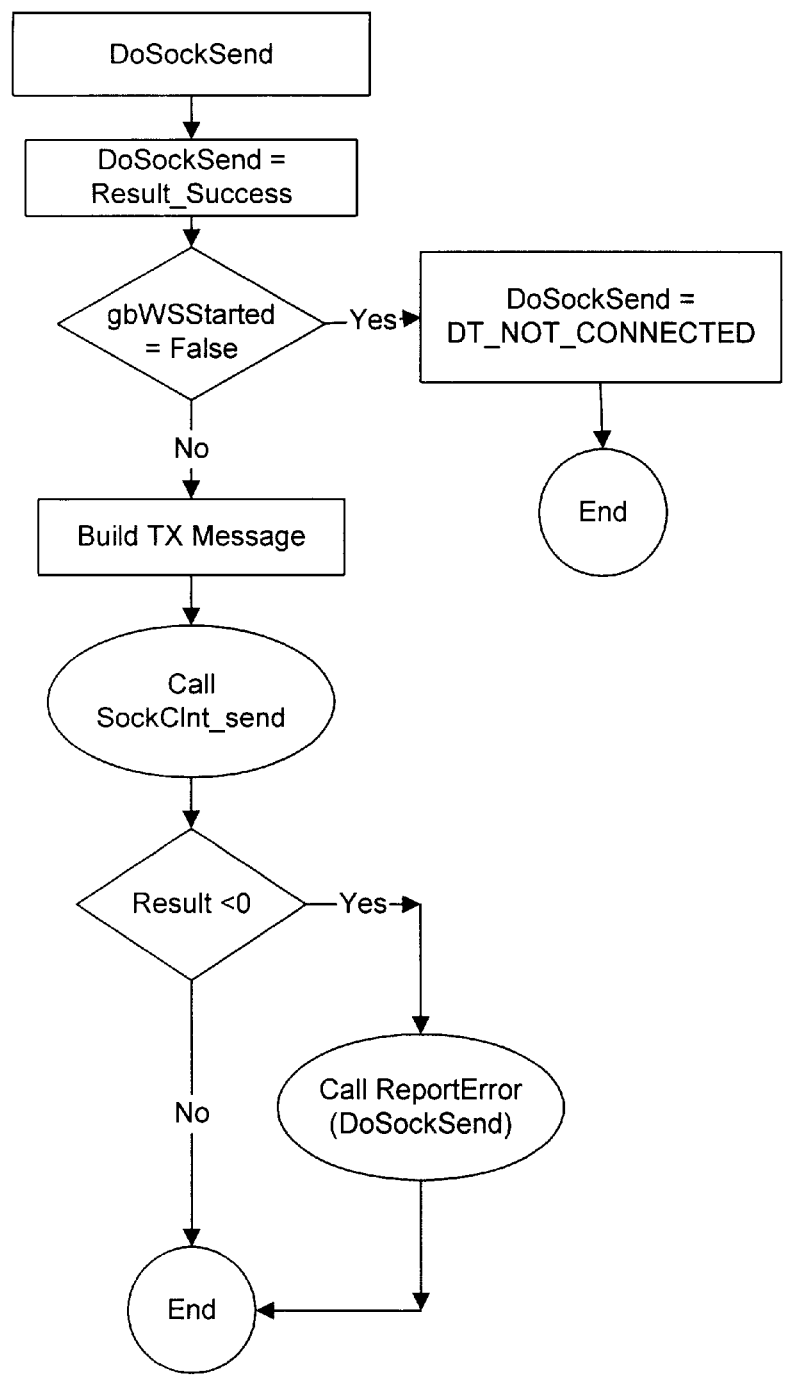
FIG. 29 is a graphical depiction of a control system handling of the SockSend command event in a preferred embodiment of the present invention.

FIG. 29 is a graphical depiction of control system 5 handling of the SockSend command event.

Figure 30:
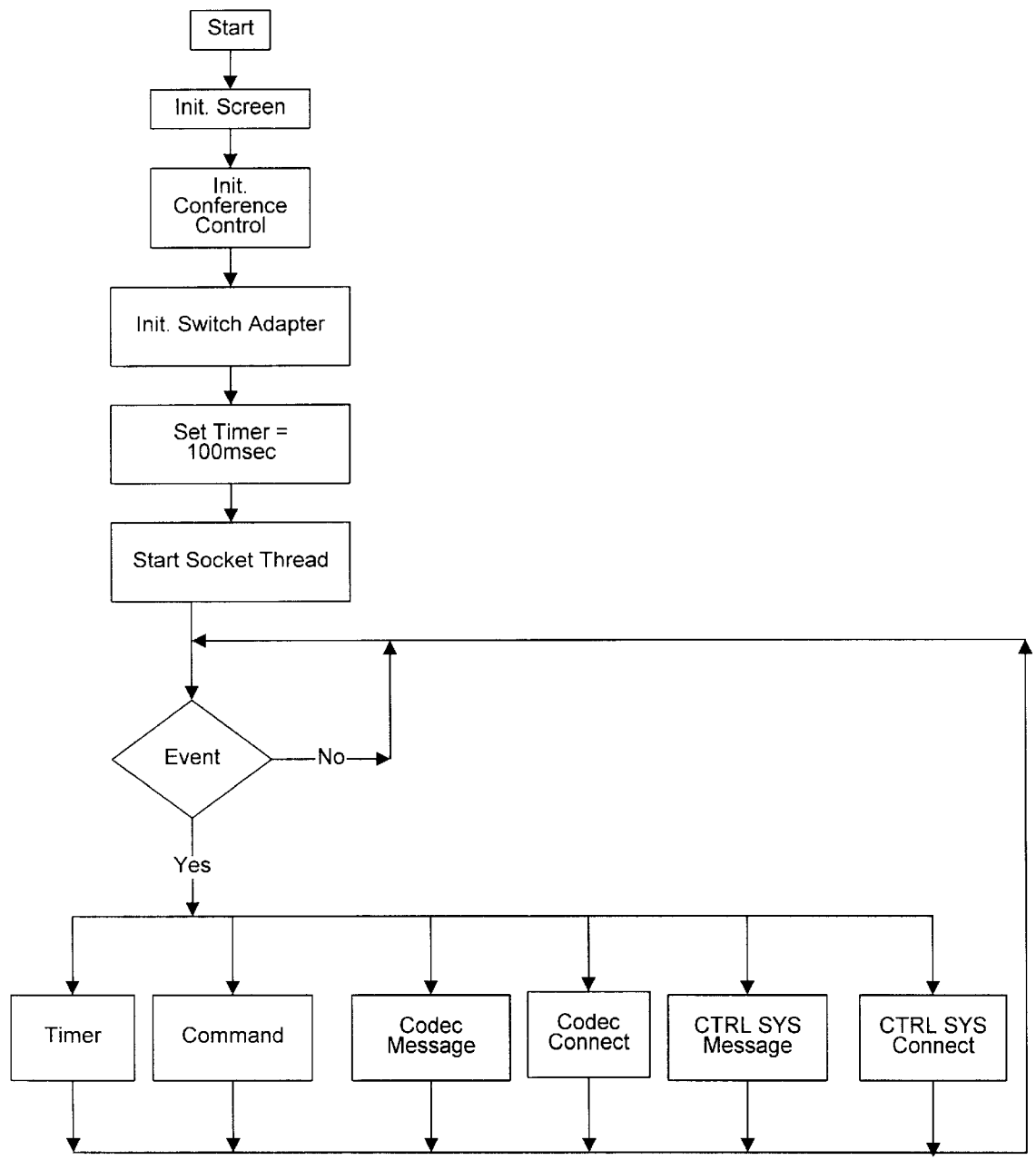
FIG. 30 graphically depicts the initialization and idle loop of a host machine in a preferred embodiment of the present invention.

Host machine 40 responds to control signals from control system 5 by communicating with adaptor 32, selected CODECs $30_1$–$30_n$, or responding directly to control system 5. Host machine initialization and idle loop are depicted by FIG. 30.

Figure 31:
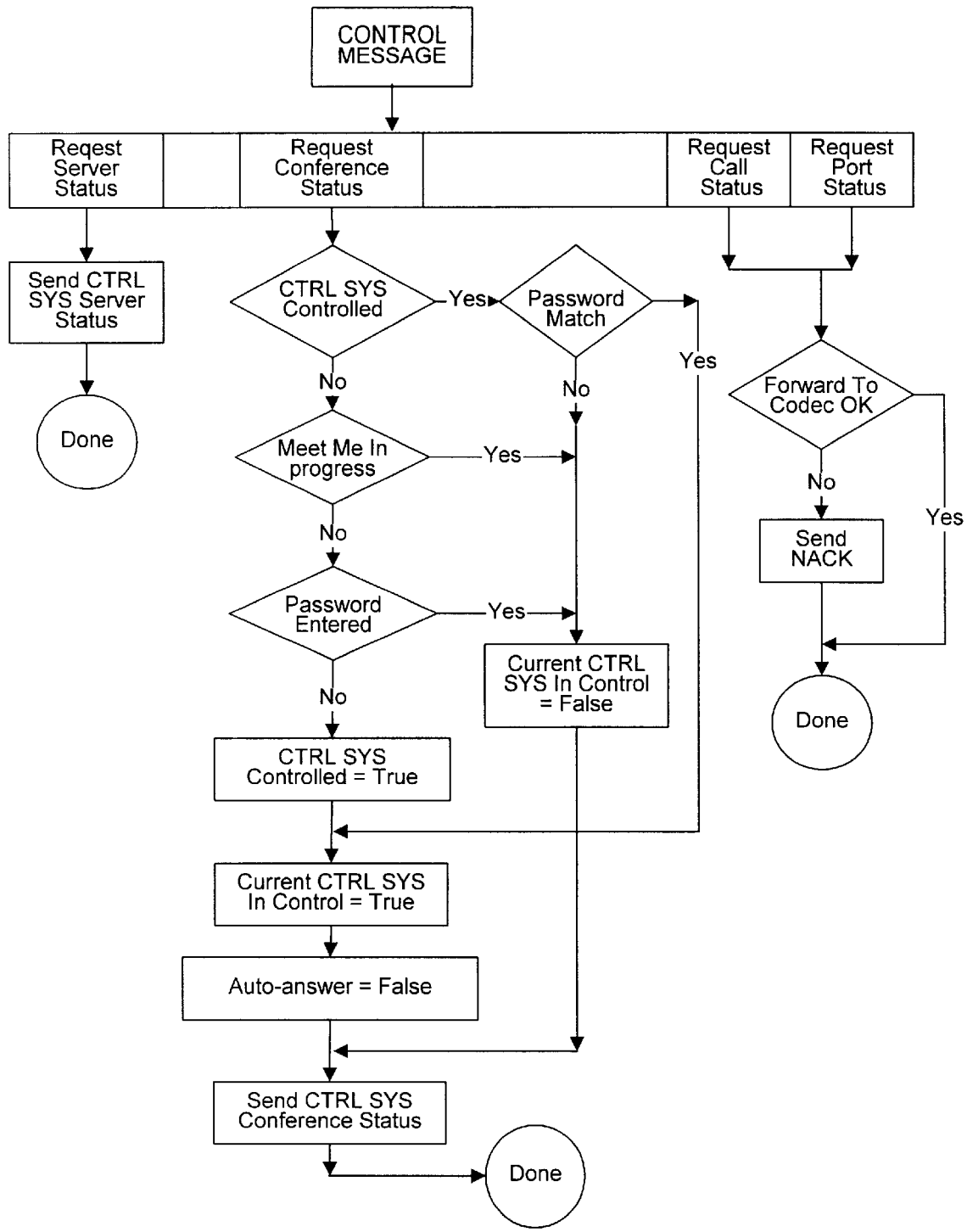
FIG. 31 graphically depicts host machine handling of Request Server Status, Request Conference Status, Request Call Status, and Request Port Status control system message events in a preferred embodiment of the present invention.

FIG. 31 graphically depicts host machine handling of Request Server Status, Request Conference Status, Request Call Status, and Request Port Status control system message events in a preferred embodiment of the present invention.

Figure 32:
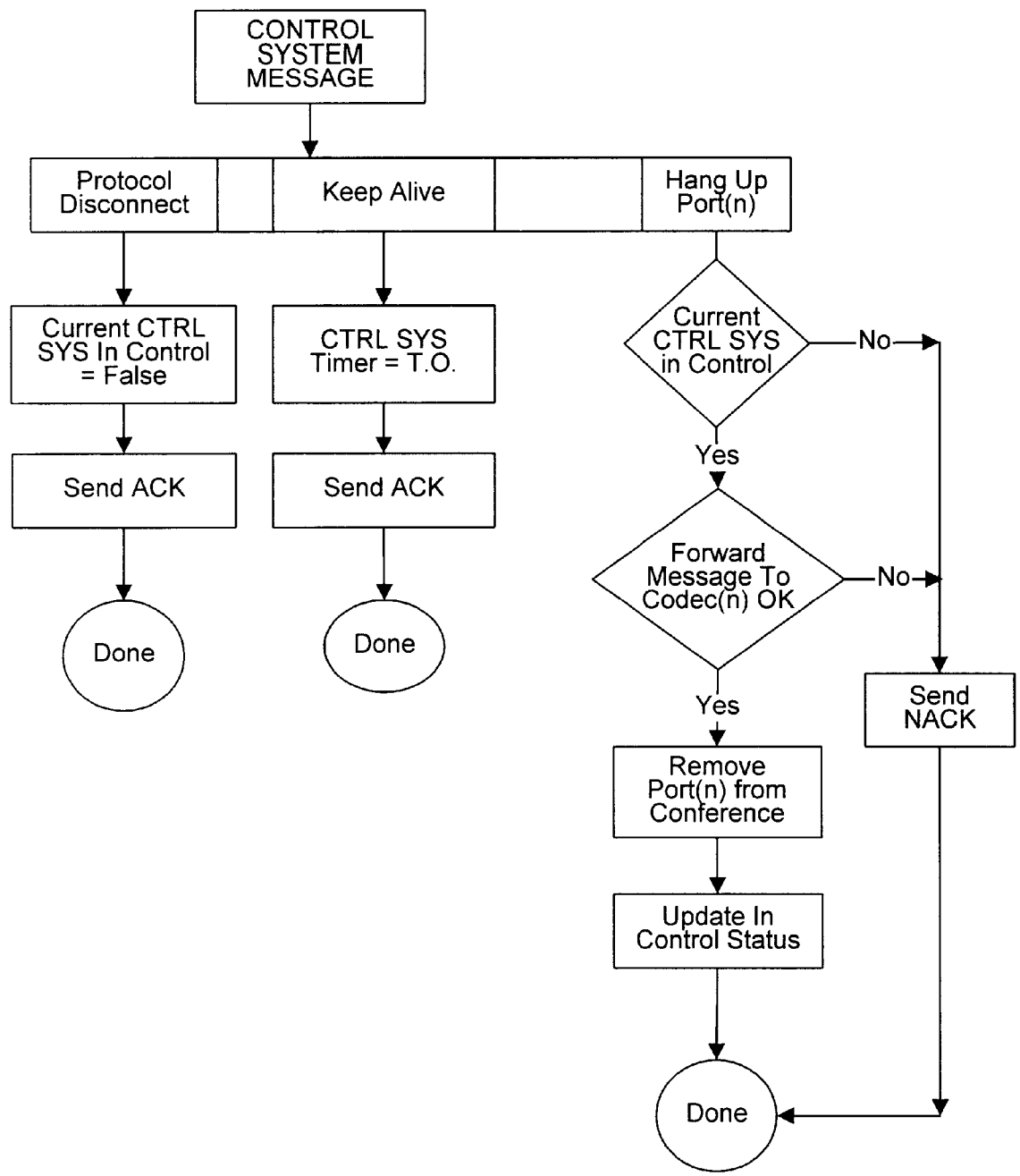
FIG. 32 graphically depicts host machine handling of Protocol Disconnect, Keep Alive, and Hang-up Port control system message events in a preferred embodiment of the present invention.

FIG. 32 graphically depicts host machine handling of Protocol Disconnect, Keep Alive, and Hang-up Port control system message events in a preferred embodiment of the present invention.

Figure 33:
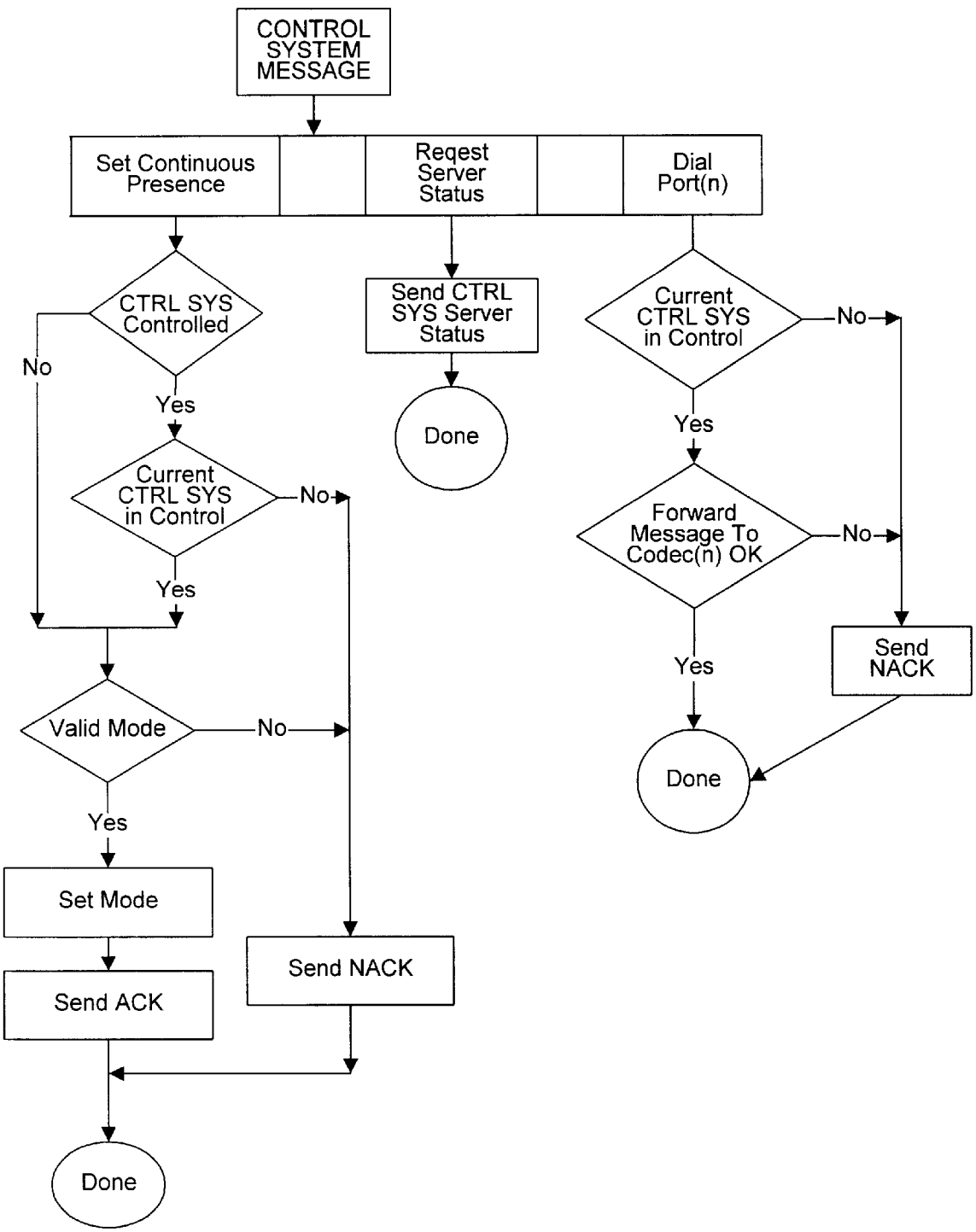
FIG. 33 graphically depicts host machine handling of Set Continuous Presence, Request Server Status, and Dial Port control system message events in a preferred embodiment of the present invention.

FIG. 33 graphically depicts host machine handling of Set Continuous Presence, Request Server Status, and Dial Port control system message events in a preferred embodiment of the present invention.

Figure 34:
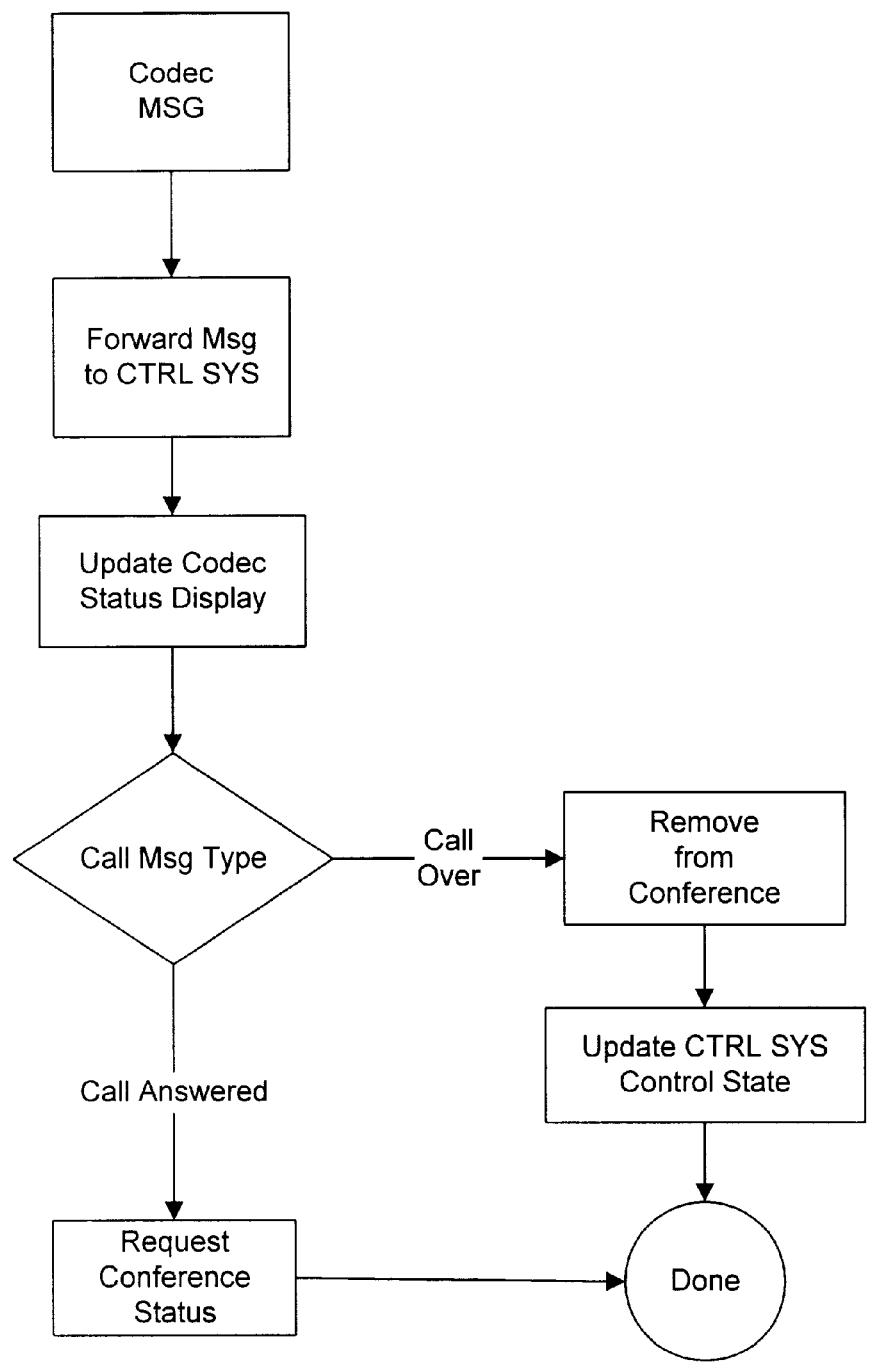
FIG. 34 graphically depicts host machine handling of CODEC message events in a preferred embodiment of the present invention.
Figure 35:
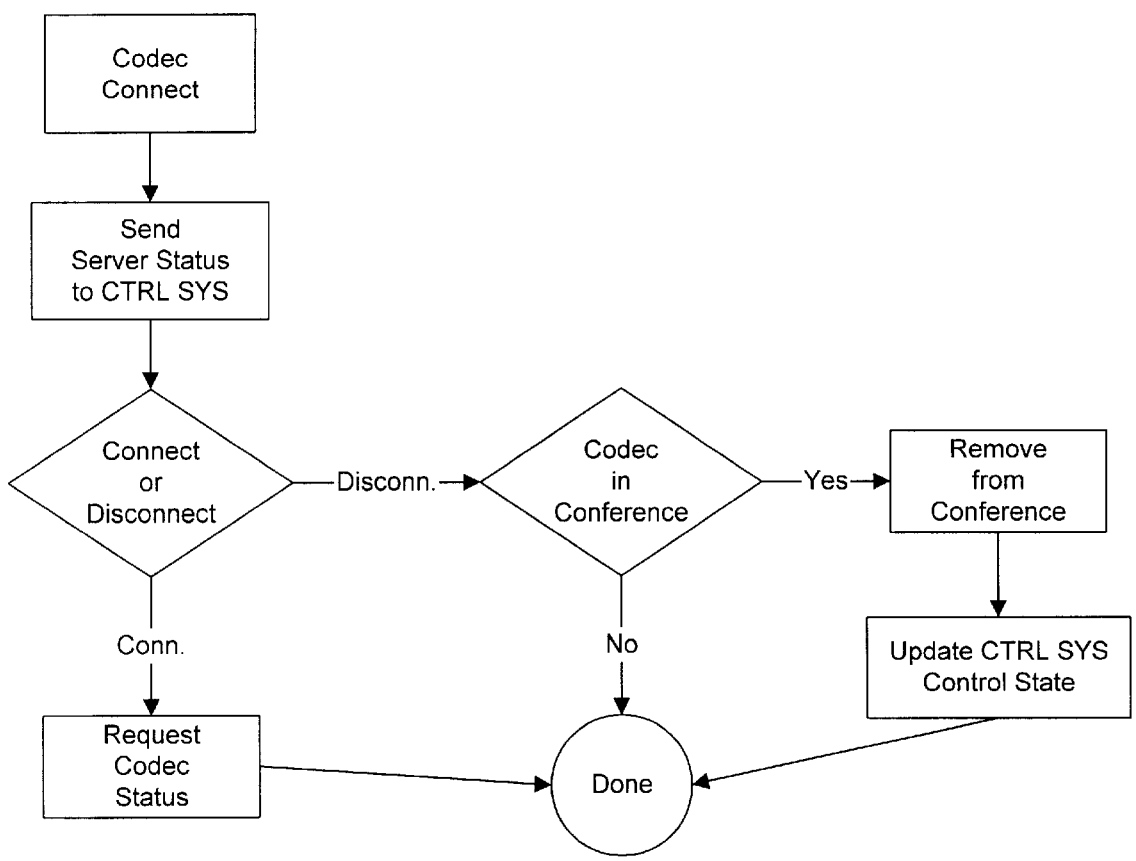
FIG. 35 graphically depicts host machine handling of CODEC connection events in a preferred embodiment of the present invention.
Figure 36:
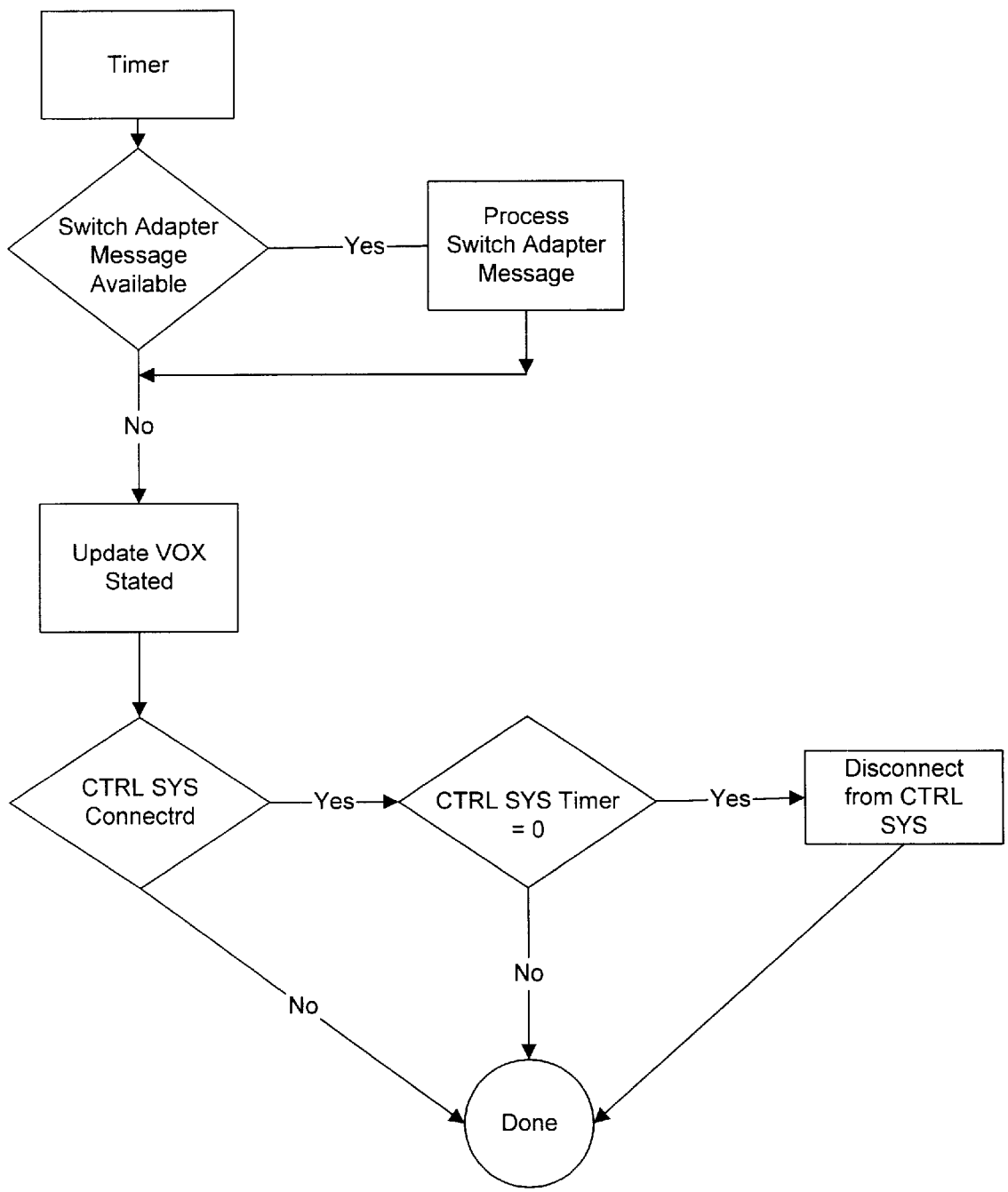
FIG. 36 graphically depicts host machine handling of Timer events in a preferred embodiment of the present invention.
Figure 37:
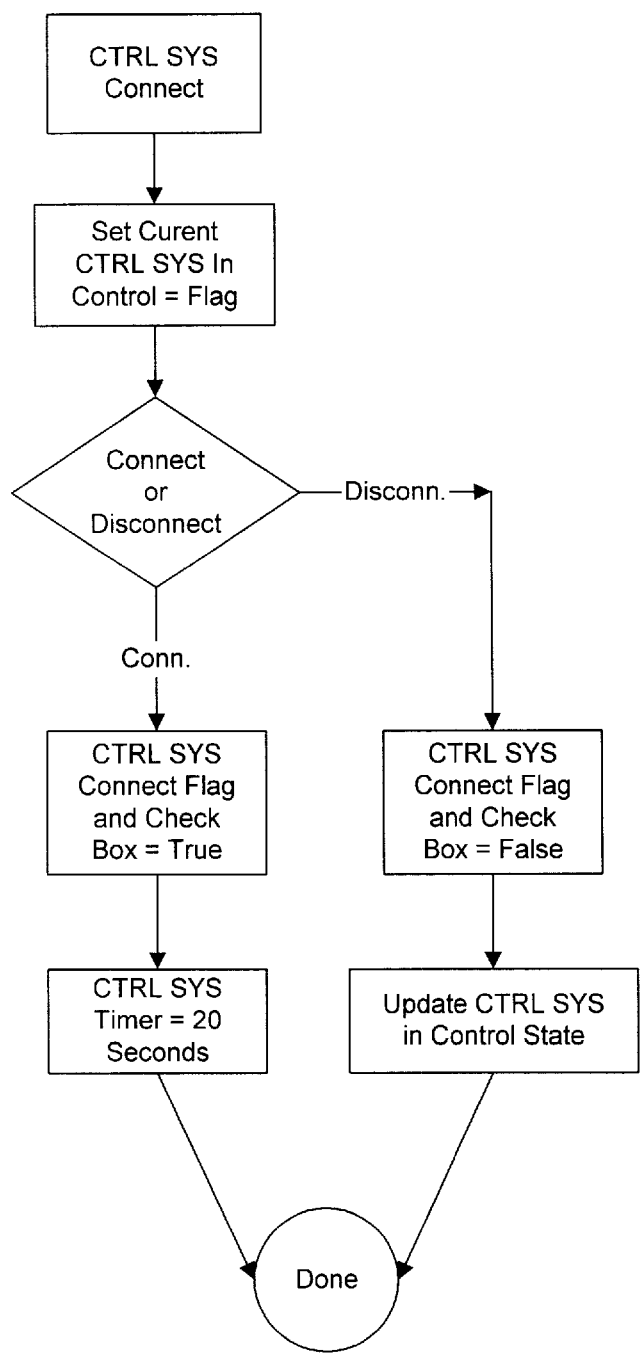
FIG. 37 graphically depicts host machine handling of Control System Connection events in a preferred embodiment of the present invention.

FIG. 34 shows host machine 40 handling of a CODEC message event and FIG. 35 graphically illustrates host machine 40 handling of CODEC connection events. FIG. 36 graphically depicts host machine 40 handling of Timer events and FIG. 37 depicts host machine 40 handling of control system connection events. As those skilled in the art recognize, a variety of methods may be employed to implement the coordination of host machine 40 with control system 5 and CODECs $30_1$–$30_n$ and that, therefore, the event handling depicted in FIGS. 30–37 are exemplary only. References to "server" in FIGS. 30–37 are merely references to a particular preferred implementation of a host machine 40 in a preferred embodiment of the present invention.

Microprocessor 50 of crosspoint adaptor 32 is under the direction of a control program that functions as a microcode to the commands of host machine 40. In a preferred embodiment, the microcode control program is a firmware resident in ROM 51 shown in FIG. 4. Other methods of interpreting the commands from host machine 40 within the scope of the present invention are easily devised by those skilled in the art, including software-driven execution, but the hardiness and flexibility provided by firmware in ROM recommend that implementation. The following firmware description is, therefore, an exemplar description of a preferred implementation of the functionality of the firmware executing in microprocessor 50 and should not be interpreted to be an exclusive implementation.

In a preferred embodiment, the firmware is a preemptive interrupt driven program written in 8051 assembly code. Preemptive events such as receive interrupts and timer expirations schedule work to be performed by setting task flags from within their respective interrupt service routines (ISR). Actual work is then performed in foreground.

The following functions are now discussed: Task Manager, Initialization, Interrupt Service, Timer Service, VOX Sampling, and Host Interface.

Task Scheduler/Manager

The Task Manager begins execution after initialization. Task Manager scans a task request in search of work to be done. When no tasks are active, the task flags are scanned by the Task Manager which, when a flag is detected, clears the flag and launches the requested task. All tasks run to completion and when a task is completed control returns to the Task Manager. Task priority is fixed starting with TASK1 as highest and TASK(N) as lowest. Tasks are run to completion except for interrupt service routines which can preempt execution of a task temporarily, while the ISR is executed. Control returns to the currently executing task after the ISR returns.

Initialization

All internal and external memory elements are reset by the initialization routine. Crosspoint switch 62 is initialized to have its drivers on and a view of ground. The off state is defined as 0×8 h. Audio circuitry 60 is initialized to all off with a value of 0×0. VOX detect 54 is disabled and the VOX Mask register is set to 0×0. Sync detect logic 53, if present, is disabled.

Figure 38:
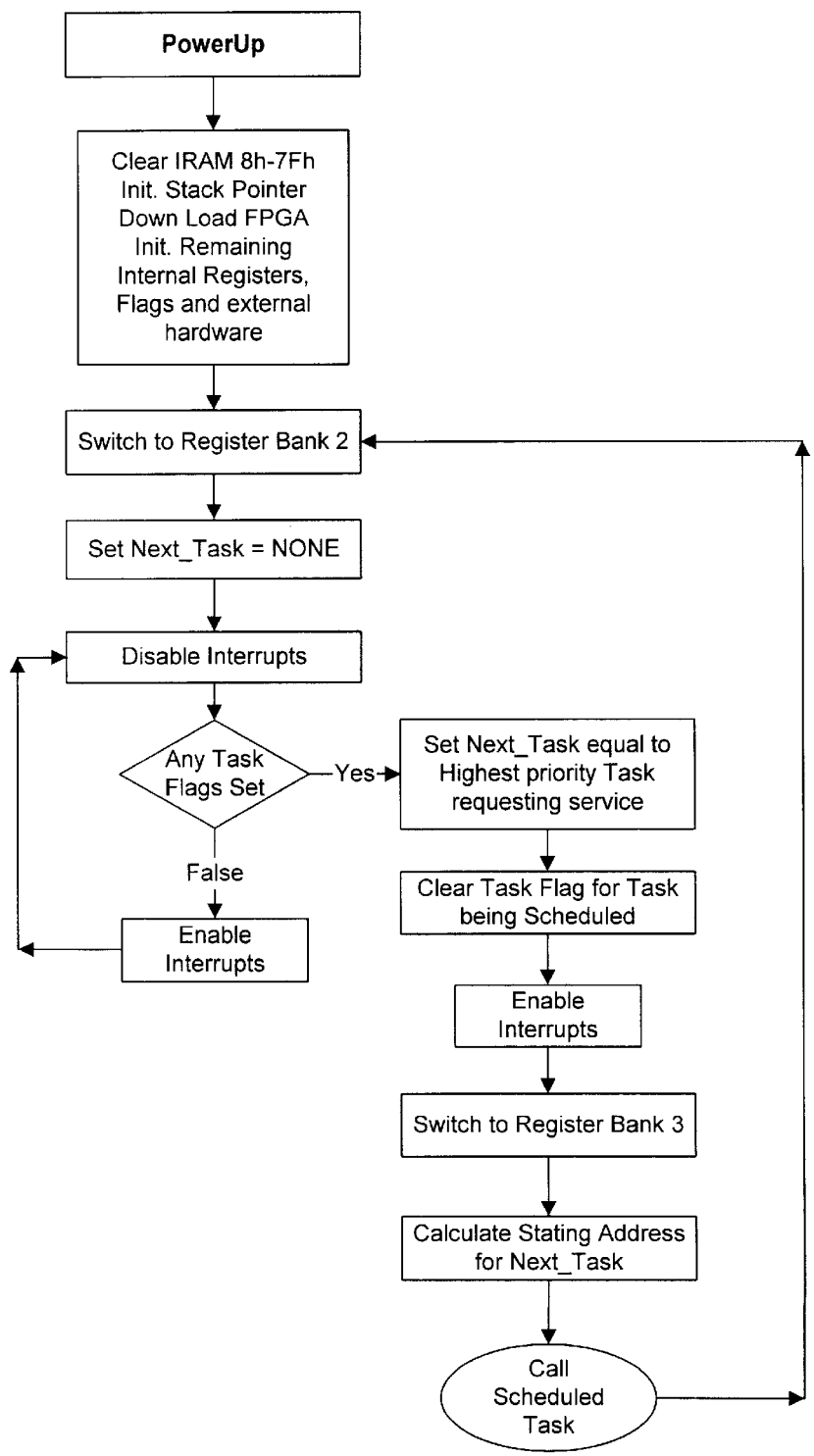
FIG. 38 depicts a power-up and task scheduler idle loop flow of a firmware process executing in a preferred embodiment.

Explanatory FIG. 38 depicts the power-up and task scheduler idle loop flow of the firmware executing in microprocessor 50 in a preferred embodiment.

Interrupt Service

Three types of interrupts are found in a preferred embodiment of the firmware-directed control of crosspoint adaptor 32: host interface, timer service, and optional vertical sync detection. The interrupt service routines perform a minimal amount of work servicing the low level function requiring service. The ISR will request that one or more tasks to be performed by setting task request flag(s). On entry into any ISR, registers such as DPTR (pointer), ACC (accumulator), and PSW (program status word) are pushed onto the stack on entry into the ISR and pulled on return. P2 is reserved for foreground tasks. If an ISR uses a shared register set, the register contents are saved before use in the ISR and then restored prior to return from the interrupt service.

Timer Service

In a preferred embodiment, a real time clock is maintained counting 1, 10, 250, and 2000 millisecond events. Receive and transmit timers are used in host interface functions and a baud rate timer is employed for serial communication facility provided for emulation and debug access. As previously described, VOX sampling employs 10 millisecond events for sampling VOX detect circuitry 54.

Host Interface

In a preferred embodiment, the firmware communicates to host machine 40 through an 8-bit bi-directional port that maintains two interfaces, one for communication from host machine 40 to the firmware and the other for communication from the firmware to host machine 40. Each interface has three flags indicating the state of information in the port. Those flags are TXINT, RXINT, and SOH. The TXINT and RXINT flags may be masked, read, and cleared through their corresponding interface registers.

The TXINT flag indicates an empty transmit buffer. This occurs when valid data is read out of the bidirectional port by the opposing port interface. The TXINT flag is software cleared and does not reassert until another such event. The TXINT flag can be masked to prevent the corresponding interrupt, but the actual state of the flag remains unaffected. The TXINT flag can be set or cleared without regard to the mask.

There are two ways to clear the TXINT flag. A direct clear through software can clear the flag and the event of writing data into the Transmit Register will also clear the TXINT flag. The event of writing data into the Transmit Register will also set the RXINT flag of the opposing port indicating valid data present at the that opposing port interface Receive Register.

The RXINT flag indicates that the Receive Data Register has valid data which is caused by writing data into the opposing port interface Transmit Register. The RXINT flag is cleared on the event of data being read from the Receive Data Register. This Read event also sets the TXINT flag on the opposing port indicating an empty register.

Each port interface also has a Start of Header flag (SOH) which indicates that the byte in the register is the first byte of a message sequence. The SOH flag is set by software prior to writing the first byte of message packet into the Transmit Register. The set SOH flag is cleared when the opposing port reads the data from its Receive Register.

Host—Firmware Interface Protocol Format

The Interface Protocol is the common interface between host machine 40 and the firmware executing on microprocessor 50.

The message format includes the following elements:

Message Type

Message Size

0-N Parameters

The message size field indicates the number of bytes in the message. Minimum size is 2 bytes. The message parameter fields are optional and may be used to convey output and input support information related to the command. With simple commands such as ReqMode, these fields are not used.

The message formats are as follows:

| Message | Message Type | Message Size | Param 1 | Param 2 | Param 3 |
| --- | --- | --- | --- | --- | --- |
| Set Video | 0X01 | 4 | Output | View | na |
| SetAudio | 0x02 | 4 | Output | Sum | na |
| SetVoxMask | 0x03 | 3 | Mask | na | na |
| SetMode | 0x04 | 3 | Mode | na | na |
| ReqVideo | 0x05 | 3 | Output | na | na |
| ReqAudio | 0x06 | 3 | Output | na | na |
| ReqVoxMask | 0x07 | 2 | na | na | na |
| ReqMode | 0x08 | 2 | na | na | na |
| ReportVideo | 0x09 | 4 | Output | View | na |
| ReportAudio | 0x0A | 4 | Output | Sum | na |
| ReportVoxMask | 0x0B | 3 | VoxMsk | na | na |
| ReportModes | 0x0C | 3 | Mode | na | na |
| ReqMemory | 0x0D | 5 | Int/Ext | AdrMSB | AdrLSB |
| ReportMemory | 0x0E | 18 | Param 1 | thru | Param 16 |
| ReportVox | 0x0F | 3 | Input | na | na |
| ReqSyncDetStat | 0x10 | 2 | na | na | na |
| ReqVoxDetStat | 0x11 | 2 | na | na | na |
| ReqRxByteStat | 0x12 | 2 | na | na | na |
| ReqTxByteStat | 0x13 | 2 | na | na | na |
| ReqRxErrsStat | 0x14 | 2 | na | na | na |
| ReqTxErrsStat | 0x15 | 2 | na | na | na |
| ReportSyncDetStat | 0x16 | 3 | Param 1 | na | na |
| ReportVoxDetStat | 0x17 | 3 | Param 1 | na | na |
| ReportRxBytesStat | 0x18 | 5 | Param 1 | Param 2 | Param 3 |
| ReportTxBytesStat | 0x19 | 5 | Param 1 | Param 2 | Param 3 |
| ReportRxErrsStat | 0x1A | 4 | Param 1 | Param 2 | na |
| ReportTxErrsStat | 0x1B | 4 | Param 1 | Param 2 | na |
| ClrSyncDetStat | 0x1C | 3 | Param 1 | na | na |
| ClrVoxDetStat | 0x1D | 3 | Param 1 | na | na |
| ClrRxBytesStat | 0x1E | 2 | na | na | na |
| ClrTxBytesStat | 0x1F | 2 | na | na | na |
| ClrRxErrsStat | 0x20 | 2 | na | na | na |
| ClrTxErrsStat | 0x21 | 2 | na | na | na |

-continued

| Message | Message Type | Message Size | Param 1 | Param 2 | Param 3 |
| --- | --- | --- | --- | --- | --- |
| ReqPwrupTestStat | 0x22 | 2 | na | na | na |
| ReportPwrupTestStat | 0x23 | 10 | Param 1 | thru | Param 8 |
| ReqFwRev | 0x24 | 2 | na | na | na |
| ReportRWRev | 0x25 | 10 | Param 1 | thru | Param 8 |
| ReqDllCode | 0x26 | 2 | na | na | na |
| ReqRst | 0x28 | 2 | na | na | na |

Figure 39:
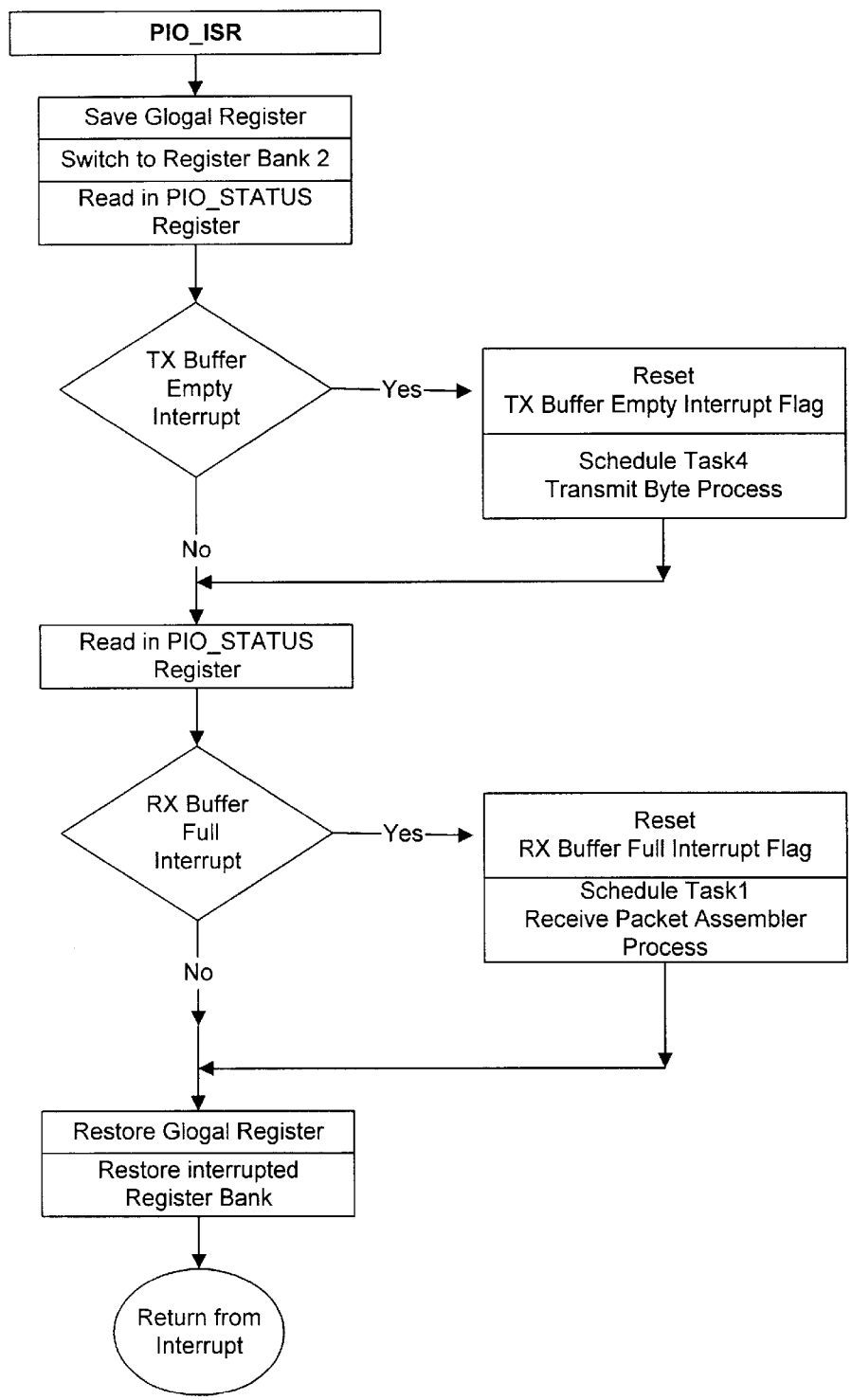
FIG. 39 graphically depicts a parallel I/O interrupt service routine as executed by the firmware in a preferred embodiment of the present invention.

FIG. 39 graphically depicts a parallel I/O interrupt service routine as executed by the firmware operating on microprocessor 50 in a preferred embodiment of the present invention.

Figure 40:
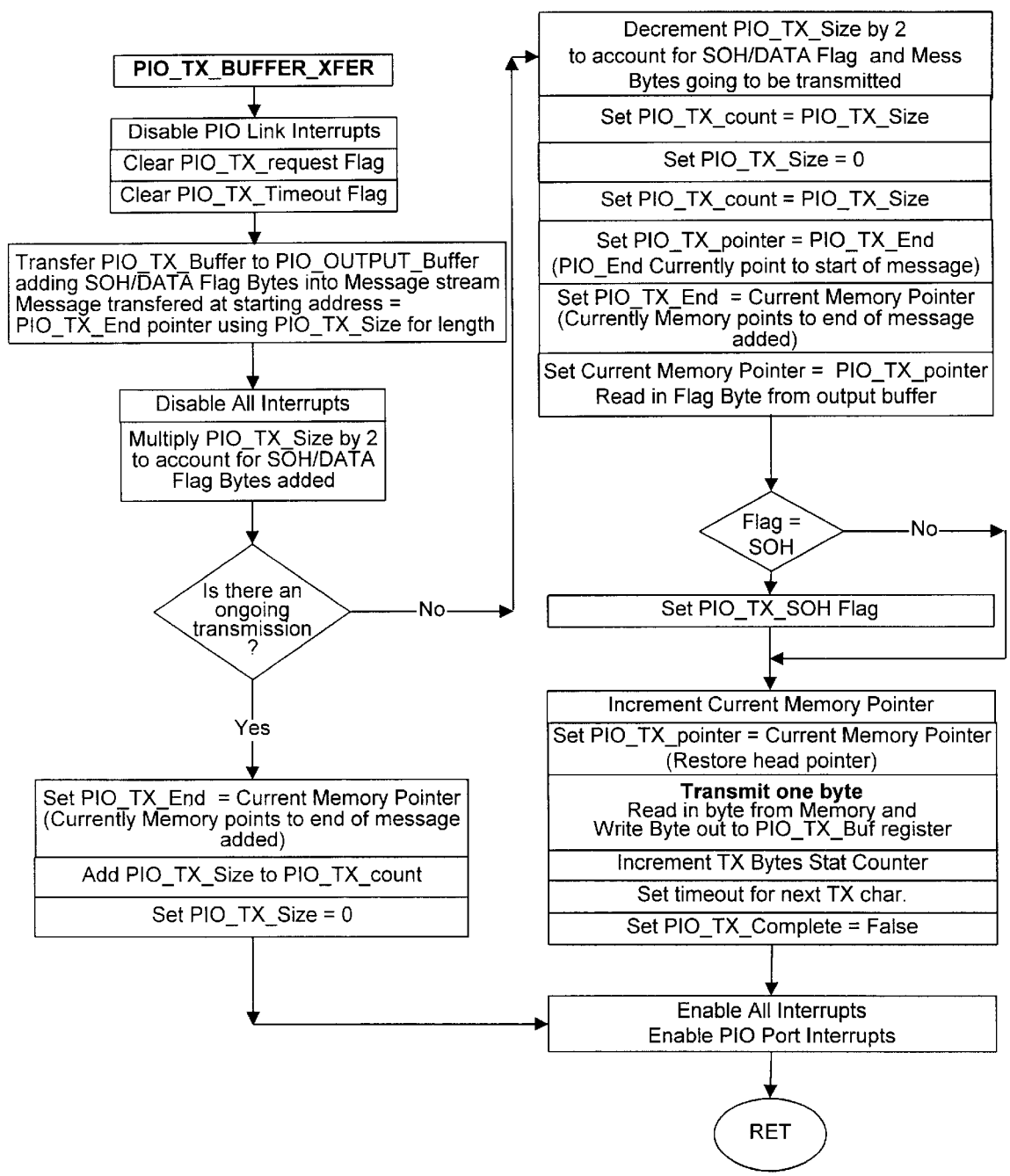
FIG. 40 graphically illustrates a transmit buffer transfer process executed by firmware in a preferred embodiment of the present invention.

FIG. 40 graphically illustrates a transmit buffer transfer process executed by the firmware in a preferred embodiment of the present invention.

Figure 41:
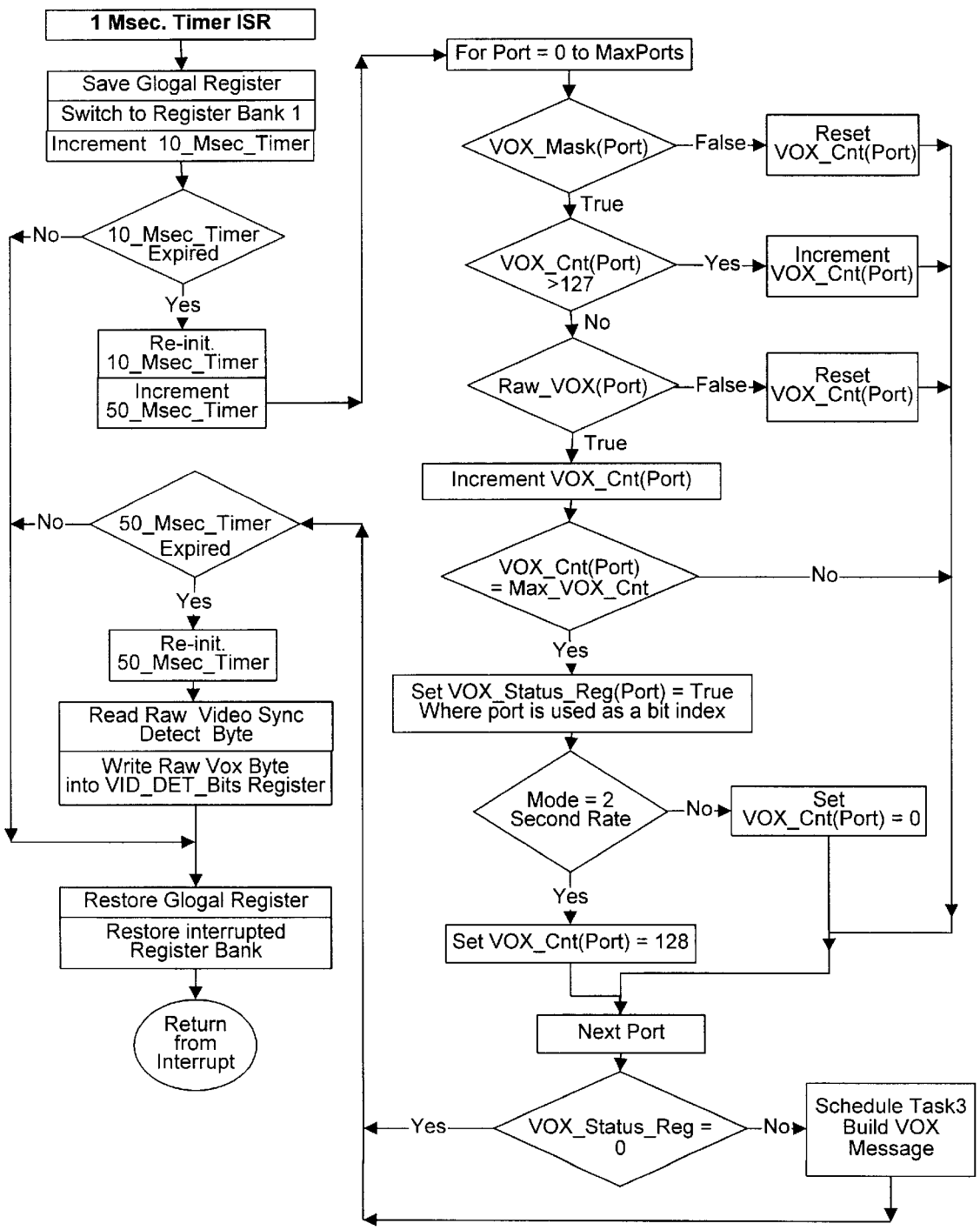
FIG. 41 graphically illustrates a timer interrupt service routine employed in a preferred embodiment of the present invention.

FIG. 41 graphically illustrates a timer interrupt service routine as executed by the firmware in a preferred embodiment of the present invention. The VOX detect circuitry is sampled every 10 msec. in a preferred embodiment. As those skilled in the art will note, the read raw video sync process can be used to optionally, build a register that can be used by host machine 40 for diagnostic purposes or provide a facility for switching video during vertical sync.

Figure 42:
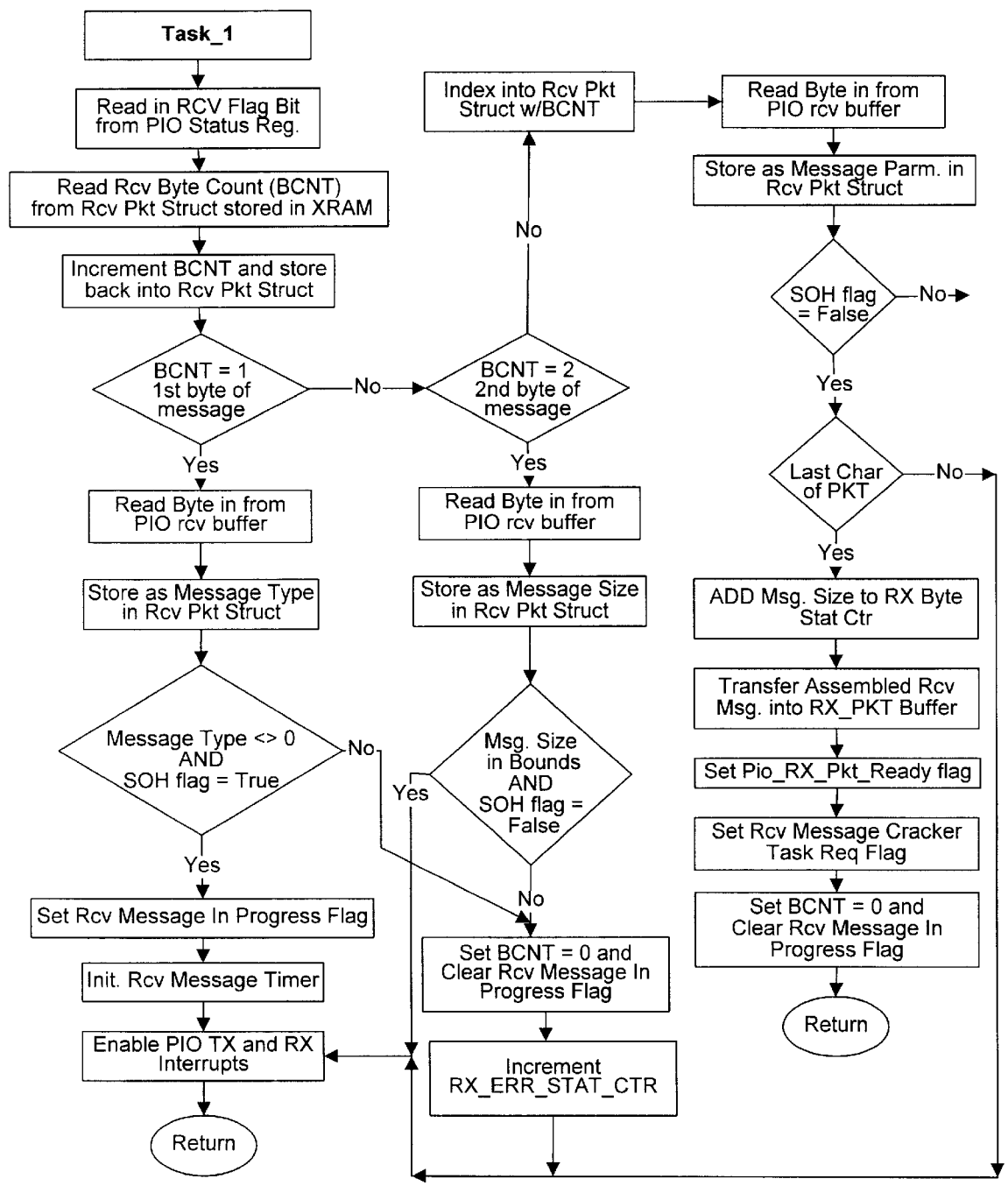
FIG. 42 graphically illustrates a routine to assemble received messages in a preferred embodiment of the present invention.

FIG. 42 graphically illustrates a routine to assemble received messages in a preferred embodiment of the present invention. Because messages may be more than one byte as indicated by Table 2, the process illustrated in FIG. 42 is employed in a preferred embodiment to compose a complete message from bytes transmitted singularly.

Figure 43:
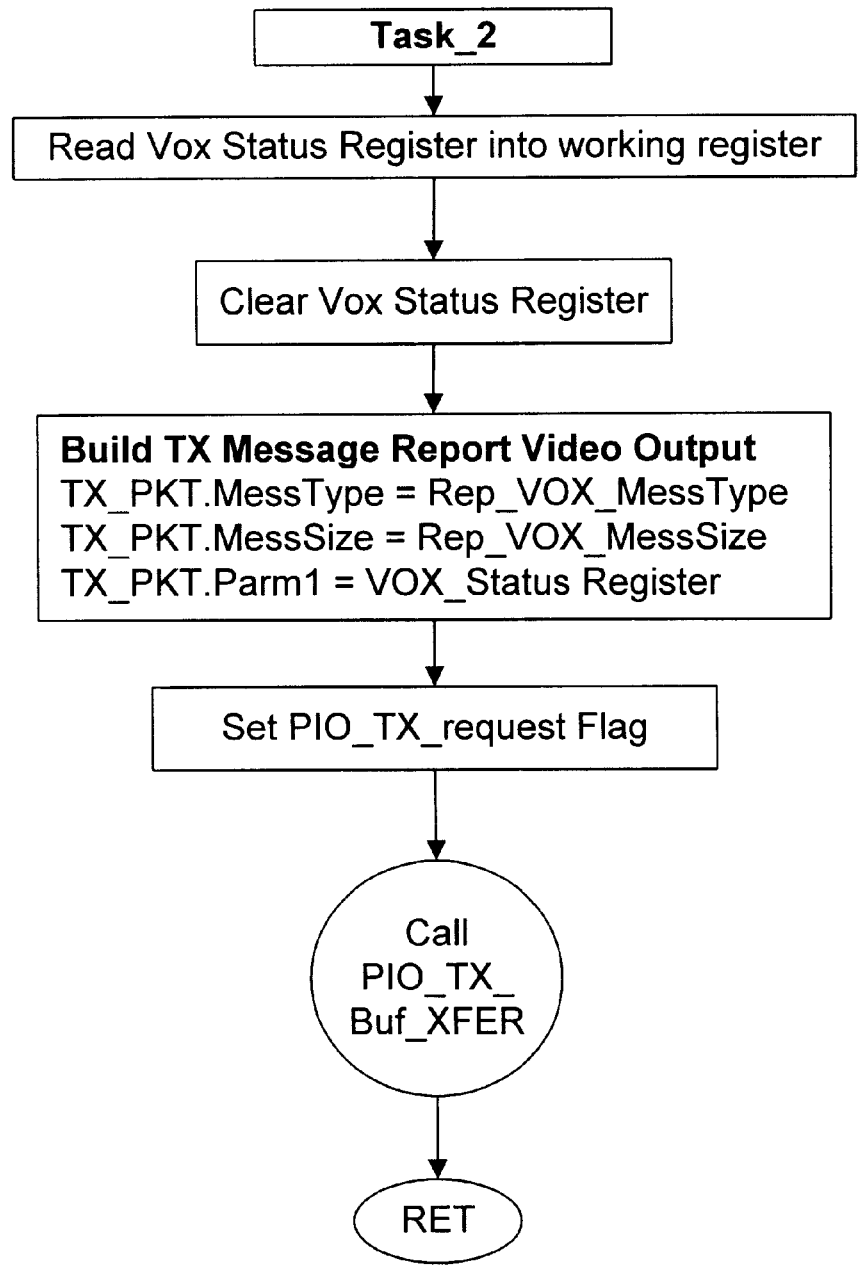
FIG. 43 graphically illustrates a process employed to build a VOX message in a preferred embodiment of the present invention.

FIG. 43 graphically illustrates a process employed to build a VOX message in a preferred embodiment of the present invention.

Figure 44:
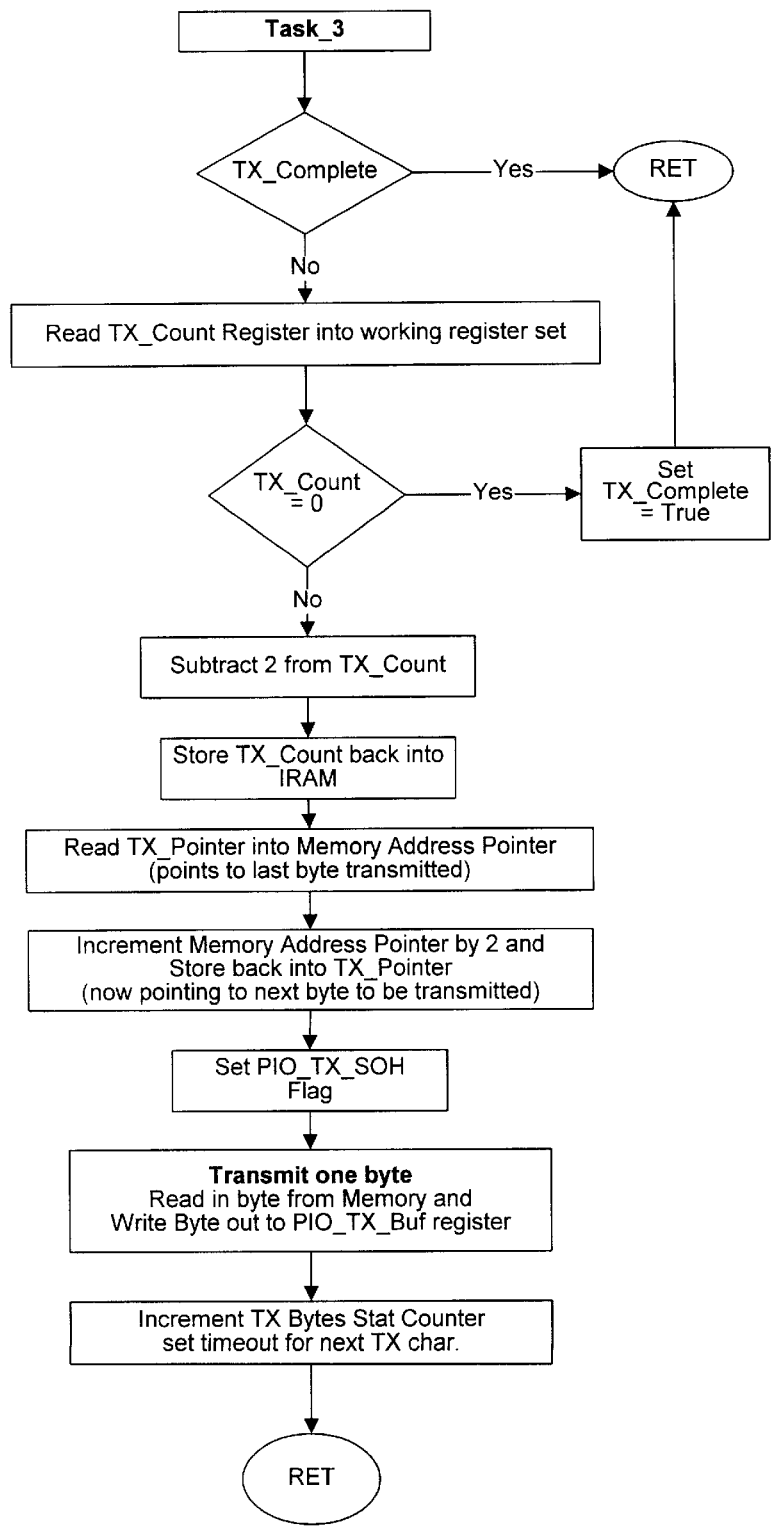
FIG. 44 graphically illustrates a process employed to transmit a byte in a preferred embodiment of the present invention.

FIG. 44 graphically illustrates a process employed to transmit a byte in a preferred embodiment of the present invention.

Figure 45A:
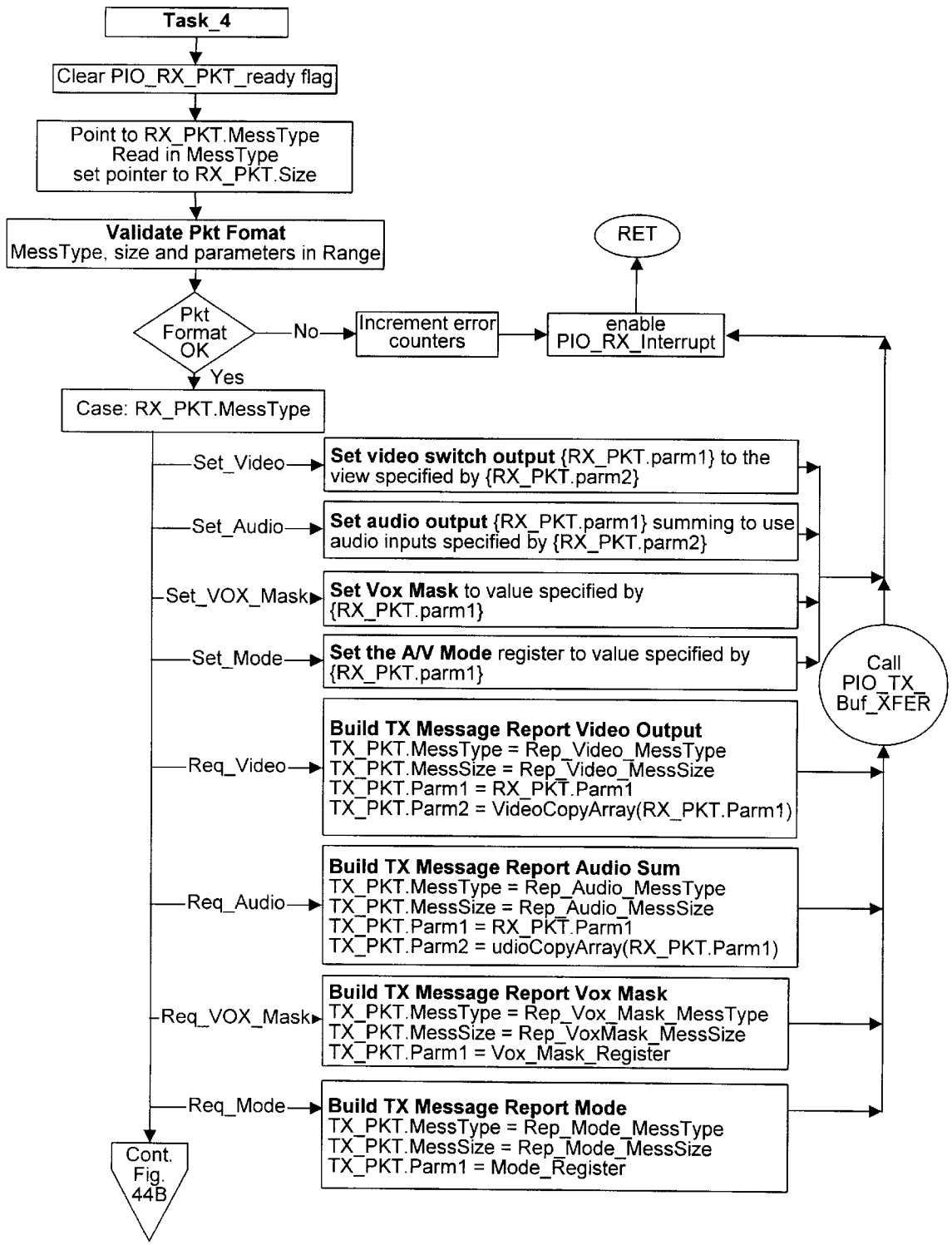
FIGS. 45A and 45B graphically illustrate a process employed to decode messages and perform work requested in a preferred embodiment of the present invention.
Figure 45B:
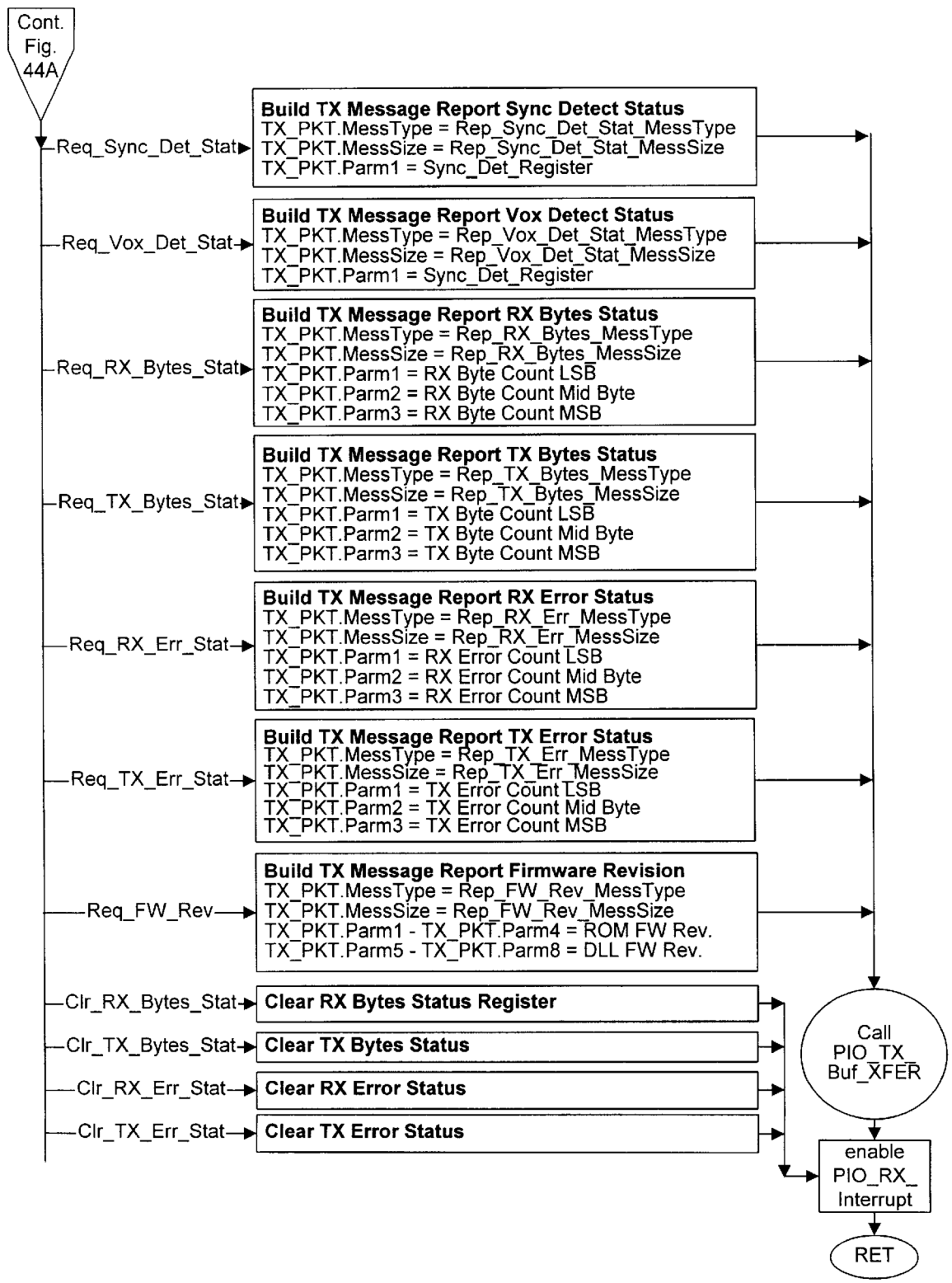

FIGS. 45A and 45B graphically illustrates a process employed to decode messages and perform work requested in a preferred embodiment of the present invention.

Following is individual description of several of the messages summarized in table 2 above:

Message: Set Video

Direction: From Host Machine to Firmware.

Usage: Set video switch output specified in message field {parameter 1} to the view specified in message field {parameter 2}.

Ranges: Parameter 1=0–7. Parameter 2=0–8.

Message Format:

| Byte | Function | Value |
| --- | --- | --- |
| 0 | Message Type | 0x01 |
| 1 | Message Size | 4 |
| 2 | Parameter 1 | Output (0–7) |
| 3 | Parameter 2 | View (0–8) |
|  |  | 8 = NONE |

Message: Set Audio

Direction: From Host Machine to Firmware

Usage: Set audio summing for output {parameter 1} to use audio inputs specified in {parameter 2}. Parameter 2 is a bit select field where each of the 8 bits corresponds to a specific input bit0=input0, bit2=input2 ... bit7=input7. A bit position set to logical 1 sums in the audio input associated with that bit. A bit position set to a logical 0 disconnects summing in the audio input associated with that bit.
Ranges: Parameter 1=0–7 Parameter 2=0–255

Message Format:

| Byte | Function | Value |
| --- | --- | --- |
| 0 | Message Type | 0x02 |
| 1 | Message Size | 4 |
| 2 | Parameter 1 | Output (0–7) |
| 3 | Parameter 2 | SUM Settings |

Message: Set Vox Mask
Direction: From Host Machine to Firmware.
Usage: Set Vox Mask for crosspoint adapter to {parameter 1}. Parameter 1 is a bit select field where each of the 8 bits corresponds to a specific audio input bit0=input0, bit2=input2 ... bit7=input7. A bit position set to logical 1 enables Vox Messages to be sent to the host machine when a VOX is detected on the corresponding audio input. A bit position set to a logical 0 disables Vox detection on the corresponding audio input.
Ranges: Parameter 1=0–255.

Message Format:

| Byte | Function | Value |
| --- | --- | --- |
| 0 | Message Type | 0x03 |
| 1 | Message Size | 3 |
| 2 | Parameter 1 | VOX MASK |

Message: Set Mode
Direction: From Host Machine to Firmware
Usage: To set video and audio modes in the crosspoint adapter. This command causes the value specified by parameter 1 to be loaded into the MODE register.
Ranges: Parameter 1=0–255

Message Format:

| Byte | Function | Value |
| --- | --- | --- |
| 0 | Message Type | 0x04 |
| 1 | Message Size | 3 |
| 2 | Parameter 1 | MODE Byte |

Mode Bit Definition:

| Bit | Function |
| --- | --- |
| 0 | Vertical Interval Switching<br>0 = disabled (default setting)<br>1 = enabled |
| 1 | VOX rate .7 sec/2 sec<br>0 = .7 sec (default setting)<br>1 = 2 sec |
| 2–7 | Reserved |

Message: Request Video
Direction: From Host Machine to Firmware.
Usage: Request the setting of video switch output {parameter 1}.
Ranges: Parameter 1=0–7.

Message Format:

| Byte | Function | Value |
| --- | --- | --- |
| 0 | Message Type | 0x05 |
| 1 | Message Size | 3 |
| 2 | Parameter 1 | Output (0–7) |

Message: Request Audio
Direction: From Host Machine to Firmware.
Usage: Request the setting of audio summing of output {parameter 1}.
Ranges: Parameter 1=0–7.

Message Format:

| Byte | Function | Value |
| --- | --- | --- |
| 0 | Message Type | 0x06 |
| 1 | Message Size | 3 |
| 2 | Parameter 1 | Output (0–7) |

Message: Request Vox Mask
Direction: From Host Machine to Firmware.
Usage: Request the setting of Vox Mask Register.

Message Format:

| Byte | Function | Value |
| --- | --- | --- |
| 0 | Message Type | 0x07 |
| 1 | Message Size | 2 |

Message: Request Mode
Direction: From Host Machine to Firmware.
Usage: Request the setting of MODE Register.

Message Format:

| Byte | Function | Value |
| --- | --- | --- |
| 0 | Message Type | 0x08 |
| 1 | Message Size | 2 |

Message: Report Video
Direction: From Firmware to Host Machine.
Usage: Report video switch setting (view) for output specified in message field {parameter 1}. The view is reported in message field {parameter 2}.
Ranges: Parameter 1=0–7. Parameter 2=0–8.

Message Format:

| Byte | Function | Value |
| --- | --- | --- |
| 0 | Message Type | 0x09 |
| 1 | Message Size | 4 |
| 2 | Parameter 1 | Output (0–7) |
| 3 | Parameter 2 | View (0–8)<br>8 = NONE |

Message: Report Audio
Direction: From Firmware to Host Machine.

Usage: Report audio sum settings for output {parameter 1}. Sum settings is specified in {parameter 2}. Parameter 2 is a bit select field where each of the 8 bits corresponds to a specific input bit0=input0, bit2=input2 bit7=input7. A bit position set to logical 1 indicates audio summing for the input associated with it. A bit position set to logical 0 indicates that the audio input associated with that bit is disconnected.

Ranges: Parameter 1=0–7. Parameter 2=0–255.

| Message Format: | | |
|---|---|---|
| Byte | Function | Value |
| 0 | Message Type | 0x0A |
| 1 | Message Size | 4 |
| 2 | Parameter 1 | Output (0–7) |
| 3 | Parameter 2 | SUM Setting |

Message: Report Vox Mask

Direction: From Firmware to Host Machine.

Usage: Report Vox Mask settings for crosspoint adapter {parameter 1}. Vox Mask settings are specified in {parameter 1}. Parameter 1 is a bit select field where each of the 8 bits corresponds to a specific input bit0=input0, bit2=input2 ... bit7=input7. A bit position set to logical 1 enables vox detection for the audio input associated with that bit. A bit position set to a logical 0 disables vox detection for the audio input associated with that bit.

Ranges: Parameter 1=0–255.

| Message Format: | | |
|---|---|---|
| Byte | Function | Value |
| 0 | Message Type | 0x0B |
| 1 | Message Size | 3 |
| 2 | Parameter 1 | VOX MASK |

Message: Report Mode

Direction: From Firmware to Host Machine.

Usage: Report Mode settings for crosspoint adapter {parameter 1}. Mode settings are specified in {parameter 1}.

Ranges: Parameter 1=0–255.

| Message Format: | | |
|---|---|---|
| Byte | Function | Value |
| 0 | Message Type | 0x0C |
| 1 | Message Size | 3 |
| 2 | Parameter 1 | Mode |

Message: Request Video Sync Detect Status

Direction: From Host Machine to Firmware.

Usage: Request the processed Video Sync Detect Status Register. This register contains a field of 8 bits, where each of the 8 bits corresponds to a specified video input bit0=input0, bit2=input2 ... bit7=input7 ... The raw Video Sync Detect data is latched external to the 8051 and is then sampled and cleared by the firmware every 50 msec. The results of the samples are stored in memory as processed Video Sync Detect Register. Each bit in the processed Video Sync Detect Register is set to a logical 1 if the corresponding raw Video Sync Detector input is sampled to be true and cleared to a logical 0 if the input is to be sampled false.

| Message Format: | | |
|---|---|---|
| Byte | Function | Value |
| 0 | Message Type | 0x10 |
| 1 | Message Size | 2 |

Message: Request Vox Detect Status

Direction: From Host Machine to Firmware.

Usage: Request the processed Vox Status Register. This register contains a field of 8 bits, where each of the 8 bits corresponds to a specified audio input bit0=input0, bit2=input2 ... bit7=input7. Each bit in the processed Vox Register is set to a logical 1 if its corresponding raw Vox data input is sampled to be true for 700 msec. Note: The raw Vox data is sampled by the firmware every 10 $\mu$sec. Each bit in the processed Vox Register is set to a logical 0 if its corresponding raw Vox data input is ever sampled to be false.

| Message Format: | | |
|---|---|---|
| Byte | Function | Value |
| 0 | Message Type | 0x011 |
| 1 | Message Size | 2 |

Message: Request Receive Bytes Status

Direction: From Host Machine to Firmware.

Usage: Requests the Receive Bytes Status Register. This register contains the number of bytes the crosspoint adaptor has received from the host machine. The Receive Bytes Status Register may be cleared by the host machine through the ClrRxBytesStat command.

| Message Format: | | |
|---|---|---|
| Byte | Function | Value |
| 0 | Message Type | 0x012 |
| 1 | Message Size | 2 |

Message: Request Transmit Bytes Status

Direction: From Host Machine to Firmware.

Usage: Requests the Transmit Bytes Status Register. This register contains the number of bytes the crosspoint adaptor has transmitted to the host machine. The Transmit Bytes Status Register may be cleared by the host machine through the ClrTxBytesStat command.

| Message Format: | | |
|---|---|---|
| Byte | Function | Value |
| 0 | Message Type | 0x013 |
| 1 | Message Size | 2 |

Message: Request Receive Errors Status

Direction: From Host Machine to Firmware.

Usage: Requests the Receive Errors Status Register. This register contains the number of receive errors the crosspoint adaptor has received from the host machine. The Receive Errors Status Register may be cleared by the host machine through the ClrRxErrsStat command.

Message Format:

| Byte | Function | Value |
|---|---|---|
| 0 | Message Type | 0x014 |
| 1 | Message Size | 2 |

Message: Request Transmit Errors Status

Direction: From Host Machine to Firmware.

Usage: Requests the Transmit Errors Status Register. This register contains the number of transmit errors the crosspoint adaptor has encountered transmitting to the host machine. The Transmit Errors Status Register may be cleared by the host machine through the ClrTxErrsStat command.

Message Format:

| Byte | Function | Value |
|---|---|---|
| 0 | Message Type | 0x015 |
| 1 | Message Size | 2 |

Message: Report Sync Detect Status

Direction: From Firmware to Host Machine.

Usage: Report Video Sync Detect Status for crosspoint adaptor. Video Sync Detect Status is returned as {parameter 1}. Parameter 1 is a bit select field where each of the 8 bits corresponds to a specific video input bit0=input0, bit2=input2 . . . bit7=input7. A bit set to logical 1 indicates the presence of video on the specific video input port.

Ranges: Parameter 1=0–255

Message Format:

| Byte | Function | Value |
|---|---|---|
| 0 | Message Type | 0x016 |
| 1 | Message Size | 3 |
| 2 | Parameter 1 | Video Sync Detect |

Message: Report Vox Detect Status

Direction: From Firmware to Host Machine.

Usage: Report Vox Detect Status for crosspoint adapter. Vox Detect Status is returned as {parameter 1}. Parameter 1 is a bit select field where each of the 8 bits corresponds to a specific video input bit0=input0, bit2=input2 . . . bit7=input7. A bit set to logical 1 indicates the presence of Voxing on the specific audio input port.

Ranges: Parameter 1=0–255

Message Format:

| Byte | Function | Value |
|---|---|---|
| 0 | Message Type | 0x017 |
| 1 | Message Size | 3 |
| 2 | Parameter 1 | Vox Detect |

Message: Report Receive Bytes Status

Direction: From Firmware to Host Machine.

Usage: Report Receive Bytes Status for crosspoint adapter. The receiver byte count is returned in parameter 1–3 as a 24 bit value. Parameter 1 is LSB, Parameter 2 is the middle byte and Parameter 3 is the MSB.

Ranges: Parameter 1–3=0–255

Message Format:

| Byte | Function | Value |
|---|---|---|
| 0 | Message Type | 0x018 |
| 1 | Message Size | 5 |
| 2 | Parameter 1 | RCV Byte Count LSB |
| 3 | Parameter 2 | RCV Byte Count |
| 4 | Parameter 3 | RCV Byte Count MSB |

Message: Report Transmit Bytes Status

Direction: From Firmware to Host Machine.

Usage: Report Transmit Bytes Status for crosspoint adapter. The transmit byte count is returned in parameter 1–3 as a 24 bit value. Parameter 1 is LSB, parameter 2 is the middle byte and parameter 3 is the MSB.

Ranges: Parameter 1–3=0–255

Message Format:

| Byte | Function | Value |
|---|---|---|
| 0 | Message Type | 0x019 |
| 1 | Message Size | 5 |
| 2 | Parameter 1 | TX Byte Count LSB |
| 3 | Parameter 2 | TX Byte Count |
| 4 | Parameter 3 | TX Byte Count MSB |

Message: Report Receive Error Status

Direction: From Firmware to Host Machine.

Usage: Report Receive Error Status for crosspoint adapter. The receiver error count is returned in parameter 1–2 as a 16 bit value. Parameter 1 is LSB, parameter 2 is the MSB.

Ranges: Parameter 1–2=0–255

Message Format:

| Byte | Function | Value |
|---|---|---|
| 0 | Message Type | 0x01a |
| 1 | Message Size | 4 |
| 2 | Parameter 1 | RCV Err Count LSB |
| 3 | Parameter 2 | RCV Err Count MSB |

Message: Report Transmit Error Status

Direction: From Firmware to Host Machine.

Usage: Report Transmit Error Status for crosspoint adapter. The Transmit error count is returned in parameter 1–2 as a 16 bit value. Parameter 1 is LSB, Parameter 2 is the MSB.

Ranges: Parameter 1–2=0–255

Message Format:

| Byte | Function | Value |
|---|---|---|
| 0 | Message Type | 0x01b |
| 1 | Message Size | 4 |
| 2 | Parameter 1 | TX Err Count LSB |
| 3 | Parameter 2 | TX Err Count MSB |

Message: Clear Receive Bytes Status

Direction: From Firmware to Host Machine.

Usage: Clear Receive Bytes Status to crosspoint adapter. The clear receiver byte command clears the 24 bit Receive Byte Status Register.

Message Format:

| Byte | Function | Value |
|---|---|---|
| 0 | Message Type | 0x01e |
| 1 | Message Size | 2 |

Message: Clear Transmit Bytes Status

Direction: From Firmware to Host Machine.

Usage: Clear Transmit Bytes Status to crosspoint adapter. The clear transmit byte command clears the 24 bit Transmit Byte Status Register.

Message Format:

| Byte | Function | Value |
|---|---|---|
| 0 | Message Type | 0x01f |
| 1 | Message Size | 2 |

Message: Clear Receive Error Status

Direction: From Firmware to Host Machine.

Usage: Clear Receive Error Status to crosspoint adapter. The clear receiver error command clears the 16 bit Receive Error Status Register.

Message Format:

| Byte | Function | Value |
|---|---|---|
| 0 | Message Type | 0x020 |
| 1 | Message Size | 2 |

Message: Clear Transmit Error Status

Direction: From Firmware to Host Machine.

Usage: Clear Transmit Error Status to crosspoint adapter. The clear transmit error command clears the 24 bit Transmit Error Status Register.

Message Format:

| Byte | Function | Value |
|---|---|---|
| 0 | Message Type | 0x021 |
| 1 | Message Size | 2 |

It will be apparent to those skilled in the art that the invention may be embodied in a variety of specific forms without departing from its essential characteristics or its spirit. The described embodiments are only illustrative and not restrictive and the scope of the invention is, therefore, to be indicated by the following claims.

We claim:

1. A participant-directed, video-conferencing switching system controlled through a control network to establish and direct a video conference on a conference network amongst two or more video conference participants, the switching system comprising:

a. a host machine which generates adaptor conference messages and CODEC conference messages;

b. a plurality of CODECs, each of the plural CODECs having a digital port and an analog port and being responsive to the CODEC conference messages;

c. a network interface to convey digital-format audio and video data between the digital ports of the plural CODECs and a conference network;

d. a digitally-controlled, crosspoint adaptor in analog audio and analog video communication with the plural CODECs through corresponding plural analog audio and analog video pathways, the crosspoint adaptor comprising:

an audio summer circuit for selectively mixing audio signals conveyed to the crosspoint adaptor on the plural analog audio pathways;

VOX detection circuitry responsive to a detected participant voice signal conveyed to the crosspoint adaptor on any selected one of the plural analog audio pathways to generate a VOX detection signal;

a microprocessor under the direction of a microcode-operant program to control the crosspoint adaptor by generating a configuration signal in accordance with the VOX detection signal and the adaptor conference messages;

a multi-port video crosspoint switch to convey video signals present on a selected one of the plural analog video signal pathways to a selected one or more of the plural CODECs according to a video follows audio protocol and the configuration signal; and a bus interface through which the crosspoint adaptor receives the adaptor conference messages; and e. a modem disposed to accept user control signals from the control network and responsively signal the host machine to generate the adaptor conference messages and the CODEC conference messages in accordance with the user control signals to establish and direct the video conference on the conference network.

2. The system of claim 1 further comprising:

a multi-port continuous presence subsystem responsive to analog video signals to compose a combination video signal, the combination video signal directed by the crosspoint adaptor to the plural CODECs on the plural analog video pathways in accordance with a continuous presence configuration signal generated by the microprocessor in accordance with the adaptor conference messages.

3. The system of claim 2 further comprising a conference participant-accessible control system for generating the user control signals accepted by the modem from the control network.

4. The system of claim 3 in which the conference participant-accessible control system is accessible through a graphical user interface.

5. The system of claim 4 in which the graphical user interface is employed by the conference participant-accessible control system to dial a conference participant and add the conference participant to the video conference.

6. The system of claim 2 in which the control network is a POTS network.

7. The system of claim 2 in which the conference network is an ISDN network.

8. The system of claim 3 in which the conference participant-accessible control system is accessible through a PC.

9. The system of claim 3 in which the control network is a POTS network and the conference network is an ISDN network.

10. The system of claim 3 in which the control network and the conference network are the same technology but are distinct networks.

11. The system of claim 1 further comprising a conference participant-accessible control system for generating the user control signals accepted by the modem from the control network.

12. The system of claim 11 in which the conference participant-accessible control system is accessible through a graphical user interface.

13. The system of claim 11 in which the conference participant-accessible control system is accessible through a PC.

14. The system of claim 13 in which the graphical user interface is employed by the conference participant-accessible control system to dial a conference participant and add the conference participant to the video conference.

15. The system of claim 11 in which the control network is a POTS network and the conference network is an ISDN network.

16. The system of claim 11 in which the control network and the conference network are the same technology but are distinct networks.

17. The system of claim 1 in which the control network is a POTS network.

18. The system of claim 1 in which the conference network is an ISDN network.

19. A participant-directed, video-conferencing switch controlled through a control network to establish and direct a video conference amongst two or more video conference participants on a conference network, the switch comprising:

a. a host machine which generates adaptor conference messages and CODEC conference messages;
   b. a plurality of CODECs, each of the plural CODECs having a digital port and an analog port and each being responsive to the CODEC conference messages and for composing CODEC analog video and audio signals;
   c. a network interface to convey digital-format audio and video data between the digital ports of the plural CODECs and a conference network accessible to conference participants;
   d. a multi-port continuous presence subsystem responsive to the CODEC analog video signals to compose a combination video signal;
   e. a digitally-controlled, crosspoint adaptor in analog audio and analog video communication with the plural CODECs through corresponding plural analog audio and analog video pathways, the crosspoint adaptor comprising:
      an audio summer circuit for selectively mixing audio signals conveyed to the crosspoint adaptor on the plural audio pathways;
      VOX detection circuitry responsive to a participant voice signal detected on one of the plural analog audio pathways to generate a VOX detection signal;
      a microprocessor under the direction of a microcode-operant program to control the crosspoint adaptor by generating, in a first mode, a configuration signal in accordance with the VOX detection signal and the adaptor conference messages and by generating, in a second mode, a continuous presence configuration signal in accordance with the adaptor conference messages;
      a multi-port video crosspoint switch to convey, in the first mode, video signals present on a selected one of the plural analog video signal pathways to selected ones of the plural CODECs in accordance with a video follows audio protocol and the configuration signal and to convey, in the second mode, the combination video signal to selected ones of the plural CODECs in accordance with a continuous presence protocol and the continuous presence configuration signal; and
      a bus interface through which the crosspoint adaptor receives the adaptor conference messages; and
   f. a modem disposed to accept user control signals from the control network and responsively signal the host machine to generate the adaptor conference messages and the CODEC conference messages in accordance with the user control signals to establish and direct the video conference on the conference network.

20. The switch of claim 19 in which the VOX detection circuitry is responsive to the participant voice signal only in the first mode.

21. The switch of claim 19 in which the continuous presence subsystem receives the CODEC analog video signals from the crosspoint adaptor.

22. A method for establishing and controlling a video conference amongst plural conference participants on a conference network with a participant-directed video-conferencing switching system directed through a control network, the method comprising the steps of:

a. providing plural CODECs, each CODEC having a digital port and an analog port and each CODEC being directed by a CODEC application program;
   b. generating CODEC conference messages to which the CODEC application programs are responsive;
   c. interfacing signals between the digital ports of the plural CODECs and a conference network through which participants participate in the video conference by accessing the digital ports of the CODECs;
   d. detecting a participant voice signal on the analog port of a selected CODEC to generate a VOX detection signal;
   e. generating adaptor conference messages;
   f. generating a configuration signal in accordance with the VOX detection signal and the adaptor conference messages;
   g. conveying video signals from the analog port of the selected CODEC to one or more of the CODECs other than the selected CODEC in accordance with the configuration signal;
   h. generating user control signals into a control network according to conference participant direction; and
   i. accepting the user control signals from the control network and responsively generating the adaptor conference messages and the CODEC conference messages in accordance with the user control signals to establish and direct the video conference under participant direction through the control network.

23. The method of claim 22 in which the user control signals precipitate generation of CODEC conference messages which cause the CODEC application in a selected CODEC to responsively generate access signals to engage a participant for the video conference through the conference network.

24. A participant-directed, video-conferencing switching system controlled through a control network to establish and direct a video conference on a conference network amongst two or more video conference participants, the switching system comprising:
   a. a host machine which generates adaptor conference messages and CODEC conference messages;
   b. a plurality of CODECs, each of the plural CODECs having a digital port and an analog port and being responsive to the CODEC conference messages;
   c. a network interface to convey digital-format audio and video data between the digital ports of the plural CODECs and a conference network;
   d. a digitally-controlled, crosspoint adaptor in analog audio and analog video communication with the plural CODECs through corresponding plural analog audio and analog video pathways, the crosspoint adaptor comprising:
      an audio summer circuit for selectively mixing audio signals conveyed to the crosspoint adaptor on the plural analog audio pathways;
      VOX detection circuitry responsive to a detected participant voice signal conveyed to the crosspoint adaptor on any selected one of the plural analog audio pathways to generate a VOX detection signal;
      a microprocessor under the direction of a microcode-operant program to control the crosspoint adaptor by generating a configuration signal in accordance with the VOX detection signal and the adaptor conference messages;
      a multi-port video crosspoint switch to convey video signals present on a selected one of the plural analog video signal pathways to a selected one or more of the plural CODECs according to a video follows audio protocol and the configuration signal; and
      a bus interface through which the crosspoint adaptor receives the adaptor conference messages; and
   e. a control connection disposed to accept from the control network user control signals which responsively signal the host machine to generate the adaptor conference messages and the CODEC conference messages to establish and direct the video conference on the conference network.

25. The system of claim 24 further comprising:
   a multi-port continuous presence subsystem responsive to analog video signals to compose a combination video signal, the combination video signal directed by the crosspoint adaptor to the plural CODECs on the plural analog video pathways in accordance with a continuous presence configuration signal generated by the microprocessor in accordance with the adaptor conference messages.

26. The system of claim 24 further comprising a conference participant-accessible control system for generating the user control signals accepted by the control connection from the control network.

27. The system of claim 25 further comprising a conference participant-accessible control system for generating the user control signals accepted by the control connection from the control network.

28. The system of claim 26 in which the control connection is an ETHERNET connection.

29. The system of claim 27 in which the control connection is an ETHERNET connection.

30. A participant-directed, video-conferencing switch controlled through a control network to establish and direct a video conference amongst two or more video conference participants on a conference network, the switch comprising:
   a. a host machine which generates adaptor conference messages and CODEC conference messages;
   b. a plurality of CODECs, each of the plural CODECs having a digital port and an analog port and each being responsive to the CODEC conference messages and for composing CODEC analog video and audio signals;
   c. a network interface to convey digital-format audio and video data between the digital ports of the plural CODECs and a conference network accessible to conference participants;
   d. a multi-port continuous presence subsystem responsive to the CODEC analog video signals to compose a combination video signal;
   e. a digitally-controlled, crosspoint adaptor in analog audio and analog video communication with the plural CODECs through corresponding plural analog audio and analog video pathways, the crosspoint adaptor comprising:
      an audio summer circuit for selectively mixing audio signals conveyed to the crosspoint adaptor on the plural audio pathways;
      VOX detection circuitry responsive to a participant voice signal detected on one of the plural analog audio pathways to generate a VOX detection signal;
      a microprocessor under the direction of a microcode-operant program to control the crosspoint adaptor by generating, in a first mode, a configuration signal in accordance with the VOX detection signal and the adaptor conference messages and by generating, in a second mode, a continuous presence configuration signal in accordance with the adaptor conference messages;
      a multi-port video crosspoint switch to convey, in the first mode, video signals present on a selected one of the plural analog video signal pathways to selected ones of the plural CODECs in accordance with a video follows audio protocol and the configuration signal and to convey, in the second mode, the combination video signal to selected ones of the plural CODECs in accordance with a continuous presence protocol and the continuous presence configuration signal; and
      a bus interface through which the crosspoint adaptor receives the adaptor conference messages; and
   f. a control connection disposed to accept user control signals from the control network which responsively signal the host machine to generate the adaptor conference messages and the CODEC conference messages to establish and direct the video conference on the conference network.

31. The video conferencing switch of claim 30 in which the control network is an INTRANET network.

32. The video conferencing switch of claim 31 in which the control connection is an ETHERNET connection.

33. The video conferencing switch of claim 30 in which the control network is the INTERNET.

* * * * *